United States Patent
Mok et al.

(10) Patent No.: US 10,560,948 B2
(45) Date of Patent: Feb. 11, 2020

(54) METHOD AND APPARATUS FOR SUPPORTING VEHICLE TO EVERYTHING SERVICE

(71) Applicant: Samsung Electronics Co., Ltd., Suwon-si, Gyeonggi-do (KR)

(72) Inventors: Youngjoong Mok, Suwon-si (KR); Hyunjeong Kang, Seoul (KR); Sangwook Kwon, Suwon-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/255,340

(22) Filed: Jan. 23, 2019

(65) Prior Publication Data

US 2019/0174482 A1    Jun. 6, 2019

Related U.S. Application Data

(63) Continuation of application No. 15/801,795, filed on Nov. 2, 2017, now Pat. No. 10,237,874.

(30) Foreign Application Priority Data

Nov. 3, 2016 (KR) .................. 10-2016-0146044
Nov. 14, 2016 (KR) .................. 10-2016-0151420

(51) Int. Cl.
*H04W 72/00* (2009.01)
*H04W 72/04* (2009.01)
(Continued)

(52) U.S. Cl.
CPC ........... *H04W 72/048* (2013.01); *H04W 4/06* (2013.01); *H04W 4/44* (2018.02); *H04W 24/10* (2013.01);
(Continued)

(58) Field of Classification Search
USPC ................................ 370/254, 230, 325, 329
See application file for complete search history.

(56) References Cited

U.S. PATENT DOCUMENTS

| | | | | |
|---|---|---|---|---|
| 8,750,123 B1 * | 6/2014 | Alisawi | ............. | H04W 28/0284 370/235 |
| 2009/0318182 A1 * | 12/2009 | Nagato | ............... | H04W 52/143 455/522 |

(Continued)

FOREIGN PATENT DOCUMENTS

| | | |
|---|---|---|
| WO | 2015/062671 A1 | 5/2015 |
| WO | 2015/139289 A1 | 9/2015 |
| WO | WO-2016020754 A1 * | 2/2016 ............ H04W 8/005 |

OTHER PUBLICATIONS

Ericsson, WF on CBR measurement, R1-168348, 3GPP TSG RAN WG1 Meeting #86, Gothenburg, Sweden, Aug. 28, 2016.
(Continued)

*Primary Examiner* — David Q Nguyen
(74) *Attorney, Agent, or Firm* — Jefferson IP Law, LLP

(57) ABSTRACT

A method for supporting a vehicle communication (connected car or vehicle to everything (V2X)) service in a wireless communication system and an apparatus thereof are provided. The method includes receiving threshold information for reporting a channel busy ratio (CBR), measuring the CBR for a resource pool, identifying whether a reporting condition is satisfied by comparing the measured CBR with the threshold information, and reporting the measured CBR if the reporting condition is satisfied. The present disclosure relates to a communication technique for converging a fifth generation (5G) communication system for supporting higher data rates beyond a fourth generation (4G) system with an Internet of things (IoT) technology, and may be
(Continued)

applied to intelligent services based on the 5G communication technology and the IoT-related technology.

16 Claims, 36 Drawing Sheets

(51) Int. Cl.
  *H04W 36/00* (2009.01)
  *H04W 4/44* (2018.01)
  *H04W 4/06* (2009.01)
  *H04W 24/10* (2009.01)
  *H04W 36/32* (2009.01)
  *H04W 4/02* (2018.01)
  *H04W 84/00* (2009.01)

(52) U.S. Cl.
  CPC ....... *H04W 36/0072* (2013.01); *H04W 36/32* (2013.01); *H04W 4/02* (2013.01); *H04W 72/0486* (2013.01); *H04W 84/005* (2013.01)

(56) References Cited

U.S. PATENT DOCUMENTS

| | | | |
|---|---|---|---|
| 2014/0029580 A1 | 1/2014 | Jung et al. | |
| 2014/0092735 A1 | 4/2014 | Lee et al. | |
| 2014/0119210 A1 | 5/2014 | Bansal et al. | |
| 2015/0043448 A1* | 2/2015 | Chatterjee | H04W 8/005 370/329 |
| 2015/0156662 A1 | 6/2015 | Bai et al. | |
| 2015/0172956 A1 | 6/2015 | Noh et al. | |
| 2016/0242152 A1 | 8/2016 | Yu et al. | |
| 2016/0316486 A1 | 10/2016 | Bai et al. | |
| 2017/0013491 A1 | 1/2017 | Ma et al. | |
| 2017/0134080 A1 | 5/2017 | Rahman et al. | |
| 2017/0201461 A1* | 7/2017 | Cheng | H04L 47/32 |
| 2017/0238321 A1 | 8/2017 | Sartori et al. | |
| 2017/0245245 A1 | 8/2017 | Kim et al. | |
| 2017/0288886 A1 | 10/2017 | Atarius et al. | |
| 2017/0295579 A1* | 10/2017 | Sheng | H04W 72/02 |
| 2017/0331686 A1* | 11/2017 | Tsai | H04L 41/0893 |
| 2018/0048577 A1 | 2/2018 | Gulati et al. | |
| 2018/0049224 A1 | 2/2018 | Dinan et al. | |
| 2018/0092065 A1 | 3/2018 | Sheng | |
| 2018/0242115 A1 | 8/2018 | Kim et al. | |

OTHER PUBLICATIONS

Nokia et al: "On congestion control for V2V communication", 3GPP Draft; R1-1609788 CongestionControl, 3rd Generation Partnership Project (3GPP), Mobile Competence Centre ; 650, Route Des Lucioles ; F-06921 Sophia-Anti Polis Cedex; France, vol. RAN WG1, No. Lisbon, Portugal; Oct. 10, 2016-Oct. 14, 2016 Oct. 1, 2016 (Oct. 1, 2016), XP051159668.

European Search Report dated Jul. 29, 2019, issued in European Patent Application No. 17867971.8.

* cited by examiner

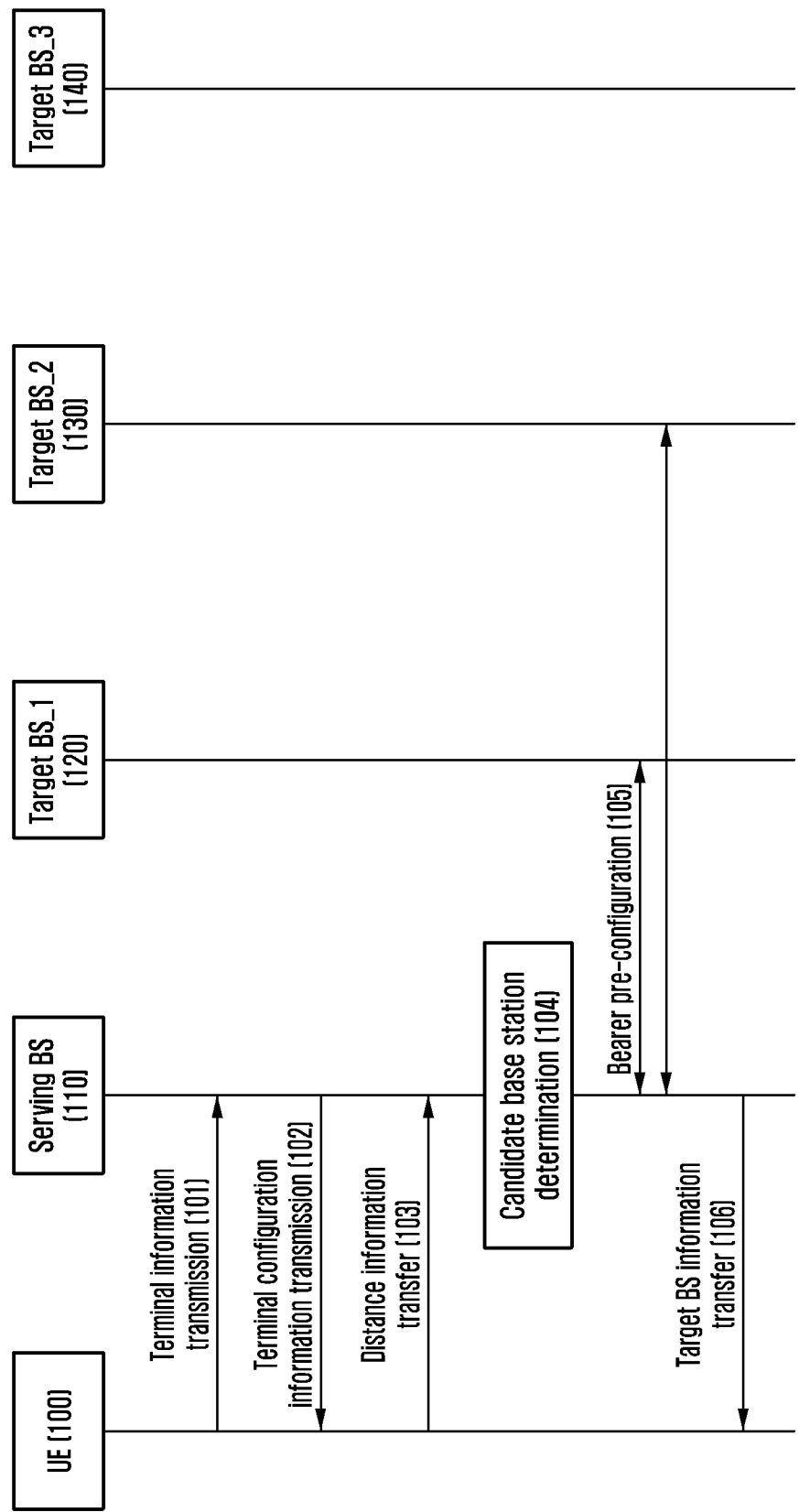

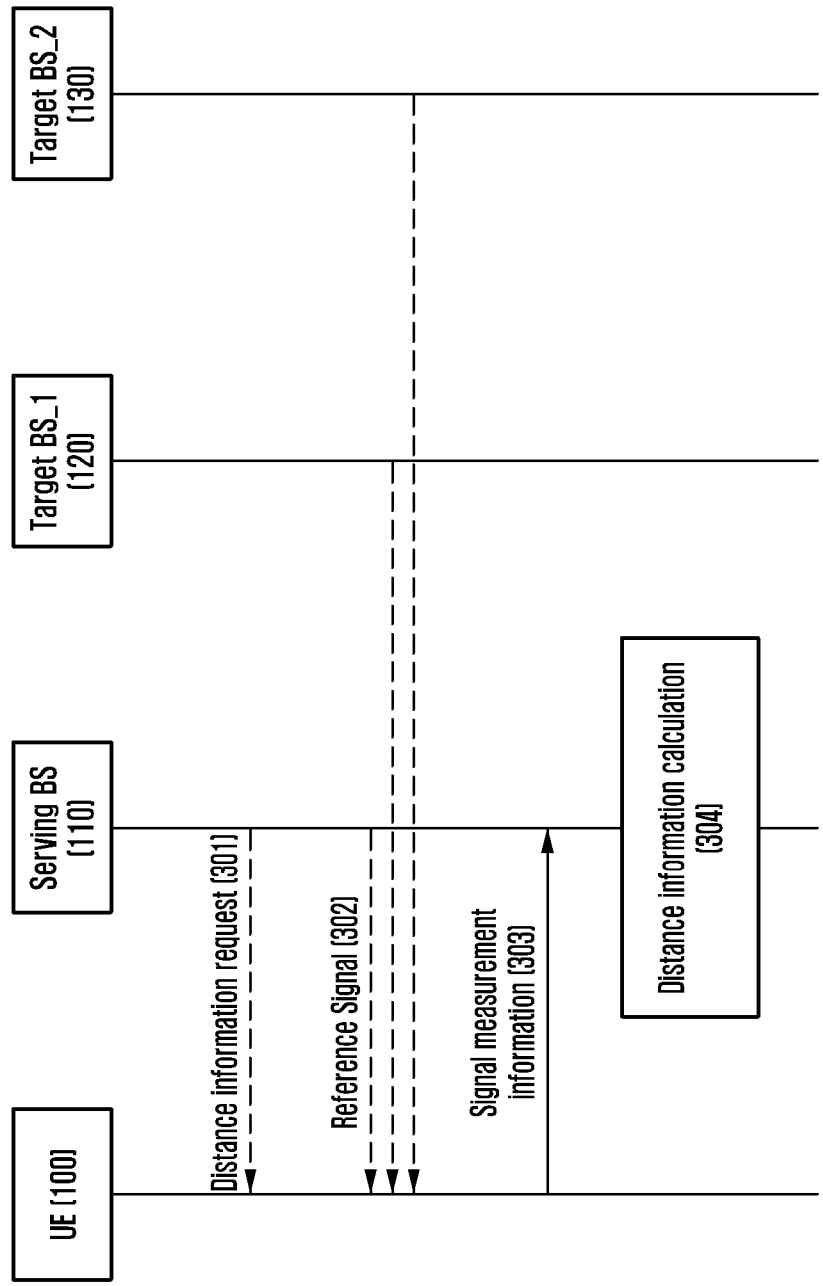

METHOD AND APPARATUS FOR SUPPORTING VEHICLE TO EVERYTHING SERVICE

CROSS-REFERENCE TO RELATED APPLICATION(S)

This application is a continuation application of prior application Ser. No. 15/801,795, filed on Nov. 2, 2017, which was based on and claimed priority under 35 U.S.C § 119(a) of a Korean patent application number 10-2016-0146044, filed on Nov. 3, 2016, in the Korean Intellectual Property Office, and of a Korean patent application number 10-2016-0151420, filed on Nov. 14, 2016, in the Korean Intellectual Property Office, the disclosure of which is incorporated by reference herein in its entirety.

TECHNICAL FIELD

The present disclosure relates to a method for supporting a vehicle communication (connected car or vehicle to everything (V2X)) service in a wireless communication system.

BACKGROUND

In order to meet the demand for wireless data traffic that is on an increasing trend after commercialization of fourth generation (4G) communication systems, efforts have been made to develop improved fifth generation (5G) or pre-5G communication system. For this reason, the 5G or pre-5G communication system is also called a beyond 4G network communication system or a post long-term evolution (LTE) system. In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming using array antennas, massive multiple-input multiple-output (MIMO), full dimension MIMO (FD-MIMO), hybrid beamforming, and large-scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid frequency shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine (M2M) connection, M2M communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beamforming, MIMO, and array antennas, which correspond to the 5G communication technology. As the big data processing technology as described above, application of a cloud RAN would be an example of convergence between the 5G technology and the IoT technology.

Nowadays, in a wireless communication system, a method for supporting vehicle communication (connected car or vehicle to everything (V2X)) has been sought.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide various operations for supporting vehicle communication.

In accordance with an aspect of the present disclosure, a method for supporting a vehicle to everything (V2X) service by a terminal in a wireless communication system includes receiving threshold information for reporting a channel busy ratio (CBR), measuring the CBR for a resource pool, identifying whether a reporting condition is satisfied by comparing the measured CBR with the threshold information, and reporting the measured CBR if the reporting condition is satisfied.

In accordance with another aspect of the present disclosure, a terminal for supporting a V2X service in a wireless communication system is provided. The method includes a transceiver configured to transmit and receive signals, and at least one processor coupled with the transceiver, the at least one processor configured to: control the transceiver to receive threshold information for reporting a CBR, measure the CBR for a resource pool, identify whether a reporting condition is satisfied by comparing the measured CBR with the threshold information, and control the transceiver to report the measured CBR if the reporting condition is satisfied.

According to the various embodiments of the present disclosure, continuity of the vehicle communication service can be secured, and reliability of the vehicle communication service can be heightened.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1A is a diagram illustrating a method for a vehicle terminal to transmit vehicle terminal information to a serving base station (BS) according to a first embodiment of the present disclosure;

FIG. 1C is a diagram illustrating a case where a BS calculates a distance through signal measurement information according to a first embodiment of the present disclosure;

FIG. 2GB is a diagram illustrating zone information example 2 according to a second embodiment of the present disclosure;

FIG. 2O is a diagram illustrating a method for V2X-UE to transmit resource CBR for inter-public land mobile network (PLMN) resource according to a second embodiment of the present disclosure;

Throughout the drawings, like reference numerals will be understood to refer to like parts, components, and structures.

DETAILED DESCRIPTION

Figure 1B:
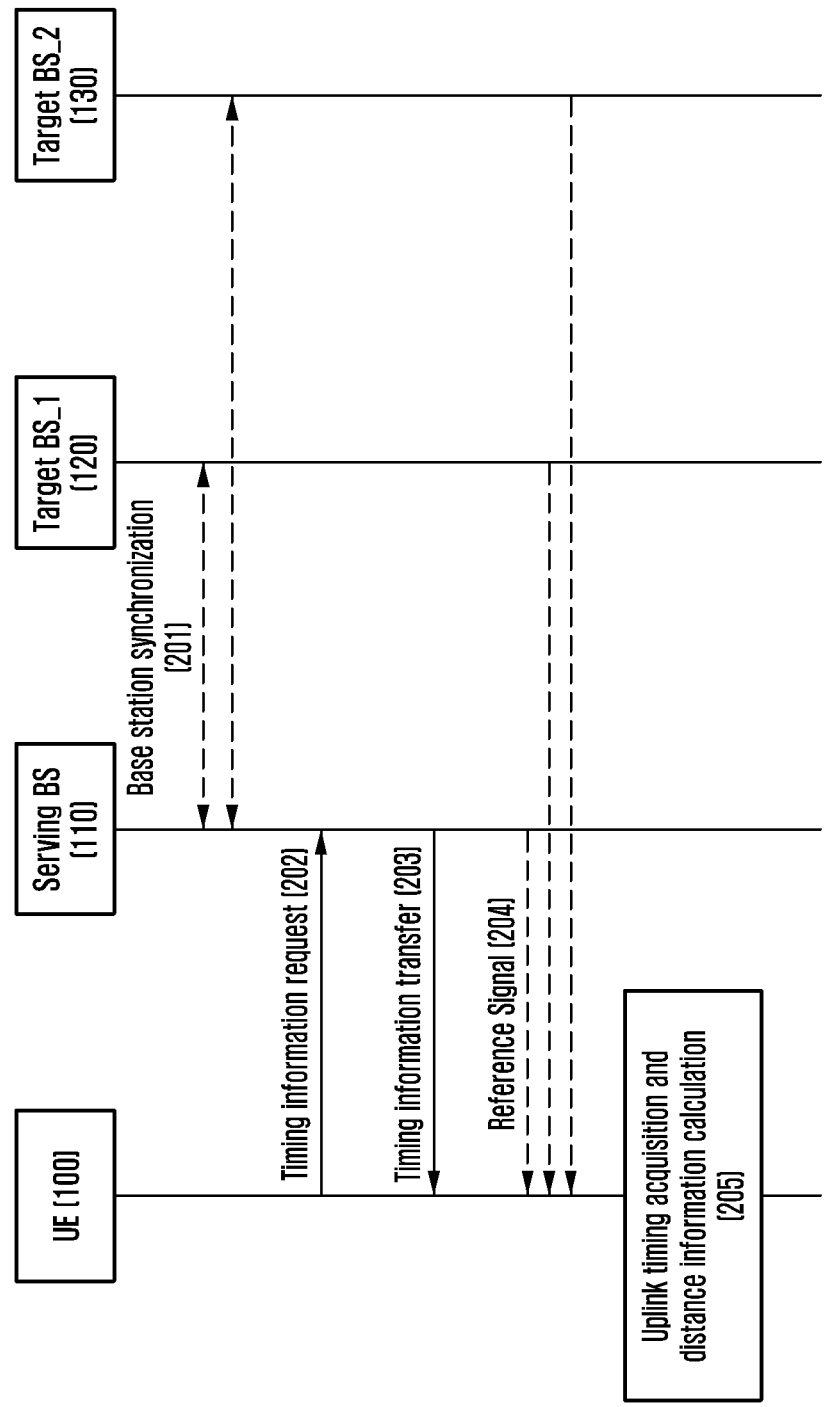
FIG. 1B is a diagram illustrating a method for measuring a distance using timing alignment information according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

FIG. 1A is a diagram illustrating a method for a vehicle terminal to transmit vehicle terminal information to a serving BS (BS) according to a first embodiment of the present disclosure.

Referring to FIG. 1A, at operation 101, a terminal 100 may transmit terminal information to a serving BS 110.

The terminal information may include at least one of whether path information configured by the terminal 100 can be used and configured path information. For example, if there is the path information configured by a navigation that is one of apps installed in the terminal 100, the terminal 100 may transmit to the serving BS 110 an indicator for indicating whether the path information can be used as the terminal information using the path information. If there is the path information configured by the navigation that is one of the apps installed in the terminal 100, the terminal 100 may transfer the path information to the serving BS 110. The path information may be inscribed, for example, as in Table 1 below.

TABLE 1

| locationCoordinates-r10 | CHOICE { | |
| --- | --- | --- |
| ellipsoid-Point-r10 | OCTET STRING, | |
| ellipsoidPointWithAltitude-r10 | OCTET STRING, | |
| ..., | | |
| ellipsoidPointWithUncertaintyCircle-r11 | OCTET STRING, | |
| ellipsoidPointWithUncertaintyEllipse-r11 | OCTET STRING, | |
| ellipsoidPointWithAltitudeAndUncertaintyEllipsoid-r11 | OCTET STRING, | |
| ellipsoidArc-r11 | OCTET STRING, | |
| Polygon-r11 | OCTET STRING | |
| }, | | |
| horizontalVelocity-r10 | OCTET STRING, | OPTIONAL, |
| gnss-TOD-msec-r10 | OCTET STRING, | OPTIONAL, |

| LocationInfo field descriptions |
| --- |
| ellipsoidArc |
| Parameter EllipsoidArc defined in 3GPP TS36.355. The first/leftmost bit of the first octet contains the most significant bit. |
| ellipsoid-Point |
| Parameter Ellipsoid-Point defined in 3GPP TS36.355. The first/leftmost bit of the first octet contains the most significant bit. |
| ellipsoidPointWithAltitude |
| Parameter EllipsoidPointWithAltitude defined in 3GPP TS36.355. The first/leftmost bit of the first octet contains the most significant bit. |
| ellipsoidPointWithAltitudeAndUncertaintyEllipsoid |
| Parameter EllipsoidPointWithAltitudeAndUncertaintyElllipsoid defined in 3GPP TS36.355. The first/leftmost bit of the first octet contains the most significant bit. |
| ellipsoidPointWithUncertaintyCircle |
| Parameter Ellipsoid-PointWithUncertaintyCircle defined in 3GP P TS36 .355. The first/leftmost bit of the first octet contains the most significant bit. |
| ellipsoidPointWithUncertaintyEllipse |

TABLE 1-continued

Parameter EllipsoidPointWithUncertaintyEllipse defined in 3GPP TS36.355.
The first/leftmost bit of the first octet contains the most significant bit.
gnss-TOD-msec Parameter Gnss-TOD-msec defined in 3GPP TS36.355. The first/leftmost bit of
the first octet contains the most significant bit.
horizontalVelocity Parameter HorizontalVelocity defined in 3GPP TS36.355. The first/leftmost bit
of the first octet contains the most significant bit.
polygon Parameter Polygon defined in 3GPP TS36.355. The first/leftmost bit of the first
octet contains the most significant bit.

If there is the path information configured by the navigation that is one of the apps installed in the terminal 100, the terminal 100 may transmit an indicator for indicating whether a low-latency operation can be supported in transmitting the terminal information at operation 101. For example, if there is the path information configured by the navigation that is one of the apps installed in the terminal 100, the terminal 100 may transmit the indicator in a state where the terminal 100 indicates whether the low-latency operation support is possible.

As described above, it is exemplified that the terminal uses a navigation app. However, even in the case where the path information of the terminal can be grasped using a radio signal rather than the navigation app, the terminal 100 can transmit the terminal information determined based on the radio signal at operation 101.

On the other hand, in the case of using a long-term evolution (LTE) system as an embodiment of a method for transmitting the terminal information at operation 101, the following operation may be performed. The terminal may transmit user equipment (UE) assistance information, sidelink UE information, or UE capability information to the BS. In the case where the terminal transmits the UE assistance information, the sidelink UE information, or the UE capability information, at least one of the path information, an indicator for indicating whether the path information is used, and an indicator for indicating whether a low-latency operation can be supported may be included in the information to be transmitted.

As another embodiment using the LTE system, the terminal may transmit UE information for using the sidelink to the BS after receiving the system information for the sidelink from the BS. In the case where the terminal transmits the UE information for using the sidelink, at least one of the path information, the indicator for indicating whether the path information is used, and the indicator for indicating whether the low-latency operation can be supported may be included in the UE information to be transmitted. The UE information for using the sidelink and the path information, the indicator for indicating whether the path information is used, or the indicator for indicating whether the low-latency operation can be supported may be transmitted using the UE assistance information, the sidelink UE information, or the UE capability information.

If the terminal information is received from the terminal 100, the serving BS 110, at operation 102, may transmit terminal configuration information to the terminal 100. For example, in the case of the LTE system, the terminal configuration information may be included in radio resource control (RRC) connection reconfiguration.

As an embodiment of the present disclosure, if the path information is usable after the serving BS 110 checks the terminal information at operation 101, the terminal configuration information may include zone information determined based on the path information transmitted by the terminal 100.

As an example, although not illustrated, the terminal 100 may transmit the path information generated by navigation through which a departure point and destination has been determined to a server that manages the zone through the serving BS 110. Further, the server that manages the zone may be the serving BS 110. The server that manages the zone may know in advance information of BSs existing in the movement path of the terminal 100 using the path information sent by the terminal 100. The server that manages the zone may generate BS groups through a pre-path zone and a handover zone through the movement path information of the terminal 100. The pre-path zone is a zone in which bearers can be connected in advance to BSs that may be target BSs, and the handover zone is a zone in which the terminal 100 is actually connected to a target BS. If the pre-path zone and the target zone are determined, the server that manages the zone may transfer the determined information to the terminal 100.

The terminal may set a bearer with a target BS in advance using the pre-path zone and the target zone, and may perform a handover to the target BS. The serving BS 110 may transfer target BS information of the pre-path zone of the terminal 100 and target BS information of a handover zone. Further, the serving BS 110 may transfer the target BS information of the pre-path zone of the terminal 100. In the latter case, the target BS of the handover zone may be determined by determination conditions of the terminal 100.

The target BS information of the pre-path zone may include resource pool information. If the handover zone is determined, the terminal 100 may perform data transmission/reception in the target BS using the resource pool information. Further, the target BS information of the pre-path zone may include the resource pool information to be used for data transmission/reception until connection configuration to the target BS of the handover zone is completed after the terminal 100 receives a handover instruction message from the serving BS 110.

Terminal configuration information 102 may include the resource pool information to be used by the terminal 100 in a cell of the serving BS 110 based on the zone. Further, the terminal configuration information 102 may include the resource pool information to be used by the terminal 100 while a handover is performed based on the zone. The resource pool information to be used while the handover is performed may be used for packet transmission/reception until the terminal 100 transmits a connection completion signal to target BSs 120 to 140 after receiving a handover instruction signal from the serving BS 110.

If the terminal 100 is unable to use path information based on an app or a radio signal, that is, if the terminal 100 does not transmit the path information through terminal information at operation 101 or if the terminal 100 configures "indicator for indicating whether the path information is used=none" or "indicator for indicating whether a low-latency operation can be supported=negative," the serving BS 110 may include information for causing the terminal 100 to measure the distance in the terminal configuration information to be transmitted.

For example, if network synchronizations between the serving BS 110 and adjacent BSs 120, 130, and 140 coincide with each other, the terminal 100 can measure the distance to the target BS using time alignment. If the network synchronizations between the serving BS 110 and the adjacent BSs coincide with each other, the serving BS 110 may include network synchronization/non-synchronization information in the terminal configuration information 102 to be transmitted to the terminal 100.

As another example, if the serving BS 110 supports a positioning function, for example, if the serving BS 110 can grasp the location of the terminal 100 through a positioning reference signal of an LTE system, the serving BS 110 may include information on whether the positioning reference signal can be used in the terminal configuration information to be transmitted to the terminal 100.

Further, the serving BS 110 may include period information for the terminal 100 to transfer the distance information of the terminal to the serving BS 110 in the terminal configuration information to be transmitted by the serving BS 110. Further, the distance information of the terminal may include a distance to the target BS measured using the positioning reference signal.

As an example of the period information, a transmission period value determined in accordance with a speed (e.g., in the case of 60 km/h, terminal distance information is transmitted per 100 msec, whereas in the case of 120 km/h, the terminal distance information is transmitted per 50 msec) may be included in the terminal configuration information. As another example, the period may be determined based on an event. For example, if the terminal distance information measured by the terminal 100 is equal to or smaller than a threshold value that is received from the serving BS 110, the transmission can start. Further, if the distance to the serving BS 110 that is measured by the terminal 100 is equal to or smaller than the threshold value and the distance to the target BSs 120, 130, and 140 is equal to or larger than the threshold value, the transmission can start. Further, if the signal of the serving BS 110 that is measured by the terminal 100 is smaller than the threshold value received from the serving BS 110, the transmission can start. Further, if the signal of the serving BS 110 that is measured by the terminal 100 is lower than the threshold value received from the serving BS 110 and signals of the target BSs 120, 130, and 140 are higher than the threshold value, the transmission can start.

If time when the terminal 100 transmits the distance information based on the event is determined, the terminal 100 may transmit the distance information through a method for once transmitting the distance information when the event occurs or for periodically transmitting the distance information from the event occurrence time.

In the periodic transmission method or the event based transmission method, the distance information transmission end time may be indicated by the BS, and if it is equal to or smaller than a threshold value transferred from the BS, the transmission of the distance information may be ended. As an example, the threshold value may be the minimum distance between the BS and the terminal.

The terminal 100 may measure relative distances between the target BSs 120, 130, and 140 and the terminal 100 using the terminal configuration information.

The terminal 100 may determine the distance information transmission time through the terminal configuration information transmitted by the serving BS 110. At operation 103, the terminal 100 may transmit the distance information to the serving BS at a determined time.

For example, the terminal 100 may periodically transfer the distance information at a start time determined by the serving BS 110, or if a specific event is satisfied (it is determined based on the minimum time information in which the distance information 103 arrives at the serving BS 110), the terminal 100 may periodically transfer the distance information 103. The terminal configuration information 102 may include at least one of an indicator indicating whether to periodically transfer the distance information, an indicator indicating whether to periodically transfer the distance information in the case where a specific event is satisfied, start time information for transferring the distance information, end time information for transferring the distance information, and an indicator indicating whether to transfer the distance information in the case where a specific event is satisfied.

The information to be transmitted to the serving BS 110 after the terminal 100 determines to transmit the distance information to the serving BS may include at least one of distance information to the BS, an identifier indicating the BS, and terminal speed.

For example, the distance information may be a relative distance value to the target BSs 120, 130, and 140 (e.g., 100 m or 120 m), and may be a class (e.g., near, middle, or far) relatively indicating the distance.

The identifier indicating the target BS 120, 130, or 140 may be a radio identification (ID) of the BS (e.g., PHYCel-lID) or a network ID (e.g., electrocardiographic imaging (ECGI)).

Further, information indicating the speed of the terminal 100 may be an actual speed value (e.g., 60 km/h or 120 km/h) of the terminal, and may be a class (e.g., low, medium, or high) indicating the speed.

In the case of an LTE system, signaling for the distance information transfer of the terminal 100 may include, for example, a measurement report, sidelink UE information, UE capability information, or UE assistance information.

After the terminal 100 transfers the distance information to the serving BS 110, at operation 104, the serving BS 110 may determine a candidate BS to which the terminal performs a handover based on the distance information and/or a candidate BS for which the terminal should pre-configure a bearer to perform data transmission/reception after the handover.

For example, the serving BS 110 may determine the target BS 120, 130, or 140 within the closest distance as the candidate BS through comparison of the distance information of the target BSs 120, 130, and 140 included in the distance information at operation 104.

If the speed of the terminal 100 is included in the distance information transmitted by the terminal 100, the serving BS 110 may determine the candidate BS in consideration of the speed of the terminal 100. In an embodiment of FIG. 1A, for example, target 1 120 and target 2 130 may be determined as the candidate BSs of the terminal.

After determining the candidate BSs, at operation 105, the serving BS 110 may perform bearer pre-configuration with the BSs (target BS_1 120 and target BS_2 130) selected as the candidate BSs.

For the bearer pre-configuration, the serving BS 110 may transfer bearer information of the terminal 100 that is configured by the serving BS 110 to the candidate BSs 120 and 130. The candidate BSs 120 and 130 may configure the bearer based on the bearer information configured by the serving BS, and then may include the bearer information of the candidate BSs 120 and 130 or information (e.g., target BS identifier) of the candidate BSs 120 and 130 in the bearer to be transferred to the serving BS 110.

The serving BS 110 may exchange the resource pool information, which is to be used while the terminal 100 performs a handover to the candidate BSs 120 and 130, with the candidate BSs 120 and 130.

At operation 106, the serving BS 110 may transfer the information of the candidate BSs 120 and 130 that is transferred thereto through the bearer pre-configuration task to the terminal 100 as target BS information. The serving BS 110 may transfer the resource pool information, which is to be used while the terminal 100 performs the handover, to the terminal 100. The resource pool information may be configured per candidate BS 120 or 130. The target BS information and the resource pool information per candidate BS may be included in an RRC connection reconfiguration message to be transferred.

The target BS information may include target BS identifiers for identifying the candidate BSs 120 and 130.

If the handover condition is satisfied, the terminal 100 may perform the handover through selection of one of the candidate BSs 120 and 130 as a new serving BS. While performing the handover through selection of one of the candidate BSs 120 and 130 as the new serving BS, the terminal 100 may perform data transmission/reception using the received resource pool information. As an example, the serving BS 110 may determine the resource pool information to be used by the terminal 100 based on the distance information of the terminal 100. The resource pool information may be included in the RRC connection reconfiguration message to be transferred.

Although the LTE system has been exemplified, the present disclosure can also be applied even to the next-generation communication system, such as fifth generation (5G).

Referring to FIGS. 1B to 1E below, various examples for measuring the distance between the terminal and the target BSs to select the target BS for the handover will be described.

FIG. 1B is a diagram illustrating a method for measuring a distance using timing alignment information according to an embodiment of the present disclosure.

Referring to FIG. 1B, synchronization may be performed between the serving BS 110 and the target BSs 120 and 130 through a BS synchronization procedure at operation 201 according to an embodiment of the present disclosure.

For example, in order to perform BS synchronization, the serving BS 110 may transmit information of the serving BS 110 (e.g., subframe information) to the target BSs 120 and 130, and thus the target BSs 120 and 130 may match a subframe boundary with the serving BS 110. As another example, in order to perform the BS synchronization, the serving BS and the target BSs 120 and 130 may use GPS/GNSS.

Referring to FIG. 1A, the terminal 100 can know whether distance measurement using the timing alignment is possible based on the terminal configuration information received from the serving BS 110.

If the terminal 100 determines to measure the distance through the timing alignment, the terminal 100 may transmit a timing information request to the serving BS 110 at operation 202, and may receive timing information from the serving BS 110 at operation 203.

In the case of an LTE system, the timing information request can be made through a random access operation. Through a random access preamble sent by the terminal 100, the serving BS 110 can know uplink timing with the terminal 100. After confirming the uplink timing, the serving BS 110 may determine the timing alignment based on the uplink timing. The determined timing alignment information may be transmitted from the serving BS 110 to the terminal 100 through a random access response (RAR) message.

At operation 204, the terminal 100 may acquire a downlink propagation delay time between the serving BS 110 and the terminal 100 through confirming of respective reference signals that are transmitted by the serving BS 110 and the target BSs 120 and 130. The terminal 100 may also acquire downlink propagation delay time between the target BSs 120 and 130 and the terminal 100.

At operation 205, the terminal 100 may acquire the uplink timing for the target BSs 120 and 130 and may calculate the distance information using the downlink propagation delay time measured between the serving BS 110 and the target BSs 120 and 130.

For example, the terminal 100, which has acquired the downlink propagation delay time between the serving BS 110 and the target BSs 120 and 130, may know how much the timing with the target BSs 120 and 130 is twisted through a difference in downlink propagation delay time between the target BSs 120 and 130 and the serving BS 110.

Through this, the terminal 100 may determine the timing alignment with the target BSs 120 and 130 by performing correction through comparison with the timing alignment acquired from the serving BS 110.

As an example of a correction method, if it is assumed that the timing alignment of the serving BS 110 is TA source, the downlink propagation delay time of the serving BS 110 is T1, and the downlink propagation delay time of the target BS 120 is T2, the terminal can acquire the timing alignment of the target BS 120 through (TA source−2(T1−T2)). The terminal may calculate the distances to the target BSs 120 and 130 using the determined timing alignment information with the target BSs 120 and 130. For example, in the case of an LTE system, if the timing alignment with the target BS 120 is '1', it may represent time of 0.5208 ns.

Based on this, the distance between the target BS 120 and the terminal 100 may be calculated as about 80 m.

The terminal 100 may report the measurement result of the distance to the target BSs 120 and 130 measured according to the embodiment of FIG. 1B to the serving BS 110. The serving BS 110 may select handover candidate BSs of the terminal based on the measurement report and perform bearer pre-configuration. According to the embodiment of FIG. 1B, the serving BS 110 may select the handover candidate BSs based on the distance to the target BS distance. As an example, the serving BS 110 may select the nearest BS to request the bearer pre-configuration. As another example, the serving BS 110 may select a BS to which the distance is equal to or smaller than a threshold value to request the bearer pre-configuration. The serving BS 110 may transfer information of the selected target BSs 120 and 130 to the terminal 100, and the terminal 100 may perform a handover to one of the target BSs 120 and 130.

FIG. 1C is a diagram illustrating a case where a BS calculates a distance through signal measurement information according to an embodiment of the present disclosure.

Referring to FIG. 1C, at operation 301, the serving BS 110 may request distance information (measurement) from the terminal 100, and the terminal 100 may measure the distance information to perform a measurement report operation. Further, the terminal 100 may measure the distance information in accordance with the terminal configuration information received from the BS of FIG. 1A as described above, and may periodically transmit the measurement report. Further, the terminal 100 may measure the distance information if an event condition is satisfied in accordance with the terminal configuration information received from the BS of FIG. 1A, and may start the measurement report.

At operation 301, a distance information request message may be transmitted from the serving BS 110, or may be transmitted to the terminal 100 through a server. In the case of an LTE system, the distance information request message may include, for example, a UE information request message and an RRC connection reconfiguration message.

At operation 302, the terminal 100 may measure reference signals of the serving BS and target BSs based on the distance information request message or the terminal configuration information in FIG. 1A to know whether the distance measurement is possible.

The terminal 100 may know a difference in time between the serving BS 110 and the target BSs 120 and 130 using the respective reference signals transmitted from the serving BS 110 and the target BSs 120 and 130.

For example, in the case of an LTE system, the reference signals are transmitted as positioning reference signals, and the terminal may confirm a reference signal time difference through the positioning reference signals received from the serving BS 110 and the at least one target BS 120 and 130. As another example, in the case of an LTE system, the reference signals are transmitted as sync reference signals, and the terminal may confirm a reference signal time difference through the sync reference signals received from the serving BS 110 and the at least one target BS 120 and 130.

At operation 303, the terminal 100 may include the measured reference signal time difference in signal measurement information to be transmitted to the serving BS 110.

Further, the signal measurement information may be transmitted from the terminal 100 to the server through the serving BS 110. As an example, in the case of an LTE system, the signal measurement information may be included in the measurement report message to be transmitted.

At operation 304, the serving BS 110 may calculate the distances to the target BSs 120 and 130 through the reference signal time difference included in the signal measurement information transmitted by the terminal 100.

Further, if the signal measurement information is transmitted to the server, the server may calculate the distance.

For example, in the case of an LTE system, if the reference signal time difference is indicated as '1', it may be expressed as 32 ns, and thus the distance difference may be calculated as about 10 m.

The serving BS 110 may select target BSs to which the terminal 100 is to perform the handover after calculating the distance difference to the target BSs 120 and 130, and may request the bearer pre-configuration. For example, the serving BS 110 may select the nearest BS to request the bearer pre-configuration. As another example, the serving BS 110 may select a target BS to which the distance is equal to or smaller than a threshold value to request the bearer pre-configuration from the target BS. The serving BS 110 may transfer information of the selected target BSs 120 and 130 to the terminal 100 based on the distance, and the terminal 100 may perform a handover to one of the target BSs 120 and 130.

Figure 1D:
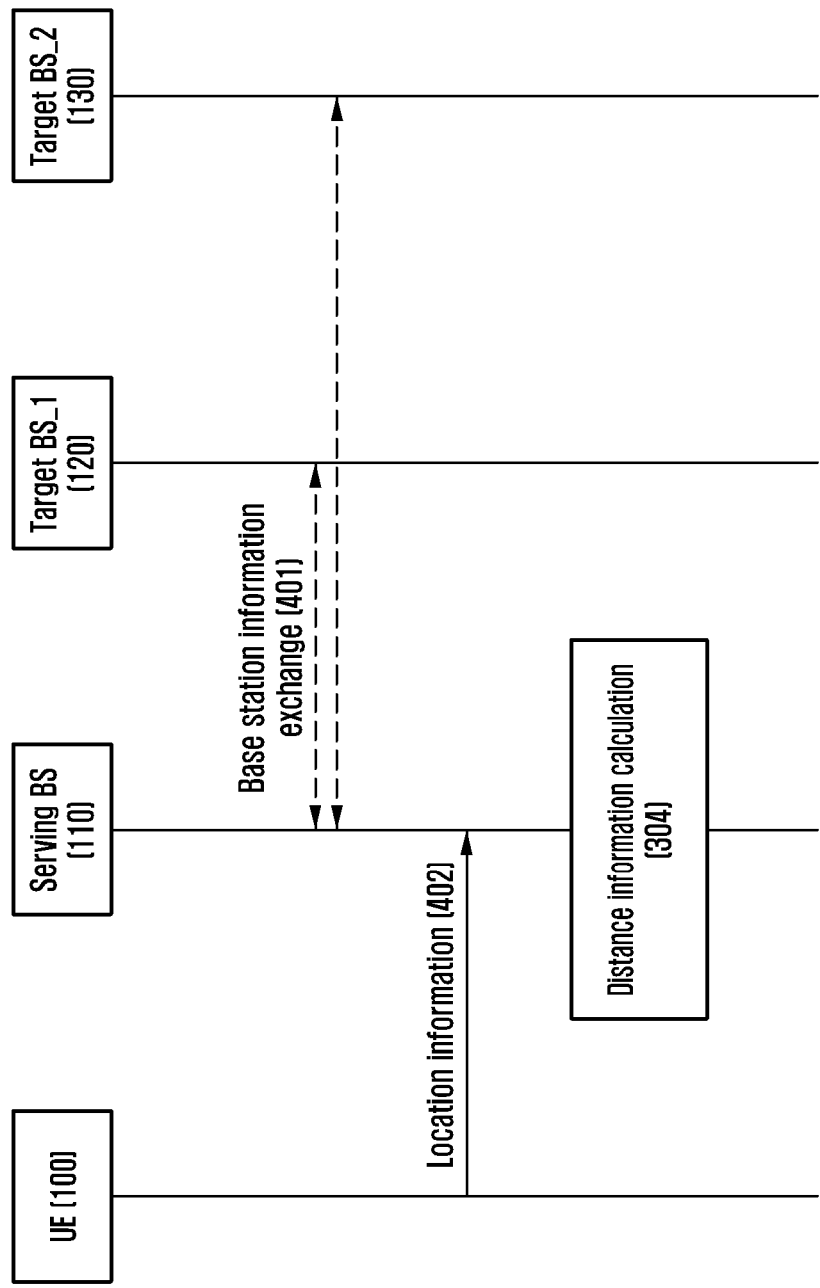
FIG. 1D is a diagram illustrating a case where a terminal transmits a reference signal and a serving BS determines a distance according to a first embodiment of the present disclosure.

FIG. 1D is a diagram illustrating a case where a terminal transmits a reference signal and a serving BS determines a distance according to an embodiment of the present disclosure.

Referring to FIG. 1D, at operation 401, the serving BS 110 may confirm relative distance information or absolute distance information to the target BSs 120 and 130 through BS information exchange at operation 401 with the target BSs 120 and 130.

For example, if absolute location coordinates of the target BSs 120 and 130 are included in BS information exchange messages that are sent by the target BSs 120 and 130 to confirm the relative distance between the BSs, the serving BS 110 may calculate the relative distances using the absolute location coordinates of the serving BS 110 and the target BSs 120 and 130.

At operation 402, the terminal 100 may include information whereby the serving BS 110 can calculate the distance information in location information to be transmitted. The location information may include the absolute coordinates measured by the terminal 100 or message transmission time (time stamp) of the terminal 100. For example, the location information may include information in Table 1 as above. In the case of an LTE system, the location information may be transferred using, for example, an UE assistance information message, a sidelink UE information message, an UE capability information message, or a measurement report message.

Further, the terminal 100 may transmit a pre-configured reference signal as the location information. For example, the terminal 100 may transmit the reference signals using an upward link based on upward reference signal configuration included in the terminal configuration information (see FIG. 1A) sent by the serving BS 110. The upward reference signal configuration information may include time and frequency information for the terminal 100 to transmit the upward reference signal, and may include information on whether to transmit the upward reference signal once or repeatedly in a predetermined section.

At operation 304, if the serving BS 110 receives the location information sent by the terminal 100, it may calculate the distance information between the serving BS 110 and the terminal 100.

After calculating the distance information, the serving BS 110 may request bearer pre-configuration from the target BSs 120 and 130. After calculating the difference in distance to the target BSs 120 and 130, the serving BS 110 may request the bearer pre-configuration through selection of a target BS to which the terminal 100 is to perform the handover. For example, the serving BS 110 may select the nearest BS as the target BS to request the bearer pre-configuration from the target BS. As another example, the serving BS 110 may select a target BS to which the distance is equal to or smaller than the threshold value to request the bearer pre-configuration from the target BS. The serving BS 110 may transfer information of the target BSs 120 and 130 selected based on the distance to the terminal.

Further, the serving BS 110 and the target BSs 120 and 130 may exchange with each other resource pool information to be used while the terminal performs a handover. The serving BS 110 may transfer to the terminal 100 the resource pool information to be used when the handover to the target BSs 120 and 130 is performed. The terminal 100 may perform a handover to one of the target BSs 120 and 130. Further, the serving BS 110 may determine the resource pool to be used by the terminal 100 in a cell of the serving BS 110 based on the distance information of the terminal 100 calculated using the location information.

Figure 1E:
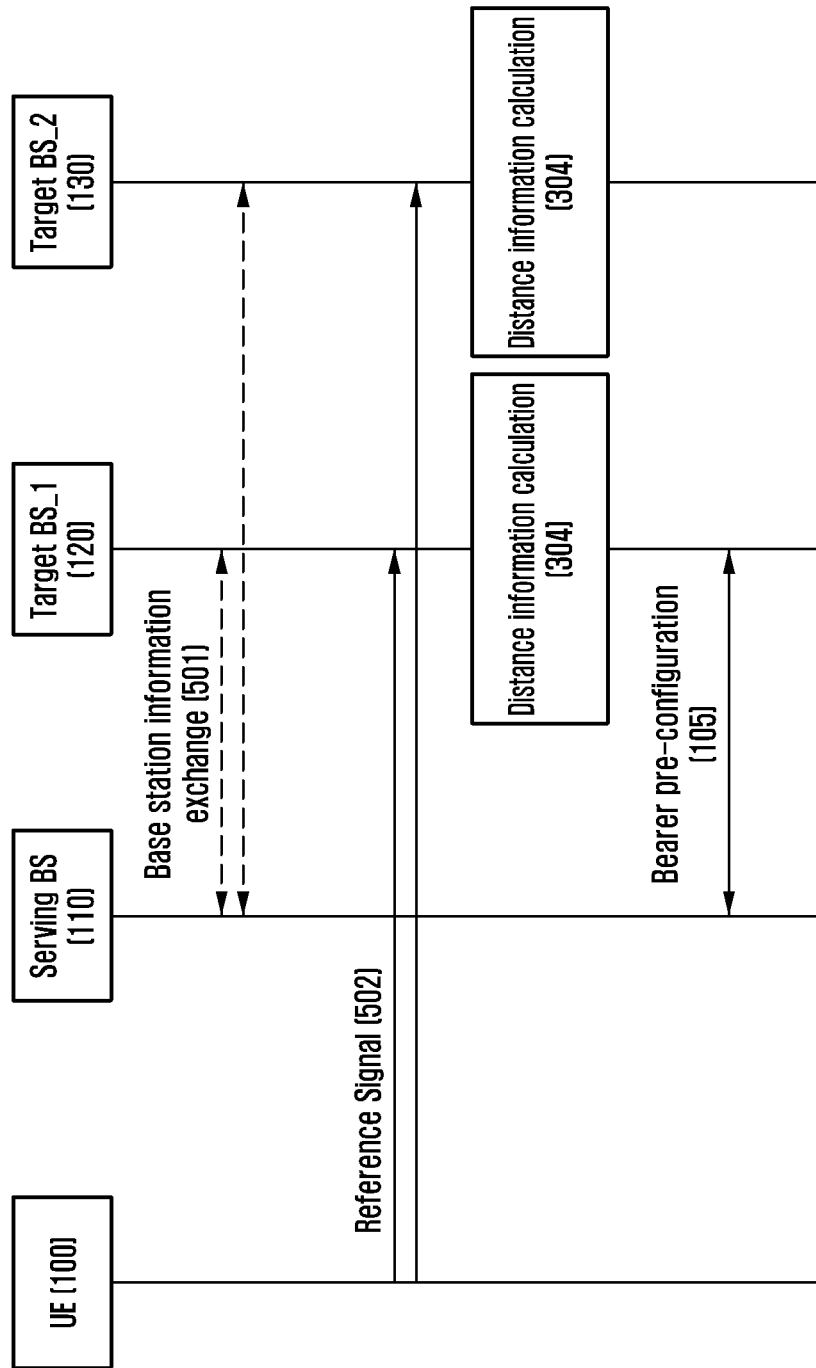
FIG. 1E is a diagram illustrating a case where a terminal transmits a reference signal as an upward signal and a target BS calculates distance information according to a first embodiment of the present disclosure.

FIG. 1E is a diagram illustrating a case where a terminal transmits a reference signal as an upward signal and a target BS calculates distance information according to an embodiment of the present disclosure.

Referring to FIG. 1E, at operation 501, the serving BS 110 may perform BS information exchange with the target BSs 120 and 130. Accordingly, the serving BS information communicating with the terminal 100 may be confirmed by the target BSs 120 and 130. For example, the target BSs 120 and 130 may confirm the serving BS 110 that is currently communicating with the terminal through a BS ID of the corresponding.

In this embodiment, the terminal 100 may transmit a pre-configured reference signal, and the target BSs 120 and 130 may calculate the distance to the terminal 100 based on the reference signal of the terminal 100. At operation 502, the terminal 100 may transmit the reference signal using an uplink based on upward reference signal configuration included in the terminal configuration information (see FIG. 1A) sent by the serving BS 110. The upward reference signal configuration information may include time and frequency information whereby the terminal 100 transmits the upward reference signal, and may include information on whether the terminal 100 transmits the upward reference signal once or repeatedly in a predetermined section.

At operation 304, if the reference signal 402 is received from the terminal 100, the target BSs 120 and 130 may calculate distance information between the target BSs 120 and 130 and the terminal 100.

For example, target BS-1 120 and target BS-2 130 may calculate the distance information to the terminal 100 through the reference signal received from the terminal 100. For example, after measuring the reference signal, the target BS-1 120 may calculate a relative distance between the terminal 100 and the target BS-1 120 using a path loss equation (e.g., including transmission power and reception power). In the case of the transmission power, the terminal may pre-notify of it. In the case of the transmission power, the serving BS 110 may transfer the value that the terminal has reported to the serving BS 110 to the target BS-1 120 and the target BS-2 130. If the distance information is calculated, the target BSs 120 and 130 may determine whether to perform the bearer pre-configuration as at operation 105.

For example, if the distance calculated by the target BS-1 120 is equal to or smaller than a specific threshold value, the target BS-1 120 may perform the bearer pre-configuration for the terminal 100 with the serving BS 110 of the terminal 100 acquired through the BS information exchange.

As another example, the target BS-1 120 and the target BS-2 130 may transmit the distance information calculated through the reference signal received from the terminal 100 to the serving BS 110. The serving BS 110 may determine the BS to perform the bearer pre-configuration for the terminal 100 based on the distance information received from the target BS-1 120 and the target BS-2 130. For example, the serving BS 110 may select the nearest BS as the target BS to request the bearer pre-configuration from the target BS. Further, the serving BS 110 may select the target BS to which the distance is equal to or smaller than the threshold value to request the bearer pre-configuration from the target BS. The serving BS 110 may transfer the information of the target BSs 120 and 130 selected based on the distance to the terminal 100.

The serving BS 110 and the target BSs 120 and 130 may exchange with each other resource pool information to be used while the terminal performs a handover. The serving BS 110 may transfer to the terminal 100 the resource pool information to be used when the handover to the target BSs 120 and 130 is performed. The terminal 100 may perform a handover to one of the target BSs 120 and 130. Further, the serving BS 110 may determine the resource pool to be used by the terminal 100 in a cell of the serving BS 110 based on the distance information of the terminal 100 calculated using the location information.

Figure 1F:
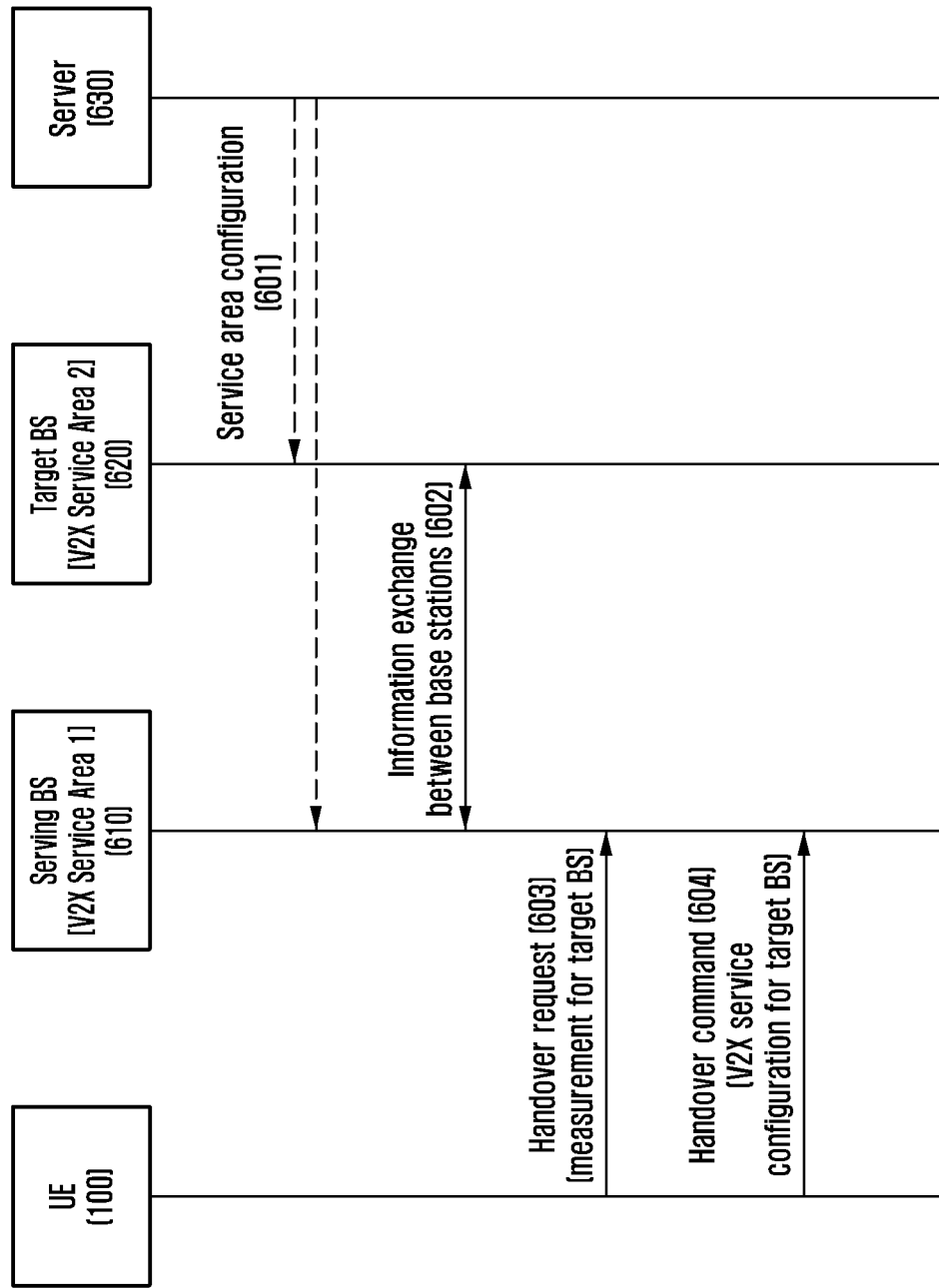
FIG. 1F is a diagram illustrating a method for receiving system information through information exchange between BSs if a service area is changed according to a first embodiment of the present disclosure.

FIG. 1F is a diagram illustrating a method for receiving system information through information exchange between BSs if a service area is changed according to an embodiment of the present disclosure.

Referring to FIG. 1F, if the terminal 100 is changed from a serving BS 610 in service area 1 to a target BS 620 in service area 2, it may receive system information of the target BS 620 through information exchange between the BSs. The system information of the target BS 620 may include an identifier of a service area serviced by the target BS 620 (vehicle to everything (V2X) service area identifier), service area frequency and band information (V2X service area frequency and band), and service resource information (V2X service resource scheduling information).

A server 630 may be at least one of a server (e.g., multimedia broadcast/multicast service (MBMS) gateway a broadcast-multicast service center (BM-SC)) that manages multicast/broadcast for V2X, a server (e.g., in the case of an LTE system, a mobile management entity (MME) or a multi-cell/multicast coordination entity (MCE)) that manages a session between the BSs, and a server that manages a vehicle service and message.

The service area is a unit capable of discriminating between the multicast/broadcast services. For example, in the case of an LTE system, the service area may be discriminated through multicast-broadcast single-frequency network (MBSFN) capable of performing sync transmission for a multi-cell transmission service. Further, the service area may include one or more BSs. In an embodiment of the present disclosure, the service area may correspond to an area in which the V2X multicast/broadcast service is provided through the multicast/broadcast service method. As another embodiment, the service area may be an area, in which the V2X multicast/broadcast service is provided, discriminated in the unit of a zone configured by the BS.

Referring to FIG. 1F, the serving BS 610 and the target BS 620 are discriminated as areas in which different broadcast information (e.g., different real-time streaming broadcasting channels, different V2X service message broadcasts, and different V2X basic security message broadcasts) is serviced. For example, the area in which broadcast channel A is received may be service area 1, and the area in which broadcast channel B is received may be service area 2.

The server 630 may configure the service areas in accordance with V2X broadcast service channel (e.g., service determined by an upper application). The server 630 may manage sessions between the BSs included in the service area per service area. Further, the server 630 may know the BS located in a boundary area in the service area through the location of the BS during configuration of the service areas. For example, in an area in which vehicle collision has occurred, service areas for providing a V2X basic security message service including a vehicle collision message may be configured, and in an area in which traffic jam has occurred, a service area for providing a traffic jam message service may be configured.

Referring to FIG. 1F, at operation 601, the server 630 may provide V2X service information (e.g., in the case of an LTE system, temporary multimedia group identity (TMGI) for V2X or resource information (period and location) for V2X) to the serving BS 610 and the target BS 620 through service area configuration. Further, when the service area configuration information is provided, adjacent BS information of the BS (e.g., BS ID and zone configuration of the BS) may be provided.

At operation 602, if the system information used in the service area is changed, the serving BS 610 and the target BS 620 may send and receive the system information between the BSs through information exchange at operation 602 between the BSs.

As an example of information that may be included as the system information, frequency/band information for receiving multicast/broadcast information for V2X, channel information for receiving the multicast/broadcast information for V2X, and resource information (resource location and resource period) for receiving the multicast/broadcast information for V2X may be included. Further, the system information may include frequency/band information for receiving multicast/broadcast information per V2X zone of the BS, channel information for receiving the multicast/broadcast information per V2X zone of the BS, and resource information (resource location and resource period) for receiving the multicast/broadcast information per V2X zone of the BS.

As an example, a time when the target BS 620 provides information to the serving BS 610 based on an event may be determined. For example, if an event occurs, in which multicast/broadcast system information for V2X is changed in the target BS 620, the target BS 620 may transfer the changed multicast/broadcast system information for V2X of the target BS 620 to the serving BS 610 using the adjacent BS ID information received from the server 630. The event in which the multicast/broadcast system information for V2X is changed in the target BS 620 may include an event in which the V2X zone configuration information is changed.

As another example, the serving BS 610 may periodically request the multicast/broadcast system information for V2X of the target BS 620 from the target BS 620. For example, the serving BS 610 may periodically request the multicast/broadcast system information for V2X of the target BS 620 from the target BS 620 through a predetermined period or a period provided by the server 630 using the adjacent BS ID information received from the server 630. If the request for the multicast/broadcast system information for V2X of the target BS is received from the serving BS 610, the target BS 620 may transfer the multicast/broadcast system information for V2X of the target BS to the serving BS 610. Further, the serving BS 610 may request the multicast/broadcast system information including V2X zone configuration of the target BS from the target BS 620. The target BS 620 may transfer the multicast/broadcast system information including the V2X zone configuration to the serving BS 610.

At operation 603, the terminal 100 may request a handover from the serving BS 610.

If it is determined that the service area of the target BS 620 is different from the service area of the serving BS 610, the serving BS 610, at operation 604, may transmit to the terminal 100 a handover command message that includes the multicast/broadcast system information for V2X of the target BS 620. The handover command 604 message may include the multicast/broadcast system information including the V2X zone configuration.

As an example, in the case of an LTE system, the terminal 100 may measure the signal strength of neighbor BSs, and may transmit a measurement report to the serving BS 610 as a handover request message for determining a handover through the signal strength. If the measurement report is received from the terminal 100, the serving BS 610 may perform handover determination through exchanging of the handover request message with the target BS 620. After the handover is determined, the serving BS 610 may transmit a handover command message to the terminal 100. The serving BS 610 may include the multicast/broadcast system information for V2X of the target BS 620 acquired through information exchange between the BSs in the handover command message, and may transfer the handover command message to the terminal 100.

As another example, the terminal 100 may provide information for determining whether the service area of the target BS 620 is the same as the service area of the serving BS 610 by including location information (e.g., absolute coordinates or zone ID) of the terminal 100 in the measurement report message and explicitly transmitting the corresponding location to the BS. The serving BS 610 may transmit to the terminal 100 the handover command message including information for notifying whether the service area of the serving BS 610 is the same as the service area of the target BS 620. If the service area of the serving BS 610 is different from the service area of the target BS 620, the serving BS 610 may transmit the handover command message including the V2X zone configuration information of the target BS 620.

The terminal 100 may acquire broadcast channel information (e.g., multicast/broadcast resource information for V2X) included in multicast/broadcast service area system information for V2X of the target BS 620 during a handover process through the multicast/broadcast system information for V2X of the target BS 620 included in the handover command message, and if a handover to the target BS 620 is performed, the terminal 100 may receive multicast/broadcast data for V2X in a service area of the target BS 620 using the acquired multicast/broadcast resource information for V2X.

As another example, the terminal 100 may acquire whether the service area of the serving BS is the same as the service area of the target BS through the handover command message, and if the service areas are different from each other, the terminal 100 may acquire the zone configuration information of the target BS. If the handover to the target BS 620 is performed, the terminal may receive the multicast/broadcast data based on the acquired zone configuration information for V2X.

Figure 1G:
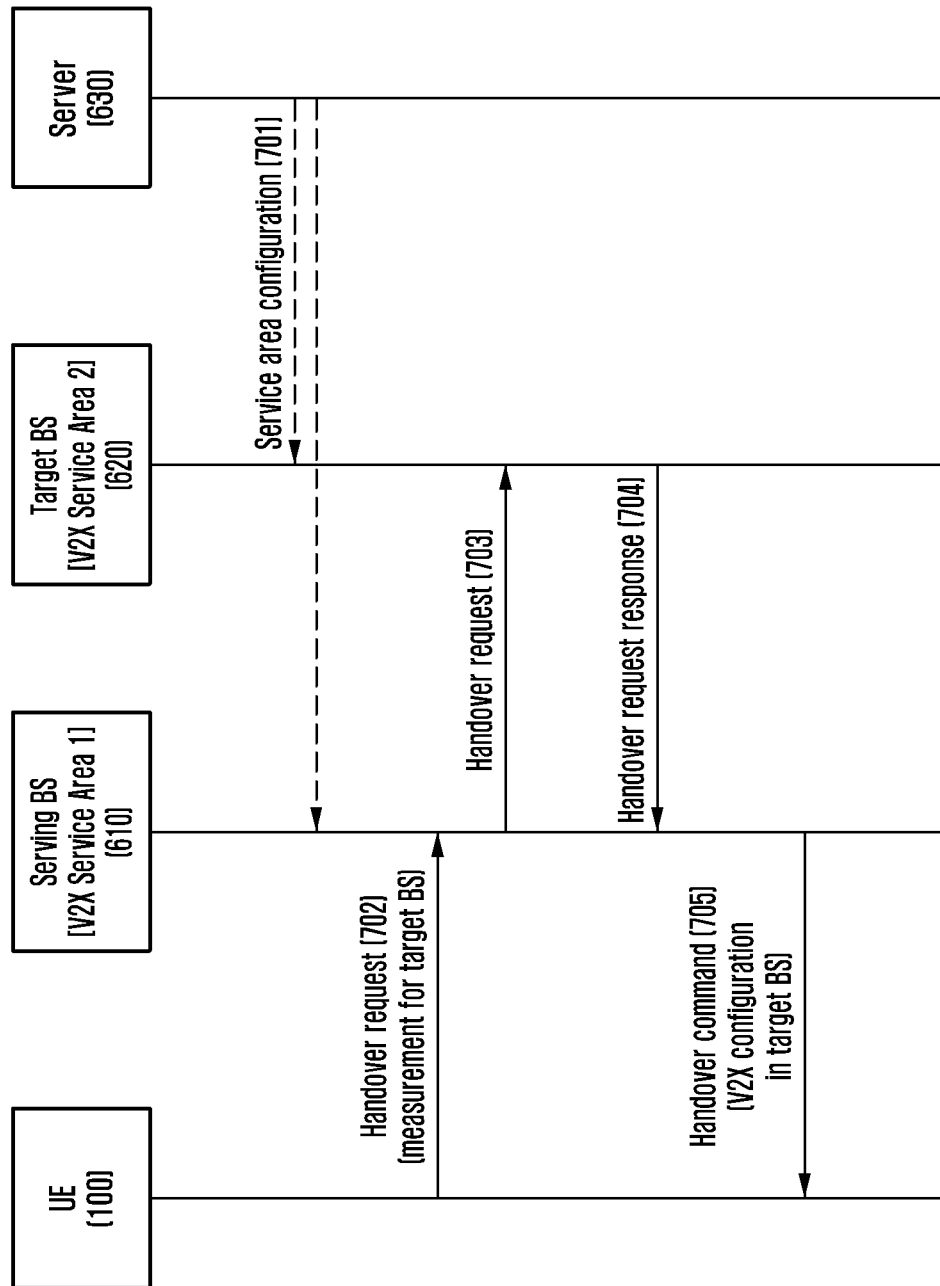
FIG. 1G is a diagram illustrating a method for receiving system information through a handover request if a service area is changed according to a first embodiment of the present disclosure.

FIG. 1G is a diagram illustrating a method for receiving system information through a handover request if a service area is changed according to an embodiment of the present disclosure.

Referring to FIG. 1G, if the terminal 100 performs a handover from a serving BS 610 in service area 1 to a target BS 620 in service area 2, it may receive multicast/broadcast system information for V2X of the target BS 620 through handover request information and handover command information.

A server 630 may be at least one of a server (e.g., multimedia broadcast/multicast service (MBMS) gateway a broadcast-multicast service center (BM-SC)) that manages multicast/broadcast for V2X, a server (e.g., in the case of an LTE system, a mobile management entity (MME) or a multi-cell/multicast coordination entity (MCE)) that manages a session between the BSs, and a server that manages a vehicle service and message.

The service area is a unit capable of discriminating between the multicast/broadcast services for V2X. For example, in the case of an LTE system, the service area may be discriminated through MBSFN capable of performing sync transmission for a multi-cell transmission service. Further, the service area may include one or more BSs. The service area may correspond to an area in which the V2X multicast/broadcast service is provided through the multicast/broadcast service method. Further, the service area may be discriminated in the unit of a zone configured by the BS, and may be subdivided into V2X multicast/broadcast services per zone or partial zone.

Referring to FIG. 1G, the serving BS 610 and the target BS 620 are discriminated as areas in which different broadcast information (e.g., different real-time streaming broadcasting channels, different V2X service message broadcasts, and different V2X basic security message broadcasts) is serviced. For example, the area in which broadcast channel A is received may be service area 1, and the area in which broadcast channel B is received may be service area 2.

The server 630 may configure the service areas in accordance with V2X broadcast service channel (e.g., service determined by an upper application). The server 630 may manage sessions between the BSs included in the service area per service area. Further, the server 630 may know the BS located in a boundary area in the service area through the location of the BS during configuration of the service areas. For example, in an area in which vehicle collision has occurred, service areas for providing a V2X basic security message service including a vehicle collision message may be configured, and in an area in which traffic jam has occurred, a service area for providing a traffic jam message service may be configured.

Referring to FIG. 1G, at operation 701, the server 630 may provide V2X service information (e.g., in the case of an LTE system, temporary multimedia group identity (TMGI) for V2X or resource information (period and location) for V2X) to the serving BS 610 and the target BS 620 through service area configuration. Further, when the service area configuration information is provided, adjacent BS information of the BS (e.g., base station ID) may be provided.

At operation 702, the terminal 100 may request a handover from the serving BS 610, and at operation 703, the serving BS 610 may transfer a handover request message to the target BS 620. The handover request message may include frequency/band information for receiving multicast/broadcast information for V2X of the target BS 620 or information for requesting system information for V2X.

As an example, in the case of an LTE system, the terminal 100 measures the signal strength of neighbor BSs, and may transmit a measurement report to the serving BS 610 as a handover request message. If the measurement report is received from the terminal 100, the serving BS 610 may determine BS change, and then transmit the handover request message to the target BS 620. The handover request message includes bearer information of the serving BS 610, or system information request for the multicast/broadcast service for V2X for receiving the multicast/broadcast service for V2X after movement to the target BS 620.

Further, the terminal 100 may provide information for determining whether the service area of the target BS 620 is the same as the service area of the serving BS 610 by including location information (e.g., absolute coordinates or zone ID) of the terminal 100 in the measurement report message and explicitly transmitting the corresponding location to the BS. If the service area of the target BS 620 is different from the service area of the serving BS 610, the serving BS 610 may pre-transmit service information (e.g., zone configuration and multicast/broadcast resource information) in the target BS 620 to the terminal.

At operation 704, if the handover request message is received, the target BS 620 transmits a handover request response message to the serving BS 610.

As an example, if the target BS 620 receives the handover request message including a request for the multicast/broadcast system information for V2X from the serving BS 610, the target BS 620 may include the multicast/broadcast system information for V2X of the target BS 620 in the handover request response message to be transmitted.

As an example of information that may be included as the system information, channel information for receiving multicast/broadcast information for V2X or multicast/broadcast resource information (resource location and resource period) for V2X may be included.

If the handover request response message is received, the serving BS 610, at operation 705, may transmit the handover command message to the terminal 100. The serving BS 610 may include the handover request and the multicast/broadcast service system information for V2X of the target BS 620 acquired through the handover request response in the handover command message to be transferred to the terminal 100.

The terminal 100 may acquire multicast/broadcast channel information (e.g., resource information) included in service area system information of the target BS 620 during a handover process through the multicast/broadcast service system information for V2X of the target BS 620 included in the handover command message, and if a handover to the target BS 620 is performed, the terminal 100 may receive multicast/broadcast data for V2X in a service area of the target BS 620 using the acquired multicast/broadcast resource information for V2X.

Figure 1H:
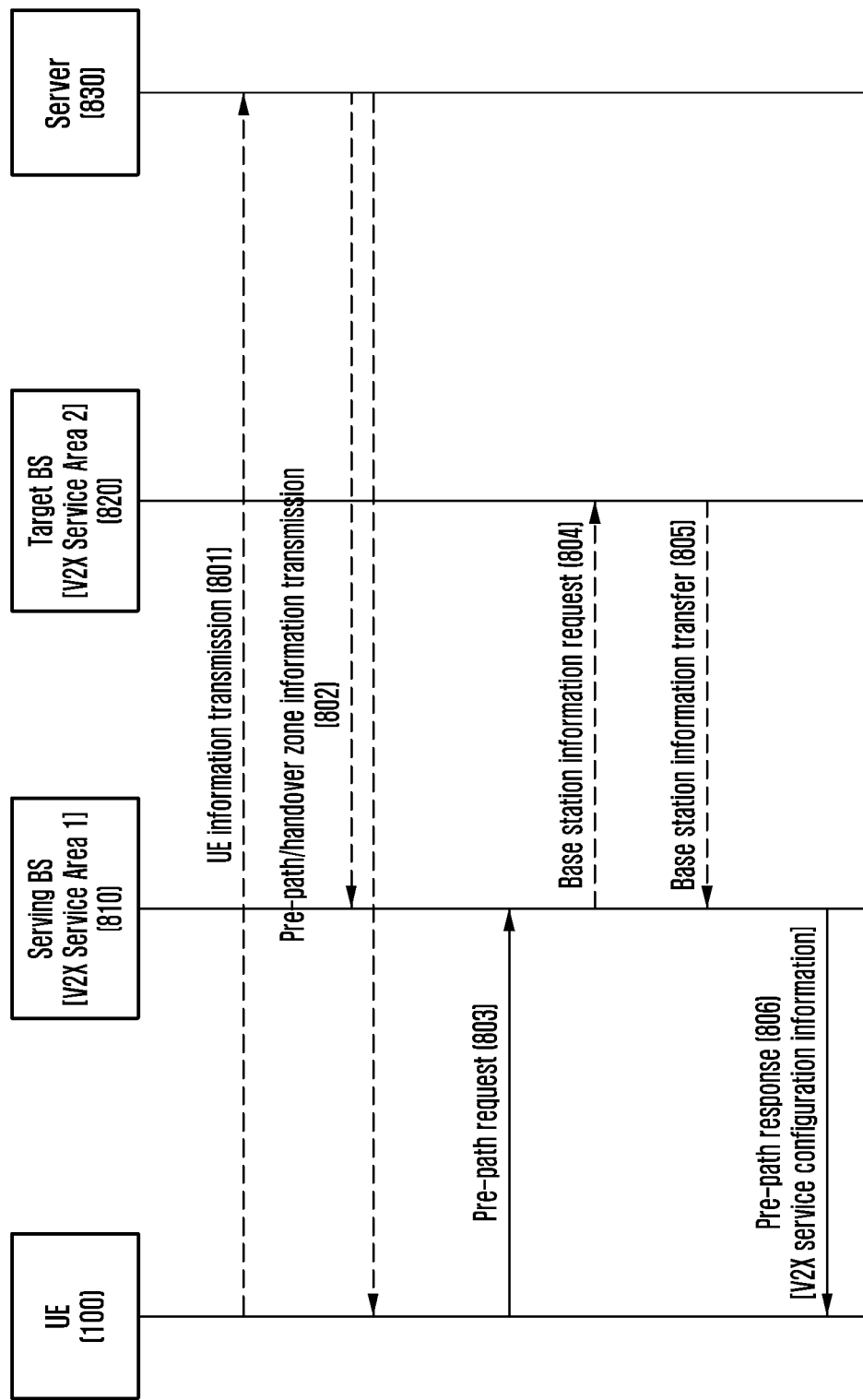
FIG. 1H is a diagram illustrating a method for receiving system information in a pre-path zone if a service area is changed during pre-path/handover zone operation according to a first embodiment of the present disclosure.

FIG. 1H is a diagram illustrating a method for receiving system information in a pre-path zone if a service area is changed during pre-path/handover zone operation according to an embodiment of the present disclosure.

Referring to FIG. 1H, if the terminal 100 is changed from a serving BS 810 in service area 1 to a target BS 820 in service area 2, it may receive multicast/broadcast system information for V2X of the target BS 820 through a pre-path request.

A server 830 may be at least one of a server (e.g., multimedia broadcast/multicast service (MBMS) gateway a broadcast-multicast service center (BM-SC)) that manages multicast/broadcast for V2X, a server (e.g., in the case of an LTE system, a mobile management entity (MME) or a multi-cell/multicast coordination entity (MCE)) that manages a session between the base stations (BSs), and a server that manages a vehicle service and message.

The service area is a BS unit capable of pre-configuring a bearer or a unit capable of discriminating between V2X multicast/broadcast services. For example, in the case of an LTE system, the service area may be discriminated through MBSFN capable of performing sync transmission for a multi-cell transmission service. Further, the service area may include one or more BSs. The service area may correspond to an area in which the V2X multicast/broadcast service is provided through the multicast/broadcast service method.

As an example, the service area may be determined through UE information transmitted by the terminal 100 at operation 801. The UE information may include a movement path of the terminal 100 configured by a navigation, and may include relative distance information to the BS determined by the terminal 100. Further, the UE information may include V2X service information to which the terminal 100 has subscribed.

Referring to FIG. 1H, the serving BS 810 and the target BS 820 are discriminated as areas in which different broadcast information (e.g., different real-time streaming broadcasting channels, different V2X service message broadcasts, and different V2X basic security message broadcasts) is serviced. Further, the corresponding service area may be composed of a pre-path zone. For example, the area in which broadcast channel A is received may be service area 1 as well as pre-path zone 1, and the area in which broadcast channel B is received may be service area 2 as well as pre-path zone 2. Further, the area in which broadcast channel A is received may be service area 1 as well as pre-path zone 1, and the area in which broadcast channel B is received may be service area 2 as well as pre-path zone 1.

The server 830 may configure the service areas in accordance with multicast/broadcast service channel for V2X (e.g., service determined by an upper application). The server 830 may manage sessions between the BSs included in the service area per multicast/broadcast service area for V2X. Further, the server 830 may know the BS located in a boundary area in the service area through the location of the BS during configuration of the service areas.

At operation 802, the server 830 may provide V2X service information (e.g., in the case of an LTE system, temporary multimedia group identity (TMGI) for V2X, resource information (period and location) for V2X), or location information (ex, zone ID, and zone configuration) to the serving BS 810 and the target BS 820 through transmission of pre-path/handover zone information. Further, when the pre-path/handover zone information is transmitted, adjacent BS information (e.g., BS ID) of the BS may be provided.

At operation 803, the terminal 100 transmits a pre-path request message to the serving BS 810 during entering into the pre-path zone. At operation 804, the serving BS 810 transmits a target BS information request to the target BS 820 after receiving the pre-path request message from the terminal 100.

A method for the serving BS 810 to determine the target BS that will transmit the pre-path request is as follows. The serving BS 810 may know what BS is a BS that is located in a boundary portion of the service area (e.g., pre-path/handover zone boundary) through transmission of the pre-path/handover zone information. For example, in the case of configuring the pre-path zone based on a BS absolute location, the server 830 may transfer the pre-path zone information to the serving BS 810 and the target BS 820. Based on the pre-path zone information, the BSs 810 and 820 may determine whether they are BSs located in a boundary portion of the service area. Further, the pre-path/handover zone information may include BS IDs. The serving BS 810 may transmit a BS information request message to the target BS 820 using the BS ID located in the service area boundary area. The BS information request message may include information for requesting the multicast/broadcast service system information for V2X of the target BS 820.

If the BS information request message is received, the target BS 820, at operation 805, transmits a BS information transfer message to the serving BS 810.

For example, if the BS information request message is received from the serving BS 610, the target BS 620 includes the multicast/broadcast service system information for V2X of the target BS 820 in the BS information transfer message to be transmitted.

The multicast/broadcast service system information for V2X may include, for example, channel information for receiving the multicast/broadcast service information for V2X or multicast/broadcast service resource information (resource location or resource period) for V2X.

If the BS information transfer message is received, the serving BS 810, at operation 806, may transmit a pre-path response message to the terminal 100. The pre-path response message may include the multicast/broadcast service system information for V2X of the target BS 820 acquired through BS information request and BS information transfer messages, and may be transferred to the terminal 100.

The terminal 100 may be configured to use multicast/broadcast service channel information (e.g., resource information) for V2X included in the service area system information of the target BS 820 during a handover process through the multicast/broadcast service system information for V2X of the target BS 820 included in the pre-path response message.

Figure 1I:
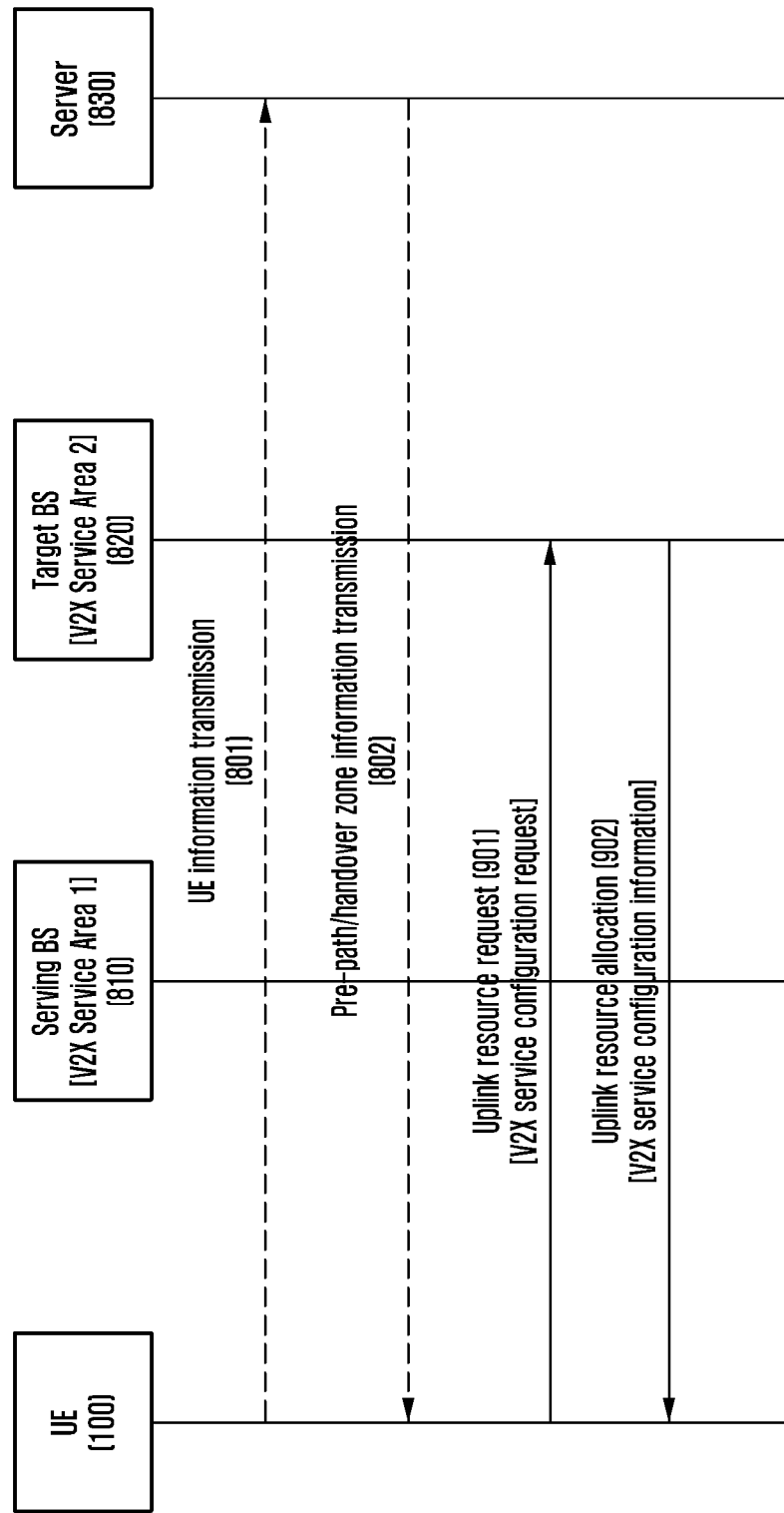
FIG. 1I is a diagram illustrating a method for receiving system information in a handover zone if a service area is changed during pre-path/handover zone operation according to a first embodiment of the present disclosure.

FIG. 1I is a diagram illustrating a method for receiving system information in a handover zone if a service area is changed during pre-path/handover zone operation according to an embodiment of the present disclosure.

Referring to FIG. 1I, if the terminal 100 performs a handover from a serving BS 810 in service area 1 to a target BS 820 in service area 2, it may receive information (e.g., C-radio network temporary identifier (C-RNTI) of the target BS or preamble information of the target BS) that can be used for the handover to the target BS 820 through transmission of pre-path/handover zone information at operation 802.

A server 830 may be at least one of a server (e.g., multimedia broadcast/multicast service (MBMS) gateway a broadcast-multicast service center (BM-SC)) that manages multicast/broadcast for V2X, a server (e.g., in the case of an LTE system, a mobile management entity (MME) or a multi-cell/multicast coordination entity (MCE)) that manages a session between the BSs, and a server that manages a vehicle service and message.

The service area is a BS unit capable of pre-configuring a bearer or a unit capable of discriminating between V2X multicast/broadcast services. For example, in the case of an LTE system, the service area may be discriminated through MBSFN capable of performing sync transmission for a multi-cell transmission service. Further, the service area may include one or more BSs. The service area may correspond to an area in which the V2X multicast/broadcast service is provided through the multicast/broadcast service method. Further, the service area may be discriminated in the unit of a zone configured by the BS, and may be subdivided to provide different V2X multicast/broadcast services per zone or partial zone.

As an example, the service area may be determined through UE information transmitted by the terminal 100 at operation 801. The UE information may include a movement path of the terminal 100 configured by a navigation, and may include relative distance information to the BS determined by the terminal 100.

Referring to FIG. 1I, the serving BS 810 and the target BS 820 are discriminated as areas in which different broadcast information (e.g., different real-time streaming broadcasting channels, different V2X service message broadcasts, and different V2X basic security message broadcasts) is serviced. Further, the corresponding service area may be composed of a pre-path zone. For example, the area in which broadcast channel A is received may be service area 1 as well as pre-path zone 1, and the area in which broadcast channel B is received may be service area 2 as well as pre-path zone 2. Further, the area in which broadcast channel A is received may be service area 1 as well as pre-path zone 1, and the area in which broadcast channel B is received may be service area 2 as well as pre-path zone 1.

The server 830 may configure the service areas in accordance with multicast/broadcast service channel for V2X (e.g., service determined by an upper application). The server 830 may manage sessions between the BSs included in the service area per multicast/broadcast service area for V2X. Further, the server 830 may know the BS located in a boundary area in the service area through the location of the BS during configuration of the service areas.

At operation 802, the terminal 100 may acquire pre-path/handover zone information from the server 830. At operation 901, during entering of a handover zone, the terminal 100 may transmit an uplink resource request message to the target BS 820 using information of the target BS (e.g., preamble of the target BS) obtained from the pre-path/handover zone information. After receiving the uplink resource request message, the target BS 820, at operation 902, may transmit uplink resource allocation information to the terminal 100.

As an example, in an LTE system, the terminal 100 may transmit the uplink resource request information through transmission of a random access preamble message. For example, in the case of using the preamble allocated through a system information transmission request for V2X among random access preambles, the target BS 820 may determine whether to transfer system information for V2X to the terminal 100. The target BS 820 may provide random access response information in response to the random access preamble. The target BS 820 may include the system information for V2X of the target BS 820 in the random access response information to be transferred to the terminal 100.

As an example of V2X information that can be included as the system information, channel information for receiving multicast/broadcast information for V2X or resource information (resource location or resource period) may be included.

The terminal 100 may be configured to receive a multicast/broadcast service for V2X of the target BS 820 through the system information for V2X of the target BS 820 included in the uplink resource allocation message.

Figure 1J:
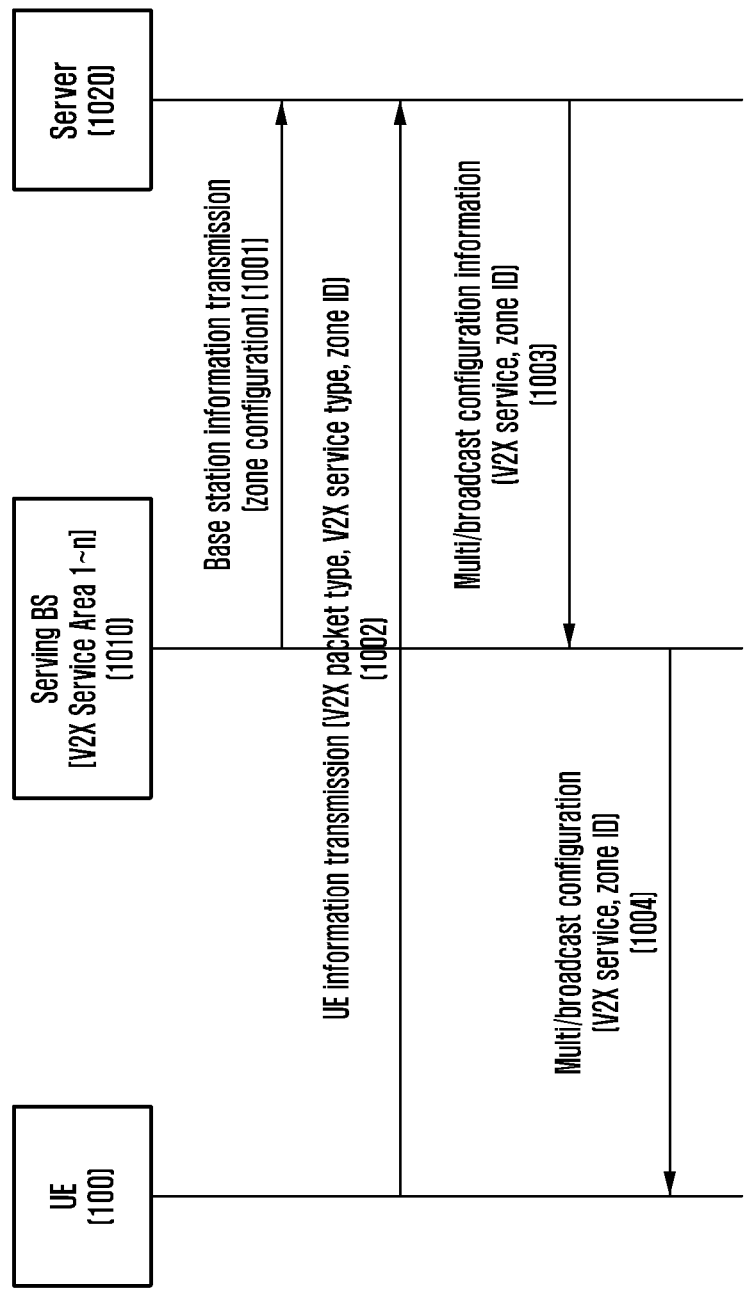
FIG. 1J is a diagram illustrating a method for subdividing and configuring a multimedia broadcast/multicast service (MBMS) service according to a BS zone according to a first embodiment of the present disclosure.

FIG. 1J is a diagram illustrating a method for subdividing and configuring an MBMS service according to a BS zone according to an embodiment of the present disclosure.

Referring to FIG. 1J, at operation 1001, a serving BS 1010 may transmit BS information to a server 1020. Based on the BS information, the server 1020 may provide a multicast/broadcast service for V2X in detail to the serving BS 1010. At operation 1002, the terminal 100 may transmit UE information to the server 1020.

The server 1020 may be at least one of a server (e.g., multimedia broadcast/multicast service (MBMS) gateway a broadcast-multicast service center (BM-SC)) that manages multicast/broadcast for V2X, a server (e.g., in the case of an LTE system, a mobile management entity (MME) or a multi-cell/multicast coordination entity (MCE)) that manages a session between the BSs, and a server that manages a vehicle service and message.

The service area is a BS unit capable of pre-configuring a bearer or a unit capable of discriminating between V2X multicast/broadcast services. For example, in the case of an LTE system, the service area may be discriminated through MBSFN capable of performing sync transmission for a multi-cell transmission service. Further, the service area may include one or more BSs. The service area may correspond to an area in which the V2X multicast/broadcast service is provided through the multicast/broadcast service method. Further, the service area may be subdivided into V2X multicast/broadcast services that are discriminated in the unit of a zone configured by the BS.

An embodiment of a method for configuring a service area is as follows. In order to support a multicast/broadcast service for V2X, the serving BS 1010 may transmit the BS information to the server 1020. The BS information may include a BS ID that has sent the BS information, a zone ID used by the BS, or a method for determining the zone ID (e.g., equation based on a zone width, a zone height, and the number of zones).

Further, the service area may be determined based on UE information transmitted by the terminal 100. The UE information may include a message for V2X generated by the terminal 100 or subscribed V2X service information. The message for V2X generated by the terminal 100 may be discriminated by at least one of a per packet priority value, a logical channel ID, a logical channel group ID, or a V2X service type.

The server 1020 may configure a service area using at least one of the UE information and the BS information. As an example, in the case of an LTE system, the server 1020 may be an MBMS coordination entity (MCE). The server 1020 may determine whether a vehicle safety service is used through the V2X service information included in the UE information. Further, the server 1020 may know area information (ex or zone ID) being used by the BS through the BS information. The server 1020 may configure an MBMS service area to the BS through the UE information or the BS information. For example, subframe period and information may be differently allocated in accordance with different multicast/broadcast services for V2X of the respective BS zones.

At operation 1003, the server 1020 may transfer information configured as different multicast/broadcast services for V2X in accordance with the zone to the serving BS 1010. The multicast/broadcast configuration information may include resource information (ex, subframe location and period) allocated in accordance with the zone, a service ID, or bearer information.

If information configured as a multicast/broadcast service for V2X per zone is received, the serving BS 1010, at operation 1004, transmits configuration information to the terminal 100 so that the terminal 100 can configure the multicast/broadcast service for V2X. In the case of an LTE system, the multicast/broadcast configuration message for the terminal 100 may be transmitted as the system information or may be transferred as an RRC message. Further, as the multicast/broadcast configuration information, resource information (ex, subframe location and period) allocated in accordance with the zone or a service ID may be included.

Figure 1K:
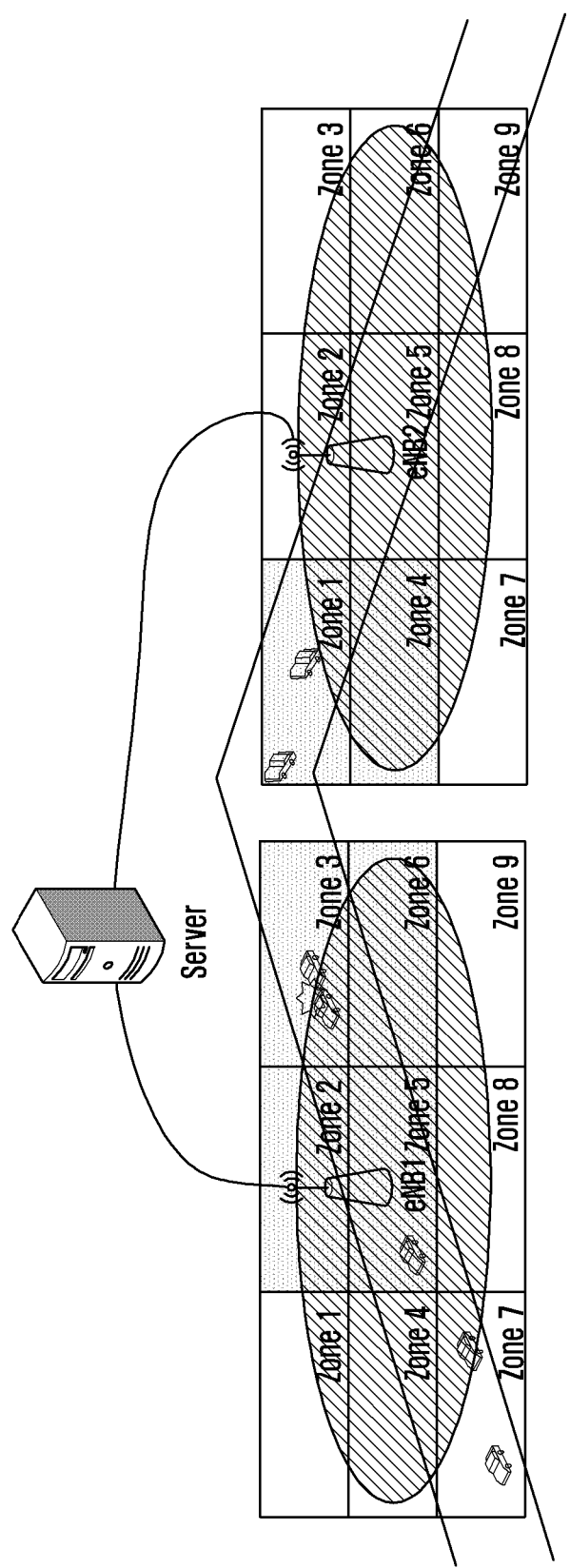
FIG. 1K is a diagram illustrating an example of a method for configuring an MBMS service according to a zone according to a first embodiment of the present disclosure.

FIG. 1K is a diagram illustrating an example of a method for configuring a multimedia broadcast multicast service (MBMS) in accordance with a zone.

A BS may allocate resources or provide multicast/broadcast services for V2X through discrimination of zones. For example, a BS (eNB1) may divide an area into zone 1 to zone 9, and a BS (eNB2) may divide an area into zone 1 to zone 9. The zone may be changed in accordance with situations (e.g., terminal CBR situations), and respective BSs may operate different zone configurations. In the area divided into zones in the BS, multicast/broadcast services for V2X are discriminated per zone through a server (e.g., server for MBMS service configuration). For example, the multicast/broadcast service for V2X in zone 1 of the BS (eNB1) may differ from the multicast/broadcast service for V2X in zone 1 of the BS (eNB2). Further, multicast/broadcast resources for V2X of zones used in the BS may differ from each other. For example, resource location and period used in zone 1 of the BS (eNB1) may differ from resource location and period used in zone 2 of the BS (eNB1).

For example, if it is necessary to transmit a collision notification message among vehicle safety messages in zone 3 of the BS (eNB1) to another zone (e.g., related road), the server may configure zone 2, zone 3, zone 5, and zone 6 of the BS (eNB1) as the same service area. Further, the server may configure zone 1 and zone 4 of the adjacent BS (eNB2) as the same service area. The resource location and period used in zone 3 of the BS (eNB1) may differ from the resource location and period used in zone 1 of the BS (eNB2).

Further, for service continuity of the notification message in the case where the terminal moves from zone 1 of the BS (eNB2) to one of zone 2, zone 3, zone 5, and zone 6 of the BS (eNB1), it is necessary for the terminal to pre-receive zone configuration and resource information of the BS (eNB1). The BS (eNB2) may pre-transfer to the terminal zone configuration of the BS (eNB1) and multicast/broadcast resource information for V2X.

Second Embodiment

The second embodiment of the present disclosure relates to a method for operating a V2X service resource pool based on the location of a V2X terminal in order to heighten reliability of a vehicle communication (connected car or vehicle to everything (V2X)) service in a wireless communication system. The V2X terminal may include a vehicle terminal, a pedestrian terminal supporting a V2X service, or a road side unit (RSU) terminal supporting the V2X service.

Figure 2A:
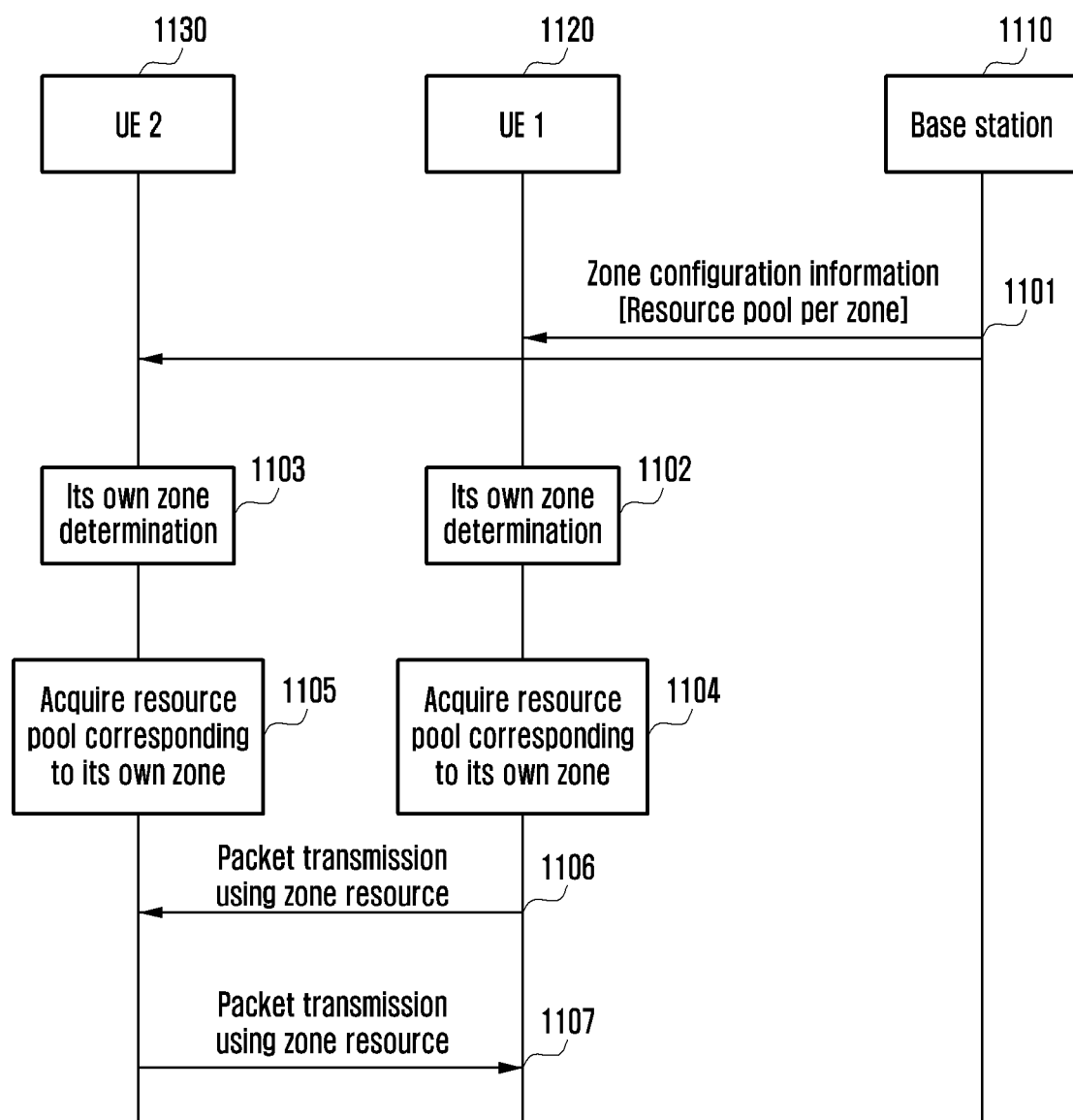
FIG. 2A is a diagram illustrating a vehicle to everything (V2X) packet transmission/reception procedure using a resource pool per zone according to a second embodiment of the present disclosure.

FIG. 2A is a diagram illustrating a V2X packet transmission/reception procedure using a resource pool per zone according to an embodiment of the present disclosure.

Referring to FIG. 2A, at operation 1101, a BS 1110 may transmit zone configuration information to terminals 1120 and 1130. The zone configuration information may include information that is necessary to acquire resource pool information allocated per zone. For example, the zone configuration information may include at least one of a width of a zone basic unit for deriving a zone ID, a length of the zone basic unit, and a resource pool per zone ID. As an example, in an LTE system, the zone configuration information may be transmitted through a system information block (SIB) message. As another example, in an LTE system, the zone configuration information may be pre-configured in the terminal. As still another example, in an LTE system, the zone configuration information may be transmitted through an RRC connection reconfiguration message.

At operations 1102 and 1103, terminal 1 1120 and terminal 2 1130 may determine a zone ID based on the zone configuration information and their own locations. At operations 1104 and 1105, terminal 1 1120 and terminal 2 1130 may determine resource pool information corresponding to the zone ID based on the zone configuration information. At operations 1106 and 1107, terminal 1 1120 and terminal 2 1130 may transmit packets in the acquired resource pool.

Figure 2B:
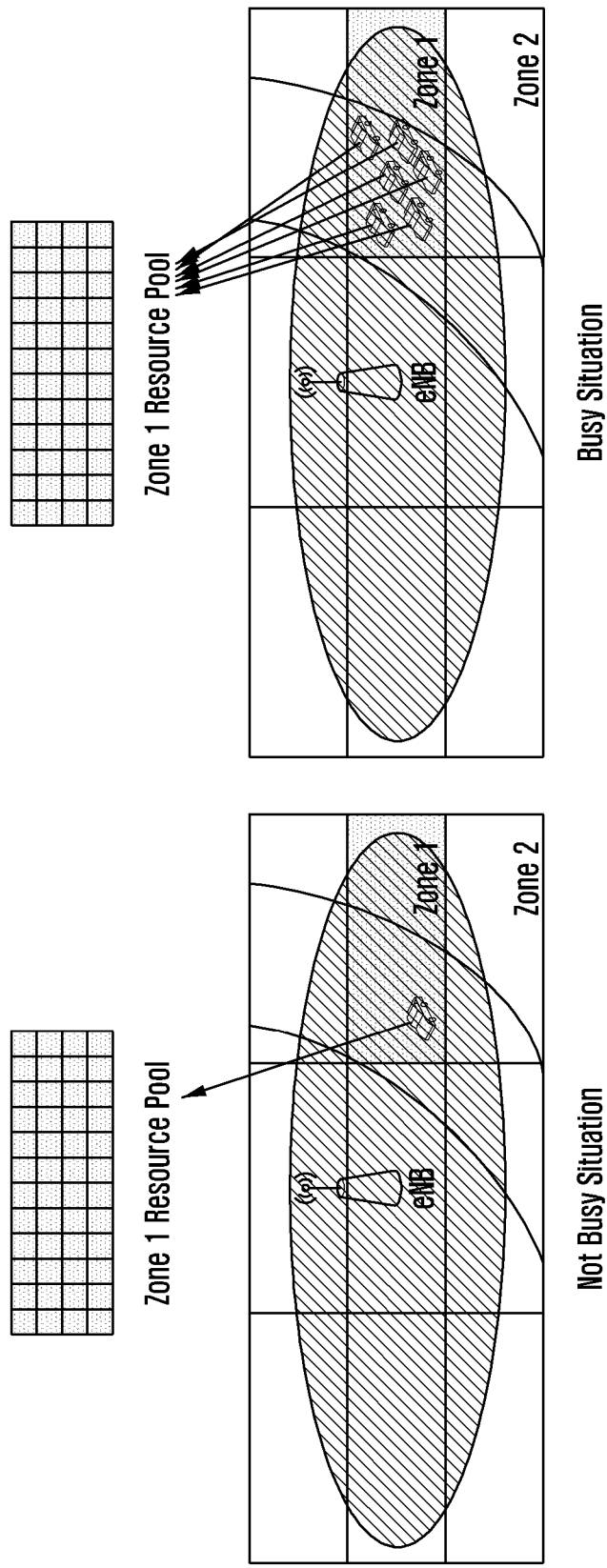
FIG. 2B is a diagram illustrating a channel busy ratio (CBR) state change of zone 1 according to an embodiment of the present disclosure.

FIG. 2B is a diagram illustrating a channel busy ratio (CBR) state change of zone 1 according to an embodiment of the present disclosure.

Referring to FIG. 2B, a resource to be used by the UE located in zone 1 may be determined in accordance with the zone configuration information. If zone 1 is not congested as shown on the left side of FIG. 2B, UEs located in zone 1 may easily acquire transmission resources in a resource pool allocated to zone 1. In contrast, if many UEs are located in zone 1 as shown on the right side of FIG. 2B to cause a CBR situation, contention probability is heightened in the case where UEs located in zone 1 acquire transmission resources in the resource pool allocated to zone 1, and delay may occur in acquiring the resources. If a case corresponding to the right side of FIG. 2B occurs, it is necessary for the BS to perform a resource pool reallocation or resource pool reconfiguration procedure for lowering the CBR situation of zone 1. The BS may receive a report of the busy situation of the zone from the UE using the zone based resource pool so as to perform the resource pool reallocation or resource pool reconfiguration procedure.

In an embodiment of the present disclosure, in the case where the BS configures a zone based resource pool reflecting the resource CBR, a method by the BS for determining the resource CBR is as follows.

In the case where the BS allocates a resource to the terminal, the BS may determine the resource CBR of each zone based on resource allocation request information of the terminal located in each zone. Information used by the BS to determine the resource CBR of each zone may include at least one of a zone ID of the terminal, terminal location (location info), packet information (e.g., logical channel group, logical channel priority, and priority per packet) that the terminal intends to transmit using the resource, resource use amount requested by the terminal, and resource use period requested by the terminal. Based on the resource allocation request information of each terminal, the BS may calculate necessary resources per zone or per packet priority of each zone, and may determine the CBR of the resource allocated to the resource pool of each zone.

As an example, if the ratio of the resource request amount for each zone to the resource allocation amount for each zone is equal to or higher than threshold value A, it may be determined that the zone is busy. In this case, the BS may reconfigure the zone configuration in a direction to lower the zone CBR. Further, if the ratio of the resource request amount for each zone to the resource allocation amount for each zone is lower than threshold value B, it may be determined that the zone is not busy. In this case, the BS may reconfigure the zone configuration in a direction to maximally use the zone resource. In the case where the resource CBR of each zone maintains a value between threshold value B and threshold value A, it may be determined that the zone configuration is proper. As another example, the BS may reconfigure the zone configuration through operating of the CBR threshold value X only. The CBR corresponds to the ratio of the resource request amount for each zone to the resource allocation amount for each zone. If the CBR of each zone is higher than the threshold value X, the BS may determine that the resource of the zone is busy, whereas if the CBR of each zone is equal to or lower than the threshold value X, the BS may determine that the resource of the zone is not busy. The BS, which has calculated the zone CBR based on the CBR threshold value X, may determine whether to reconfigure the zone configuration, and may transmit the reconfigured zone configuration or the existing zone configuration.

In an embodiment of the present disclosure, in the case where the terminal itself selects the resource from the determined resource pool, the BS may determine the resource CBR of the zone through reception of the CBR information report from the terminal. The report of the CBR of the terminal may be performed in the case where the CBR threshold value determined by the BS is satisfied or in the case where the request for the CBR report is received from the BS. The CBR threshold value determined by the BS may be inscribed as threshold value A, threshold value B, or threshold value X. The threshold value A may be determined by the BS or the system based on the CBR value whereby it is determined that the zone monitored by the terminal is busy, and the threshold value B may be determined based on the CBR value whereby it is determined that the zone monitored by the terminal is not busy. The threshold value A and the threshold value B may be included in the zone configuration that is transmitted by the BS. The threshold value X may be determined by the BS or the system based on the CBR value whereby it is determined that the zone monitored by the terminal is busy. The threshold value X may be included in the zone configuration that is transmitted by the BS. The CBR value measured by the terminal may be measured by sensing the resource pool of the zone in which the terminal is located. As an example, the terminal may determine the resource CBR value by measuring the received signal strength indication (RSSI) of the packet DMRS transmitted using the resource pool. As another example, the terminal may determine the resource CBR value by measuring the energy level for the resource pool.

In various embodiments of the present disclosure, the operation of comparing the CBR value with the CBR threshold value may include both a case where the CBR threshold boundary value is included for comparison and a case where the CBR threshold boundary value is excluded for comparison.

As an example, if the zone CBR value of the terminal is larger than the threshold value A, the terminal may report to the BS at least one of a zone ID monitored by the terminal itself, terminal location (location info), indication information for indicating that the zone is busy, and a CBR value of the zone.

As another example, if the CBR report of the zone being used by the terminal is requested by the BS, the terminal may report to the BS at least one of the zone ID monitored by the terminal itself, terminal location (location info), indication information for indicating that the zone is busy, indication information for indicating that the zone is not busy, and CBR value of the zone. In this case, the terminal may determine whether the zone is busy based on the CBR threshold values A and B, and the threshold value X provided by the BS.

Based on the CBR situation of the zone reported by the terminal, the BS may determine to reconfigure the zone configuration, and configures a new zone configuration to be transmitted. If it is determined that the BS does not reconfigure the zone configuration, the BS may transmit the existing zone configuration.

In an embodiment of the present disclosure, an operation for the BS to determine whether to reconfigure the zone configuration using the zone CBR reported by the terminal is as follows.

The BS may receive from the terminal zone information and a resource CBR value for the zone. The BS may calculate the resource CBR value for the zone by gathering resource CBR values received from several terminals that belong to the zone. As an example, the BS may calculate an average of the resource CBR values collected for a time when the resource CBR reports are gathered. If the calculated resource CBR value is equal to or larger than threshold value A, the BS may determine that the zone is busy. If the calculated resource CBR value is equal to or smaller than threshold value B, the BS may determine that the zone is not busy. If the calculated resource CBR value is a value between threshold value A and threshold value B, the BS may determine that the CBR of the zone is proper. Through the above-described method, the BS may calculate the resource CBR values for all zones in the cell. Based on the resource CBR values calculated for all the zones, the BS may reconfigure the zone configuration in a manner that the resource is reduced with respect to the non-busy zone, and the resource is increased with respect to the busy zone.

According to another embodiment, even in the case where the terminal reports a resource busy indicator or a resource non-busy indicator rather than the resource CBR value for the zone, the BS may determine the resource CBR based on the resource busy indicator or the resource non-busy indicator. As an example, the BS may calculate an average of the number of resource busy indicators collected for a time when the resource CBR reports are gathered. The BS may calculate an average of the number of resource non-busy indicators collected for a time when the resource CBR reports are gathered. If the calculated resource CBR value is equal to or larger than threshold value A, the BS may determine that the zone is busy. If the calculated resource CBR value is equal to or smaller than threshold value B, the BS may determine that the zone is not busy. If the calculated resource CBR value is a value between threshold value A and threshold value B, the BS may determine that the CBR of the zone is proper. Through the above-described method, the BS may calculate the resource CBR values for all zones in the cell. Based on the resource CBR values calculated for all the zones, the BS may reconfigure the zone configuration in a manner that the resource is reduced with respect to the non-busy zone, and the resource is increased with respect to the busy zone.

In an embodiment of the present disclosure, if a mode in which the BS allocates a resource to the terminal and a mode in which the terminal itself selects a resource coexist, the BS may measure the resource CBR of the zone in consideration of both the resource CBR determined based on the resource allocation request information of the terminal and the resource CBR reported by the terminal. Further, based on the measured zone resource CBR, the BS may reconfigure or maintain the zone configuration based on the measured zone resource CBR. The operation for the BS to determine the reconfiguration of the zone configuration based on the resource allocation request of the terminal and the resource CBR report of the terminal is as follows.

The BS may calculate the resource CBR values for the respective zones based on the resource allocation request amount of the terminal collected for the time when the resource CBR reports are gathered and the resource CBR value reported by the terminal. For example, the BS may calculate respective averages with respect to the resource allocation request amount of the terminal collected for the time when the resource CBR reports are gathered and the resource CBR value reported by the terminal. The BS may calculate respective averages with respect to the resource allocation request amount of the terminal collected for the time when the resource CBR reports are gathered, the resource busy indicator reported by the terminal, and the resource non-busy indicator reported by the terminal. Based on the resource CBR values calculated for all the zones, the BS may reconfigure the zone configuration in a manner that the resource is reduced with respect to the non-busy zone, and the resource is increased with respect to the busy zone.

Figure 2C:
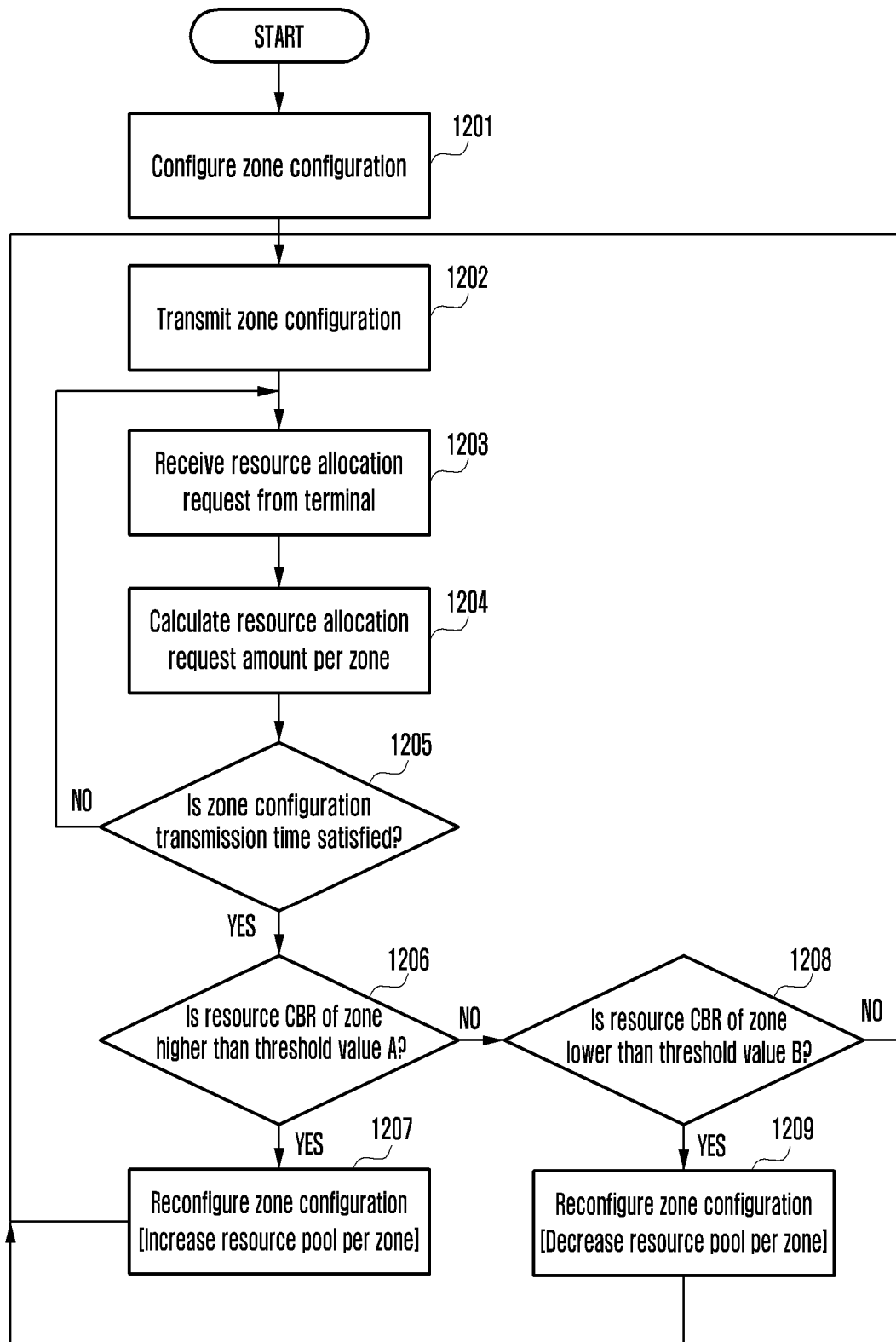
FIG. 2C is a diagram illustrating an example of a BS operation for configuring/reconfiguring CBR based zone configuration according to a second embodiment of the present disclosure.

FIG. 2C is a diagram illustrating an example of a BS operation for configuring/reconfiguring CBR based zone configuration according to an embodiment of the present disclosure.

Referring to FIG. 2C, at operation 1201, the BS configures the zone configuration, and at operation 1202, the BS transmits the zone configuration to the terminal. The zone configuration information may include information that is necessary to acquire resource pool information allocated per zone and a CBR threshold value for triggering a CBR state report for the zone. For example, the zone configuration information may include at least one of a width of a zone basic unit for deriving a zone ID, a length of the zone basic unit, a resource pool per zone ID, and a resource pool use CBR threshold value.

At operation 1203, the BS may receive a resource allocation request from the terminal. The resource request information of the terminal may include at least one of a zone ID of the terminal, terminal location (location info), packet information (e.g., logical channel group, logical channel priority, and priority per packet) that the terminal intends to transmit using the resource, resource use amount requested by the terminal, and resource use period requested by the terminal.

At operation 1204, the BS calculates a resource use amount requested by the terminal with respect to the zone in which the terminal is located. Further, at operation 1205, the BS determines whether a time for transmitting the zone configuration arrives. The time when the zone configuration is to be transmitted may be determined to include a time that is necessary to determine whether to reconfigure the zone configuration and to reconfigure the zone configuration to be transmitted. If the time for transmitting the zone configuration does not arrive, the BS may continuously perform an operation of receiving the resource allocation request from the terminal, and may calculate the resource use amount based on the received resource allocation request.

If the time for transmitting the zone configuration arrives, the BS, at operation 1206, determines whether the resource CBR of the zone based on the calculated resource use amount is equal to or higher than threshold value A. If the resource CBR of the zone is equal to or higher than threshold value A, the BS, at operation 1207, may reconfigure the zone configuration in a direction to increase a resource pool of each zone. As a method for increasing the resource pool of the zone, a method for increasing a resource amount allocated to the zone or a method for increasing the size of the zone may be included. Thereafter, the BS proceeds to operation 1202 to transmit the reconfigured zone configuration to the terminal.

If the resource CBR of the zone is lower than threshold value A, the BS, at operation 1208, may determine whether the zone resource CBR is equal to or lower than threshold value B. If it is determined that the zone resource CBR is equal to or lower than threshold value B, the BS, at operation 1209, may reconfigure the zone configuration in a direction to decrease the resource pool of each zone. As a method for decreasing the resource pool of the zone, a method for decreasing a resource amount allocated to the zone or a method for decreasing the size of the zone may be included. Thereafter, the BS proceeds to operation 1202 to transmit the reconfigured zone configuration to the terminal.

If the resource CBR of the zone is higher than threshold value B, the BS may determine to maintain the current zone configuration. Thereafter, the BS proceeds to operation 1202 to transmit the existing zone configuration to the terminal.

As described above with reference to FIG. 2C, it is first determined whether the resource CBR of the zone is equal to or higher than threshold value A and then it is determined whether the resource CBR of the zone is equal to or lower than threshold value B according to the result of the determination. However, the present disclosure is not limited thereto, but it may be first determined whether the resource CBR of the zone is equal to or lower than threshold value B and then it may be determined whether the resource CBR of the zone is equal to or higher than threshold value A according to the result of the determination.

Figure 2D:
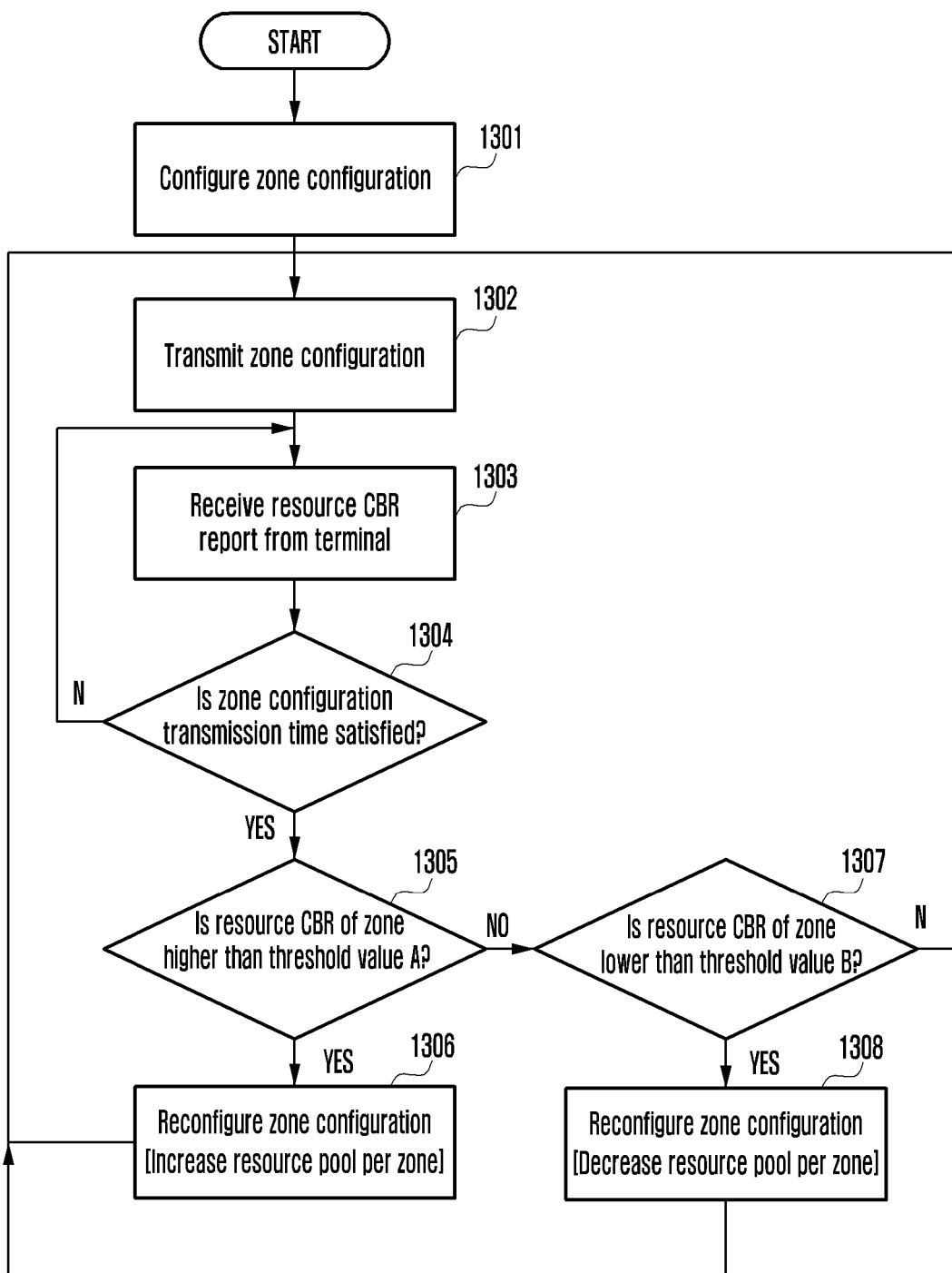
FIG. 2D is a diagram illustrating another example of a BS operation for configuring/reconfiguring CBR based zone configuration according to a second embodiment of the present disclosure.

FIG. 2D is a diagram illustrating another example of a BS operation for configuring/reconfiguring CBR based zone configuration according to an embodiment of the present disclosure.

Referring to FIG. 2D, at operation 1301, the BS configures the zone configuration, and at operation 1302, the BS transmits the zone configuration to the terminal. The zone configuration information may include information that is necessary to acquire resource pool information allocated per zone and a CBR threshold value for triggering a CBR state report for the zone. For example, the zone configuration information may include at least one of a width of a zone basic unit for deriving a zone ID, a length of the zone basic unit, a resource pool per zone ID, and a resource pool use CBR threshold value. At operation 1303, the BS may receive from the terminal a resource CBR report for the zone being monitored by the terminal.

Then, at operation 1304, the BS may determine whether a time for transmitting the zone configuration arrives. The time when the zone configuration is to be transmitted may be determined to include a time that is necessary to determine whether to reconfigure the zone configuration and to reconfigure the zone configuration to be transmitted. If the time for transmitting the zone configuration does not arrive, the BS may continuously perform an operation of receiving the CBR for the zone from the terminal within the cell.

If the time for transmitting the zone configuration arrives, the BS, at operation 1305, determines whether the resource CBR of the zone based on the received CBR information for the zone received from the terminal is equal to or higher than threshold value A. If the resource CBR of the zone based on the received CBR information for the zone is equal to or higher than threshold value A, the BS, at operation 1306, may reconfigure the zone configuration in a direction to increase a resource pool of each zone. As a method for increasing the resource pool of the zone, a method for increasing a resource amount allocated to the zone or a method for increasing the size of the zone may be included. Thereafter, the BS proceeds to operation 1302 to transmit the reconfigured zone configuration to the terminal.

If the resource CBR of the zone is lower than threshold value A, the BS, at operation 1307, may determine whether the zone resource CBR is equal to or lower than threshold value B. If it is determined that the zone resource CBR is equal to or lower than threshold value B, the BS, at operation

1308, may reconfigure the zone configuration in a direction to decrease the resource pool of each zone. As a method for decreasing the resource pool of the zone, a method for decreasing a resource amount allocated to the zone or a method for decreasing the size of the zone may be included. Thereafter, the BS proceeds to operation 1302 to transmit the reconfigured zone configuration to the terminal. If the resource CBR of the zone is higher than threshold value B, the BS may determine to maintain the current zone configuration. Thereafter, the BS proceeds to operation 1302 to transmit the existing zone configuration to the terminal.

Figure 2E:
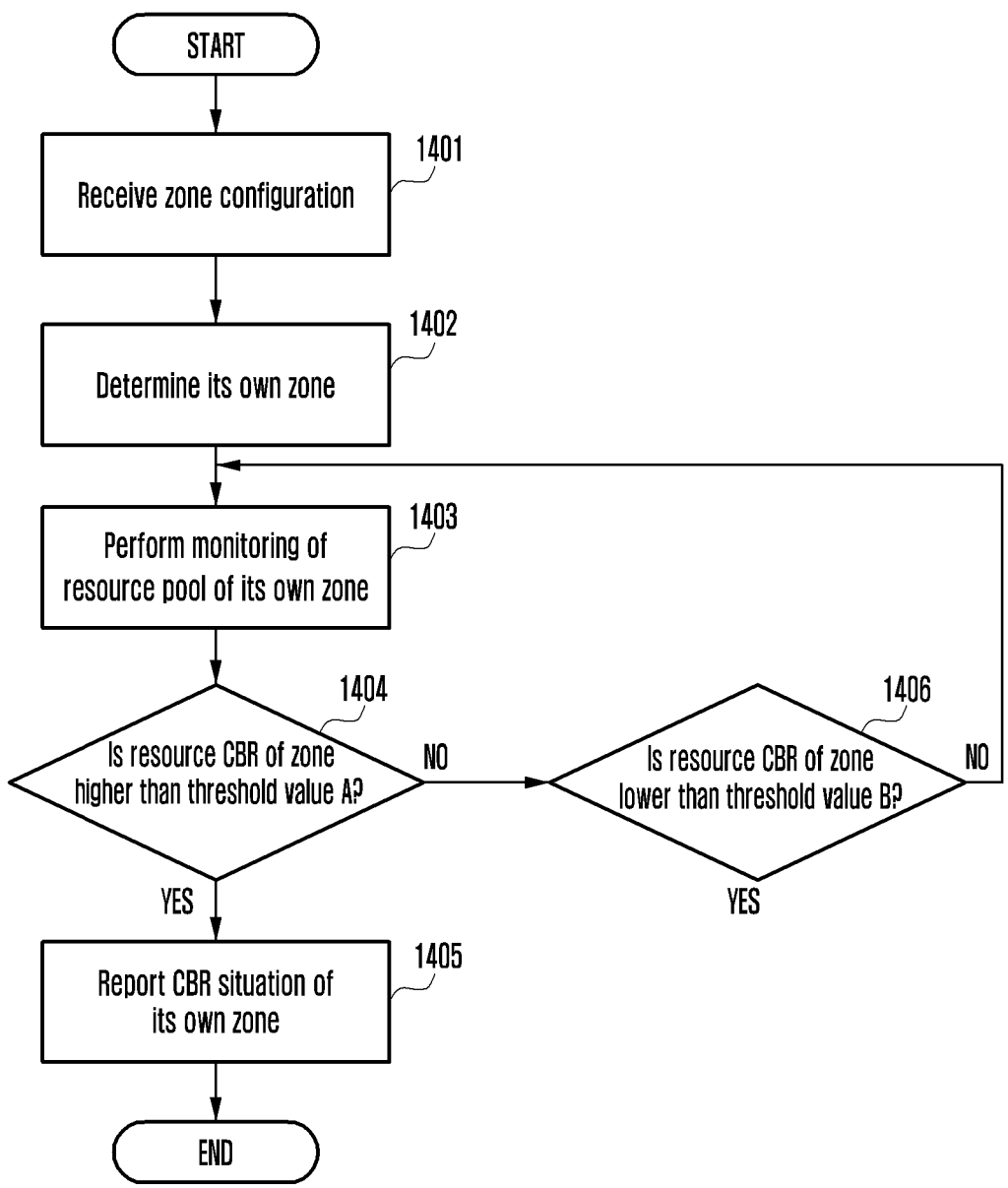
FIG. 2E is a diagram illustrating an example of a terminal operation for reporting a zone CBR according to a second embodiment of the present disclosure.

FIG. 2E is a diagram illustrating an example of a terminal operation for reporting a zone CBR according to an embodiment of the present disclosure.

Referring to FIG. 2E, at operation 1401, the terminal may receive zone configuration information from the BS. The terminal may receive zone configuration information from the BS. The zone configuration information may include information that is necessary to acquire resource pool information allocated per zone and a CBR threshold value for triggering a CBR state report of the zone. The CBR threshold value for triggering the CBR state report may include, for example, threshold value A and threshold value B. Further, the zone configuration information may include at least one of a width of a zone basic unit for deriving a zone ID, a length of the zone basic unit, a resource pool per zone ID, and a resource pool use CBR threshold value. The resource pool use CBR threshold value may include a threshold value used to measure the resource pool use CBR.

At operation 1402, the terminal may determine the zone ID of the terminal from the zone configuration information, and thus may confirm the resource pool allocated to the determined zone ID. At operation 1403, the terminal may monitor the resource pool allocated to the zone. The terminal may measure the CBR of the resource allocated to the zone based on the resource pool use CBR threshold value.

At operation 1404, the terminal may determine whether the CBR of the resource allocated to the zone is equal to or higher than threshold value A. If the resource CBR of the zone is equal to or higher than threshold value, the terminal, at operation 1405, may configure CBR report information for the resource of the zone to transmit the CBR report information to the BS.

At operation 1406, the terminal may determine whether the CBR of the resource allocated to the zone is equal to or lower than threshold value B. If the resource CBR of the zone is equal to or lower than threshold value B, the terminal, at operation 1405, may configure the CBR report information for the zone to transmit the CBR report information to the BS. If the resource CBR of the zone is higher than threshold value B, the terminal proceeds to operation 1403 to continuously perform monitoring of the resource pool allocated to its own zone ID.

As described above with reference to FIG. 2E, it is first determined whether the resource CBR of the zone is equal to or higher than threshold value A and then it is determined whether the resource CBR of the zone is equal to or lower than threshold value B according to the result of the determination. However, the present disclosure is not limited thereto, but it may be first determined whether the resource CBR of the zone is equal to or lower than threshold value B and then it may be determined whether the resource CBR of the zone is equal to or higher than threshold value A according to the result of the determination.

On the other hand, if the zone configuration information is received from the BS, the terminal may determine whether to change the zone configuration information. If the zone configuration information is changed, the terminal may replace the existing zone configuration by the new zone configuration information, determine its own zone ID in accordance with the new zone configuration information, and acquire the resource pool information allocated to its own zone. The zone configuration signal may include message sequence number information so that the terminal can grasp whether to change the zone configuration information.

Figure 2F:
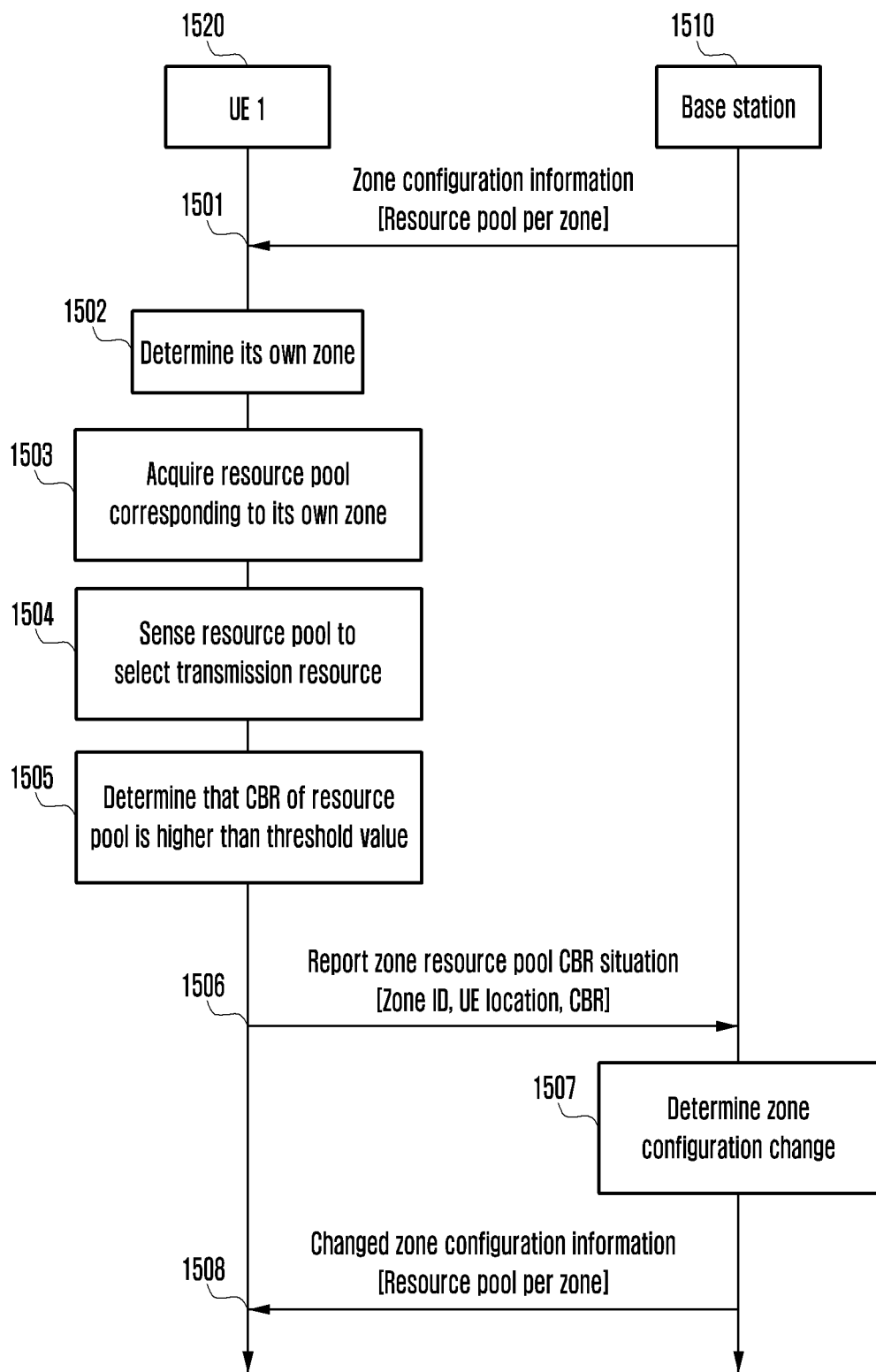
FIG. 2F is a diagram illustrating a procedure of changing zone resource pool configuration based on resource CBR according to a second embodiment of the present disclosure.

FIG. 2F is a diagram illustrating a procedure of changing zone resource pool configuration based on resource CBR according to an embodiment of the present disclosure. That is, FIG. 2F is a diagram illustrating a procedure in which a BS configures zone configuration based on resource CBR reported by a terminal.

Referring to FIG. 2F, a BS 1510 may transmit zone configuration information to a terminal (UE1) 1520 at operation 1501. In an embodiment of the present disclosure, the zone configuration information may include information that is necessary to acquire resource pool information allocated per zone, and a CBR threshold value for triggering CBR state report of the zone. Further, the zone configuration information may include at least one of a width of a zone basic unit for deriving a zone ID, a length of the zone basic unit, a resource pool per zone ID, and resource pool use CBR threshold value information. As an example, in an LTE system, the zone configuration information may be transmitted through an SIB message. As another example, in an LTE system, the zone configuration information may be pre-configured in the terminal. As still another example, in an LTE system, the zone configuration information may be transmitted through an RRC connection reconfiguration message.

At operation 1502, the terminal 1520 may determine a zone ID of the zone to which the terminal itself belongs based on the zone configuration information and its own location. At operation 1503, the terminal 1520 may determine resource pool information corresponding to the zone ID based on the zone configuration information. At operation 1504, the terminal 1520 may sense the resource pool to occupy a resource that is necessary to transmit packets in the acquired resource pool. In the procedure at operation 1504, the terminal 1520 may measure signal strength of the resource pool. The signal strength of the resource pool may be measured based on RSSI. The terminal 1520 may measure the CBR of the resource allocated to the zone through comparison of the measured RSSI based signal strength with the resource pool use CBR threshold value.

At operation 1505, the terminal 1520 may determine whether the CBR of the resource pool is equal to or higher than the CBR threshold value for triggering the CBR state report. If it is determined that the CBR of the resource pool allocated to the zone ID to which the terminal 1520 belongs is equal to or higher than the CBR threshold value for triggering the CBR state report, the terminal 1520, at operation 1506, may transmit the CBR information to the BS 1510. The CBR information may include at least one of the terminal (UE) ID, the terminal location information, the zone ID information of the terminal, and the CBR measured by the terminal. Here, the location information of the terminal may be described as information in Table 2. As an example, in an LTE system, the CBR information may be transmitted through a measurement report message. As another example, in an LTE system, the CBR information may be transmitted through a UE information message. As still another example, in an LTE system, the CBR information may be transmitted through a sidelink UE information message.

TABLE 2

| locationCoordinates-r10 | CHOICE { | |
| --- | --- | --- |
|     ellipsoid-Point-r10 | OCTET STRING, | |
|     ellipsoidPointWithAltitude-r10 | OCTET STRING, | |
| ..., | | |
|     ellipsoidPointWithUncertaintyCircle-r11 | OCTET STRING, | |
|     ellipsoidPointWithUncertaintyEllipse-r11 | OCTET STRING, | |
|     ellipsoidPointWithAltitudeAndUncertaintyEllipsoid-r11 | OCTET STRING, | |
|     ellipsoidArc-r11 | OCTET STRING, | |
|     Polygon-r11 | OCTET STRING | |
| }, | | |
| horizontalVelocity-r10 | OCTET STRING, | OPTIONAL, |
| gnss-TOD-msec-r10 | OCTET STRING, | OPTIONAL, |

LocationInfo field descriptions ellipsoidArc

Parameter EllipsoidArc defined in 3GPP TS36.355. The first/leftmost bit of the first octet contains the most significant bit.
ellipsoid-Point Parameter Ellipsoid-Point defined in 3GPP TS36.355. The first/leftmost bit of the first octet contains the most significant bit.
ellipsoidPointWithAltitude Parameter EllipsoidPointWithAltitude defined in 3GPP TS36.355. The first/leftmost bit of the first octet contains the most significant bit
ellipsoidPointWithAltitudeAndUncertaintyEllipsoid Parameter EllipsoidPointWithAltitudeAndUncertaintyElllipsoid defined in 3GPP TS36.355. The first/leftmost bit of the first octet contains the most significant bit.
ellipsoidPointWithUncertaintyCircle Parameter Ellipsoid-PointWithUncertaintyCircle defined in 3GP P TS36 .355. The first/leftmost bit of the first octet contains the most significant bit.
ellipsoidPointWithUncertaintyEllipse Parameter EllipsoidPointWithUncertaintyEllipse defined in 3GPP TS36.355. The first/leftmost bit of the first octet contains the most significant bit.
gnss-TOD-msec Parameter Gnss-TOD-msec defined in 3GPP TS36.355. The first/leftmost bit of the first octet contains the most significant bit.
horizontalVelocity Parameter HorizontalVelocity defined in 3GPP TS36.355. The first/leftmost bit of the first octet contains the most significant bit.
polygon Parameter Polygon defined in 3GPP TS36.355. The first/leftmost bit of the first octet contains the most significant bit.

At operation 1507, the BS 1510 may determine whether to change the zone based resource pool based on the CBR information received from the terminal 1520. Although FIG. 2F illustrates that the CBR information for the resource pool is received from one terminal, the BS 1510 may also receive the CBR information for the resource pool of the zone ID to which the terminal belongs from one or more terminals. The BS 1510 may change the zone configuration information based on the CBR information reported by the terminal 1520. The zone configuration information that can be changed by the BS 1510 may include information that is necessary to acquire the resource pool information allocated per zone and the CBR threshold value for triggering the CBR state report for the zone. Further, the zone configuration information that can be changed by the BS 1510 may include at least one of a width of a zone basic unit, a length of the zone basic unit, a resource pool per zone ID, and a resource pool use CBR threshold value. For example, the BS may change the amount of resource pool allocated to each zone ID while maintaining the zone basic unit. As another example, the BS may change the width of the zone basic unit. As another example, the BS may change the width of the zone basic unit and the length of the zone basic unit. As another example, the BS may change the resource pool use CBR threshold value. At operation 1508, the BS 1510 may transmit the changed zone configuration information to the terminal 1520. Next, an embodiment in which the BS changes the zone configuration based on the channel CBR reported by the terminal will be described.

An example of the zone configuration information that is transmitted by the BS through broadcast signaling or UE dedicated signaling is shown in Table 3, below.

TABLE 3

```
SL-ZoneConfig-r14 ::=           SEQUENCE {
    zoneLength-r14 ENUMERATED      { m5,m10,m20,m50,m100,m200,m500,spare1} OPTIONAL, -- Need OR
    zoneWidth-r14  ENUMERATED      { m5,m10,m20,m50,m100,m200,m500,spare1} OPTIONAL, -- Need OR
    zoneIdLongiMod-r14 INTEGER (1..4)                                      OPTIONAL, -- Need OR
    zoneIdLatiMod-r14  INTEGER (1..4)                                      OPTIONAL, -- Need OR
}
```

Figure 2G:
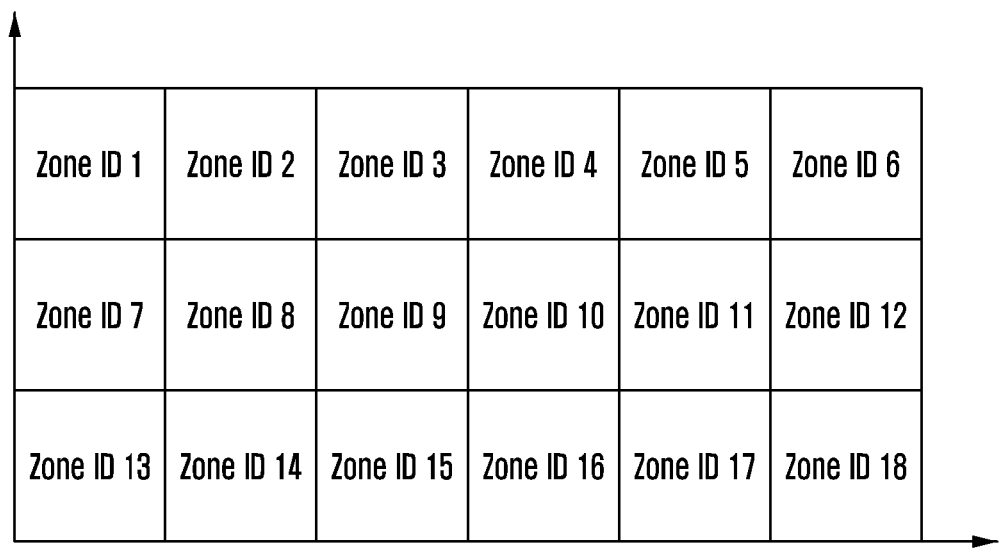
FIG. 2GA is a diagram illustrating zone information example 1 according to a second embodiment of the present disclosure.
Figure 2G:
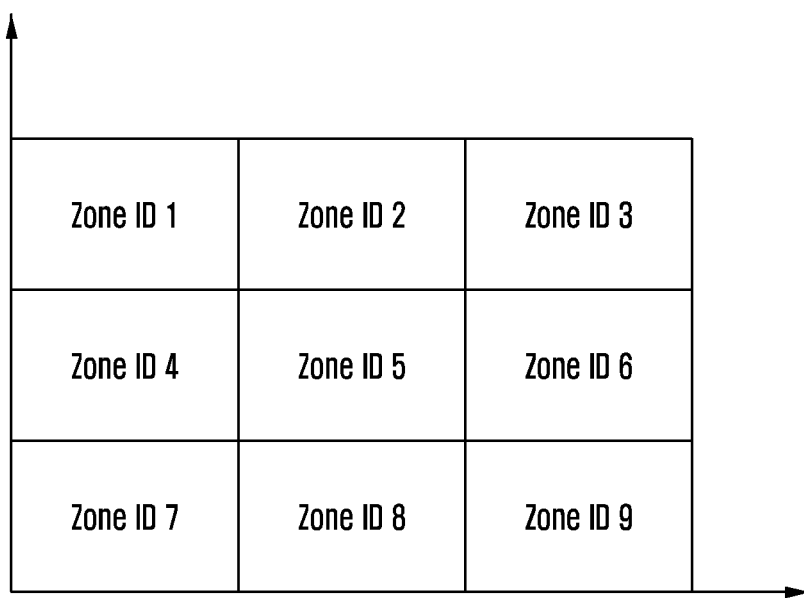

FIG. 2GA is a diagram illustrating zone information example 1 according to a second embodiment of the present disclosure.

Referring to FIG. 2GA, the BS may transmit the zone configuration information that is configured as zone length of zone configuration=m5 (5 meters), zone width=m5 (5 meters), zone ID longitude=3, and zone ID latitude=6. The zone information configured based on the zone configuration information may be configured as in FIG. 2GA.

FIG. 2GB is a diagram illustrating zone information example 2 according to a second embodiment of the present disclosure.

Referring to FIG. 2GB, if it is determined that the resource and channel CBR for zone ID 13 is higher than a predetermined threshold value, the terminal that belongs to the zone ID 13 may report the CBR for the zone ID 13 to the BS. The BS may receive may receive the CBR report from one or more terminals using resources of the zone ID 13, and may determine zone configuration information change to reduce the CBR of the zone ID 13 based on the CBR report. For example, the BS may determine to reduce the resource CBR by increasing the zone width, and the BS may configure zone length of zone configuration=m5 (5 meters), zone width=m10 (10 meters), zone ID longitude=3, and zone ID latitude=3, and may transmit the new zone configuration information. The zone information configured based on the new zone configuration information may be configured as in FIG. 2GB.

The terminal that has received the new zone configuration information may determine its own zone ID based on the zone configuration information. In this case, the zone configuration information may include resource pool information allocated to each zone ID. The terminal may acquire resource information corresponding to its own zone with reference to the resource pool information corresponding to the zone ID.

In an embodiment of the present disclosure, if the CBR report is received from the terminal, the BS may instruct the terminal using an adjacent zone to report the CBR in order to adjust the zone configuration. The CBR report instruction information may be transferred through a broadcast message, or may be transferred through a message dedicated to a specific terminal.

Figure 2H:
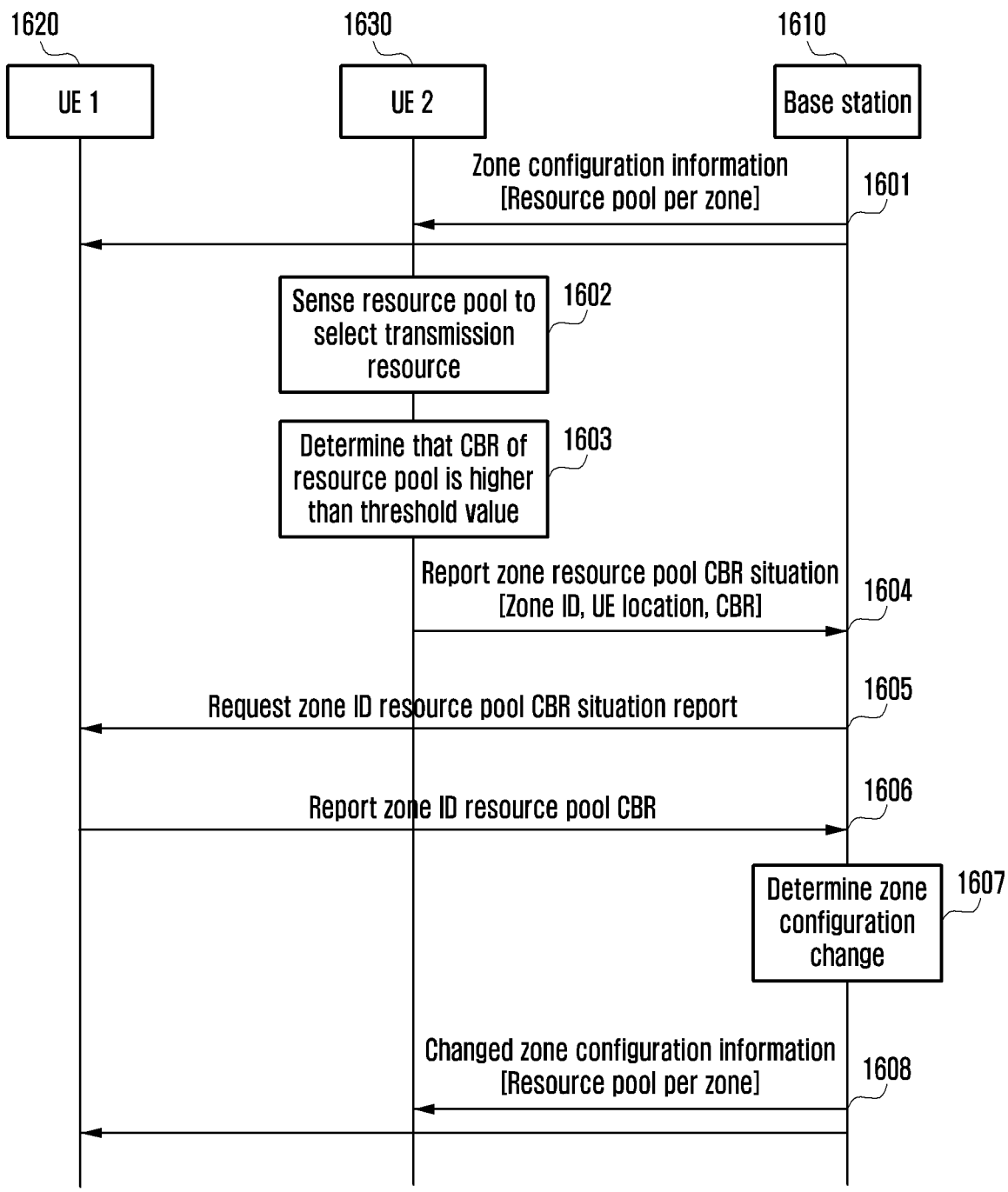
FIG. 2H is a diagram illustrating a procedure of changing zone resource pool configuration based on resource CBR report according to a second embodiment of the present disclosure.

FIG. 2H is a diagram illustrating a procedure of changing zone resource pool configuration based on resource CBR report according to an embodiment of the present disclosure.

A BS 1610 may transmit zone configuration information to terminals (UE1, UE2) 1620 and 1630 at operation 1601. The zone configuration information may include information that is necessary to acquire resource pool information allocated per zone, and a CBR threshold value for triggering CBR state report of the zone. Further, the zone configuration information may include at least one of a width of a zone basic unit for deriving a zone ID, a length of the zone basic unit, a resource pool per zone ID, and resource pool use CBR threshold value information. As an example, in an LTE system, the zone configuration information may be transmitted through an SIB message. As another example, in an LTE system, the zone configuration information may be pre-configured in the terminal. As still another example, in an LTE system, the zone configuration information may be transmitted through an RRC connection reconfiguration message.

At operation 1602, terminal (UE) 1 1620 and terminal (UE) 2 1630 may determine zone IDs of the zones to which the terminals themselves belong based on the zone configuration information and their own locations. The terminal 1 1620 and the terminal 2 1630 may determine resource pool information corresponding to the zone IDs based on the zone configuration information. For example, at operation 1602, the terminal 2 1630 may sense the resource pool to occupy a resource that is necessary to transmit packets in the acquired resource pool. In the procedure at operation 1602, the terminal 2 1630 may measure signal strength of the resource pool. The signal strength of the resource pool may be measured based on RSSI. The terminal 2 1630 may measure the CBR of the resource allocated to the zone through comparison of the measured RSSI based signal strength with the resource pool use CBR threshold value.

At operation 1603, the terminal 2 1630 may determine whether the CBR of the resource pool is equal to or higher than the CBR threshold value for triggering the CBR state report. If it is determined that the CBR of the resource pool allocated to the zone ID to which the terminal 2 1630 belongs is equal to or higher than the CBR threshold value for triggering the CBR state report, the terminal 2 1630, at operation 1604, may transmit the CBR information to the BS 1610. The CBR information may include at least one of the terminal 2 ID, location information of the terminal 2, the zone ID information of the terminal 2, and the CBR measured by the terminal. Here, the location information of the terminal 2 may be described as information in Table 2. As an example, in an LTE system, the CBR information may be transmitted through a measurement report message. As another example, in an LTE system, the CBR information may be transmitted through a UE information message. As still another example, in an LTE system, the CBR information may be transmitted through a sidelink UE information message.

If the CBR report is received from the terminal 2 1630, the BS 1610, at operation 1605, may request the CBR report from the terminal belonging to an adjacent zone ID in order to determine the CBR of the zone ID adjacent to the zone of the terminal 2 1630. The BS 1610 may instruct the terminal 1 1620 that uses the resource pool of an adjacent zone ID to report the CBR of the adjacent zone ID. Further, at operation 1606, the terminal 1 1620 may report the CBR of the resource pool of the corresponding zone ID to the BS 1610. The CBR report request message transmitted to the terminal that uses the adjacent zone may be transmitted to a specific terminal through dedicated signaling. As another example, the CBR report request message transmitted to the terminal using the adjacent zone may be transmitted to a certain terminal that belongs to the adjacent zone through broadcast signaling. The broadcast signaling may include target zone ID information to which the CBR is to be reported. The CBR report request message may include CBR threshold value information that the terminal 1 1620 or a certain terminal belonging to the adjacent zone will use as a basis in reporting the resource pool CBR of the adjacent zone. Based on the CBR threshold value information, the terminal 1 1620 may report that the CBR of the resource pool of the zone of the terminal 1 1620 is lower than, equal to, or higher than the threshold value. Further, the terminal 1 1620 may report the CBR of the resource pool of the zone as an RSSI value.

At operation 1607, the BS 1610 may determine whether to change the zone based resource pool based on the CBR information received from the terminal 2 1630 and the terminal 1 1620. In an embodiment of FIG. 2H, it is illustrated that the CBR information for the resource pool is received from two terminals. However, the present disclosure is not limited thereto, but the BS 1610 may also receive from two or more terminals the CBR information for the resource pool of the zone ID to which the respective terminals belong. The BS 1610 may change the zone configuration information based on the CBR information reported by the terminal 2 1630 and the terminal 1 1620. The zone configuration information that can be changed by the BS 1610 may include information that is necessary to acquire the resource pool information allocated per zone, and the CBR threshold value for triggering the CBR state report of the zone. Further, the zone configuration information that can be changed by the BS 1610 may include at least one of the width of a zone basic unit, the length of the zone basic unit, the resource pool per zone ID, and the resource pool use CBR threshold value. As an example, the BS may change the amount of the resource pool allocated to each zone ID while maintaining the zone basic unit. As another example, the BS may change the width of the zone basic unit. As another example, the BS may change the width of the zone basic unit and the length of the zone basic unit. As another example, the BS may change the resource pool use CBR threshold value. At operation 1608, the BS 1610 may transmit the changed zone configuration information to the terminal 2 1630.

From the foregoing, a certain terminal 1 1620 belonging to the adjacent zone has been exemplified. According to various embodiments of the present disclosure, the terminal 1 1620 may correspond to a terminal pre-configured to report the resource pool CBR of each zone.

According to another embodiment of the present disclosure, the BS may periodically request the CBR report from the terminal. The terminal may correspond to the UE mounted on a vehicle or the UE mounted on a fixed RSU. The terminal that will periodically transmit the CBR report may be preregistered in the BS. If the terminal designated for the purpose of the CBR report deviates from the BS area, the BS may designate another terminal to periodically transmit the CBR report. Based on the period information configured by the BS, the terminal may report the resource of the zone used by the terminal itself and channel CBR based on the period information configured by the BS. Based on the resource and channel CBR information periodically received from the terminal, the BS may adjust the zone configuration or may transmit the reconfigured zone configuration information.

Figure 2I:
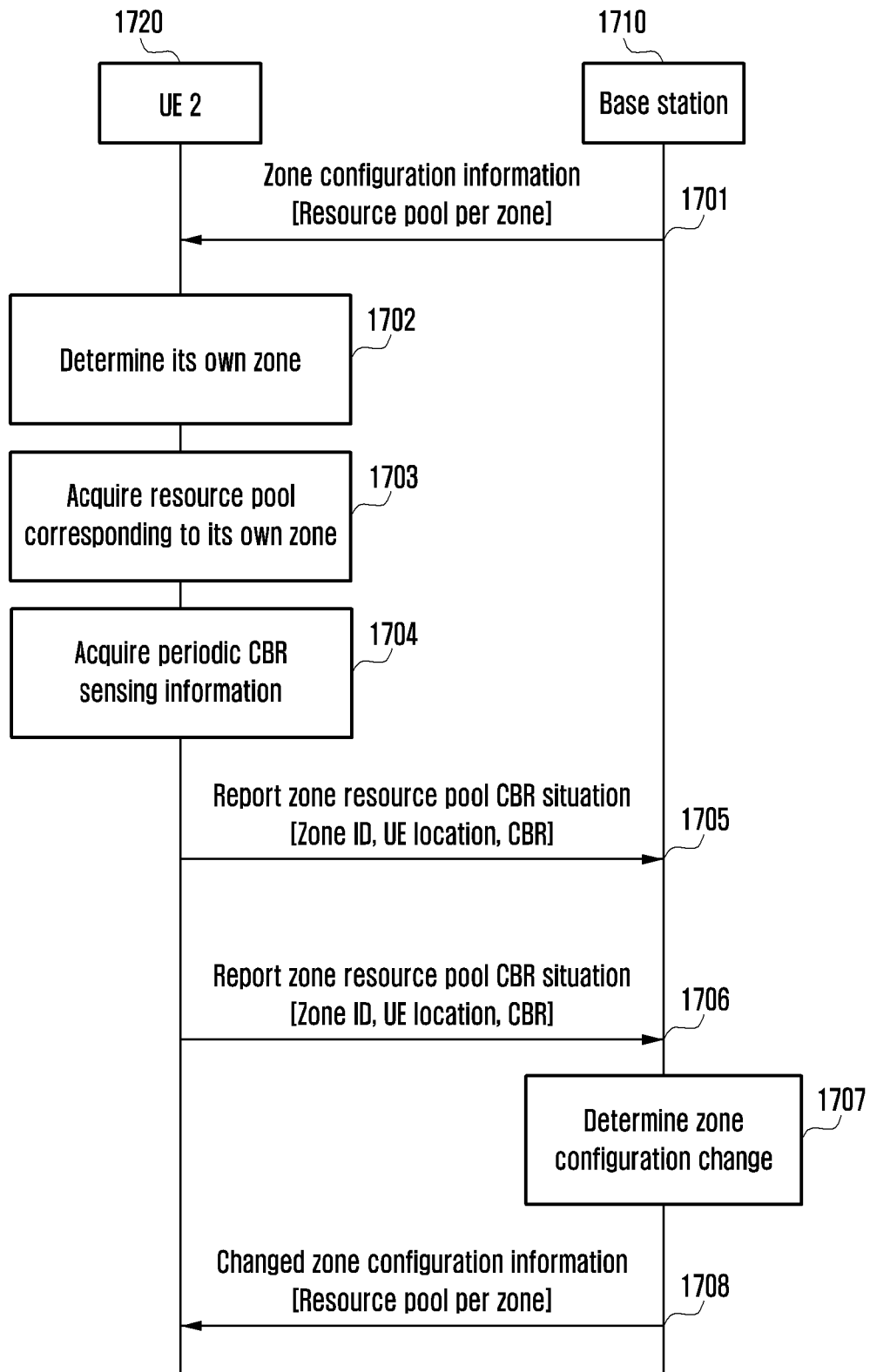
FIG. 2I is a diagram illustrating a procedure of changing zone resource pool configuration based on periodic resource CBR report according to a second embodiment of the present disclosure.

FIG. 2I is a diagram illustrating a procedure of changing zone resource pool configuration based on periodic resource CBR report according to an embodiment of the present disclosure.

Referring to FIG. 2I, a BS 1710 may transmit zone configuration information to a terminal (UE2) 1720 at operation 1701. The zone configuration information may include information that is necessary to acquire resource pool information allocated per zone. Further, the zone configuration information may include at least one of a width of a zone basic unit for deriving a zone ID, a length of the zone basic unit, a resource pool per zone ID, resource pool use CBR threshold value, and period information for reporting the resource pool CBR. As an example, in an LTE system, the zone configuration information may be transmitted through an SIB message. As another example, in an LTE system, the zone configuration information may be preconfigured in the terminal. As still another example, in an LTE system, the zone configuration information may be transmitted through an RRC connection reconfiguration message.

At operation 1702, the terminal 1720 may determine a zone ID based on the zone configuration information and its own location. At operation 1703, the terminal 1720 may determine resource pool information corresponding to the zone ID based on the zone configuration information. At operation 1704, the terminal 1720 may acquire period information for reporting the CBR for the resource pool corresponding to its own zone ID. Based on the acquired period information, the terminal 1720, at operation 1705, may sense the resource pool corresponding to the zone ID, and may report the CBR for the resource pool to the BS 1710. For example, the terminal 1720 may measure signal strength of the resource pool. The signal strength of the resource pool may be measured based on RSSI. The terminal 1720 may measure the CBR of the resource allocated to the zone through comparison of the measured RSSI based signal strength with the resource pool use CBR threshold value. The signal strength of the resource pool may be measured based on an energy level. The terminal 1720 may sense the zone resource pool CBR situation, and at operation 1706, may report the zone resource pool CBR situation to the BS 1710.

At operation 1707, the BS 1710 that has received the CBR for the resource pool from the terminal 1720 may determine whether it is necessary to change the zone configuration. If it is not determined that the zone resource CBR based on the CBR report is equal to or higher than threshold value A or equal to or higher than a threshold value X, the BS 1710 may maintain the existing zone configuration. If it is determined that the zone resource CBR is equal to or higher than threshold value A, equal to or higher than threshold value B, or equal to or higher than the threshold value X based on the CBR report from the terminal 1720, the BS 1710 may determine that a new zone configuration is necessary based on the CBR report from the terminal 1720, and may configure the new zone configuration to be transmitted to the terminal 1720 at operation 1708. The zone configuration transmitted at operation 1708 may include new zone configuration information or new CBR threshold information. The terminal that has received the changed zone configuration information may determine its own zone ID based on the zone configuration, and may acquire the resource pool information corresponding to the zone ID.

Figure 2J:
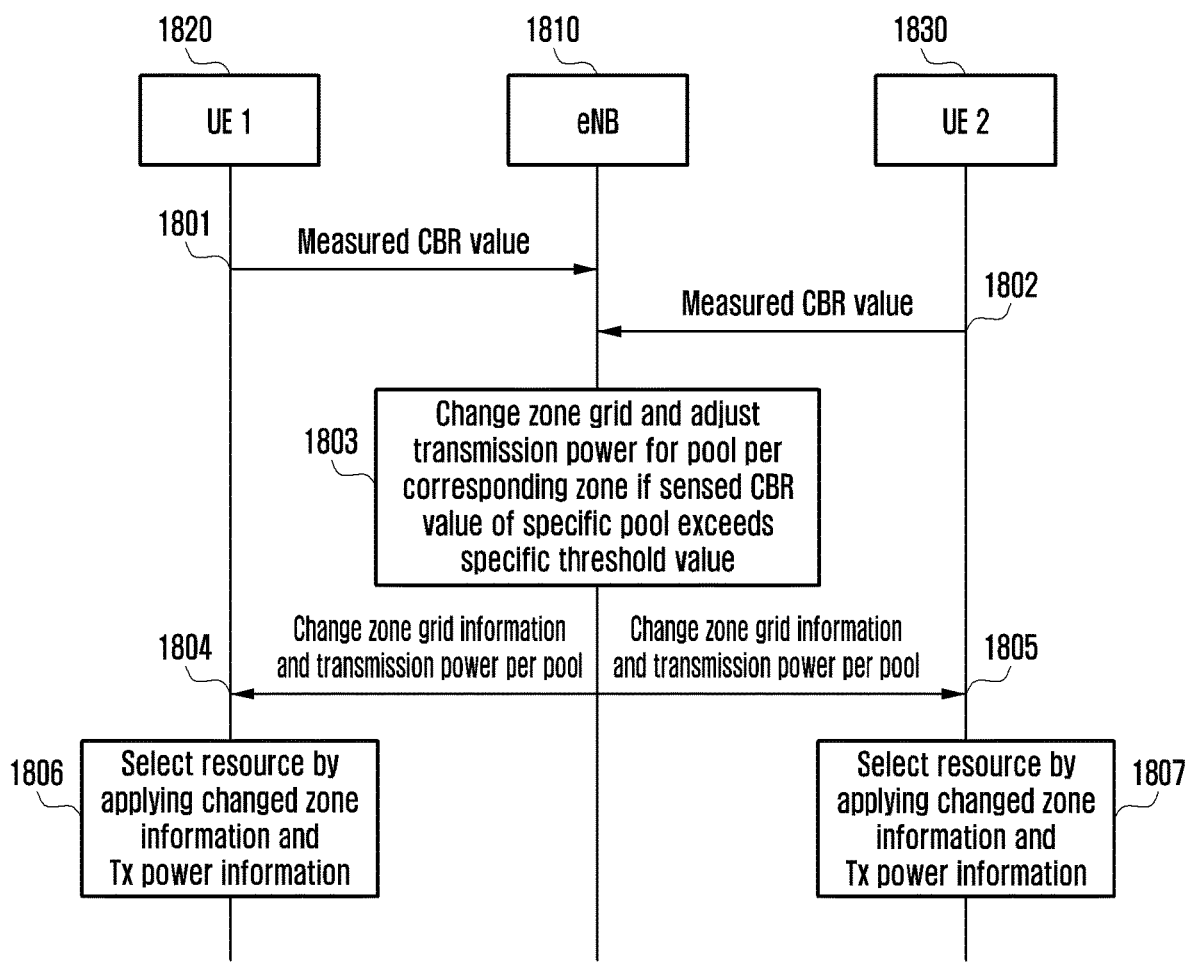
FIG. 2J is a diagram illustrating an example of zone resource pool operation based on CBR report according to a second embodiment of the present disclosure.

FIG. 2J is a diagram illustrating an example of zone resource pool operation based on CBR report according to an embodiment of the present disclosure.

Referring to FIG. 2J, at operations 1801 and 1802, UE1 1820 and UE2 1830 may report measured resource CBR to a BS 1810. At operation 1803, the BS 1810 may determine whether the CBR of a resource pool of each zone is equal to or higher than a threshold value based on the resource CBR report received from the UE1 1820 and UE2 1830. If it is determined that the CBR of the resource pool of the zone is equal to or higher than the threshold value, the BS 1810 may change the configuration for the zone. At operations 1804 and 1805, the BS 1810 may transmit the changed zone configuration information to the terminals. The zone configuration change may include a change of a zone grid. For example, if a large number of vehicle terminals use resources in a specific zone to which a specific grid configuration is applied, the grid configuration may become closer, and thus collision can be reduced in selecting the resources using the same pools in a smaller unit area. In addition, the BS 1810 may instruct UE1 1820 and UE2 1830 to adjust transmission power for the corresponding resource pools simultaneously with changing the zone grid. That is, the zone configuration information may include zone grid information and transmission power information. The transmission power information for the zone resource pool may be transmitted to the terminals in the BS cell through a system information broadcasting message transmitted by the BS 1810 or dedicated signaling directly transmitted to the terminals. If new zone configuration information transmitted by the BS 1810, that is, zone grid information and transmission power information for the resource pool, is received, the terminals 1820 and 1830, at operations 1806 and 1807, may determine again their own zones based on the received information, and may acquire the resource pool information corresponding to the zone. Further, the terminals may perform data transmission using the resource pool information and the corresponding transmission power information.

On the other hand, although it is assumed that any terminal that supports vehicle communication (e.g., third generation partnership program (3GPP) V2X communication) can report the resource CBR according to the above-described embodiment, the present disclosure can also be applied even in the case where the BS designates a specific terminal for the purpose of reporting the resource CBR. The terminal designated for the purpose of reporting the resource CBR may be a terminal mounted on a vehicle, a terminal mounted on a road side unit (RSU), or a terminal mounted on a pedestrian, driver, or passenger.

As another embodiment other than the embodiment in which the resource CBR is applied to the case of the zone based resource pool operation, the resource CBR may be applied to a resource pool (V2V resource pool) used for direct communication between vehicle UEs, a resource pool (P2V/V2P resource pool) used for direct communication between pedestrian UE and vehicle UE, or a resource pool (V2I/I2V resource pool) used for direct communication between vehicle UE and an RSU. The resource pool may correspond to a resource pool that the vehicle UE, the pedestrian UE, or the RSU uses for the purpose of transmission (Tx). The resource pool may correspond to the resource pool that the vehicle UE, the pedestrian UE, or the RSU uses for the purpose of reception (Rx). The resource CBR configuration information applied to the resource pool used for direct communication between the vehicle UEs, the resource pool used for direct communication between the pedestrian UE and the vehicle UE, or the resource pool used for direct communication between the vehicle UE and the RSU may be provided to the vehicle UE, the pedestrian UE, and the RSU through the BS.

The resource CBR configuration information may include a CBR threshold value for triggering the resource CBR state report. According to various embodiments of the present disclosure, the CBR threshold value may include reference threshold value A determined to have high resource CBR and reference threshold value B determined to have low resource CBR. Further, the CBR threshold value may be used to determine the resource CBR for the resource pool used by the UE and to report the determined resource CBR to the BS. The resource CBR information reported by the terminal may be used for the BS to reconfigure the resource pool managed by the BS and for control of transmission parameters (e.g., Tx resource pool, Rx resource pool, transmission power, and modulation and coding scheme (MCS) level) in the resource pool.

The CBR threshold value may be differently configured per resource pool type. That is, the CBR threshold values of the resource pool used by the pedestrian UE, the resource pool used by the vehicle UE, and the resource pool used by the RSU may be configured equally or differently, and the CBR threshold configuration information per resource pool type may be transferred from the BS to the UE through signaling or may be pre-configured to the UE. For example, the CBR threshold values applied to an inter-public land mobile network (PLMN) resource pool type and an intra-PLMN resource pool type may be equally or differently configured.

As another embodiment, the CBR threshold values may be differently configured per packet priority. That is, in the case of using a service having high packet priority, a high CBR threshold value may be applied, whereas in the case of using a service having low packet priority, a low CBR threshold value may be applied. The CBR threshold value configuration based on the packet priority may be determined in a direction in which a service having high packet priority can be serviced at maximum speed and with high reliability.

As still another embodiment, the CBR threshold values may be configured equally or differently in accordance with a case where the UE performs V2X operation in an idle mode or a case where the UE performs V2X operation in a connected mode. For example, the CBR threshold value in an idle mode may be configured in a direction in which the idle mode UE maintains the smaller number of times of transmission of the resource CBR situation report as compared with the connected mode UE. The CBR threshold values may be equally or differently configured per zone. For example, the CBR threshold value for the zone in which a large number of UEs are distributed may be configured to be smaller than the CBR threshold value for the zone in which a small number of UEs are distributed.

As still another embodiment, the CBR threshold values may be configured with the same value or different values per carrier frequency.

Next, according to various embodiments of the present disclosure, a procedure in which a pedestrian terminal performs resource CBR report will be described. The pedestrian terminal may or may not perform the resource CBR report operation based on the terminal location or a residual battery level of the terminal. That is, if it is determined that the pedestrian terminal is located indoors or is located in a safe area from vehicles, the pedestrian terminal may not perform the resource CBR report operation according to an embodiment of the present disclosure. If it is determined that the pedestrian terminal has a residual battery level that is lower than a specific threshold value, it may not perform the resource CBR report operation according to the embodiment of the present disclosure.

Figure 2K:
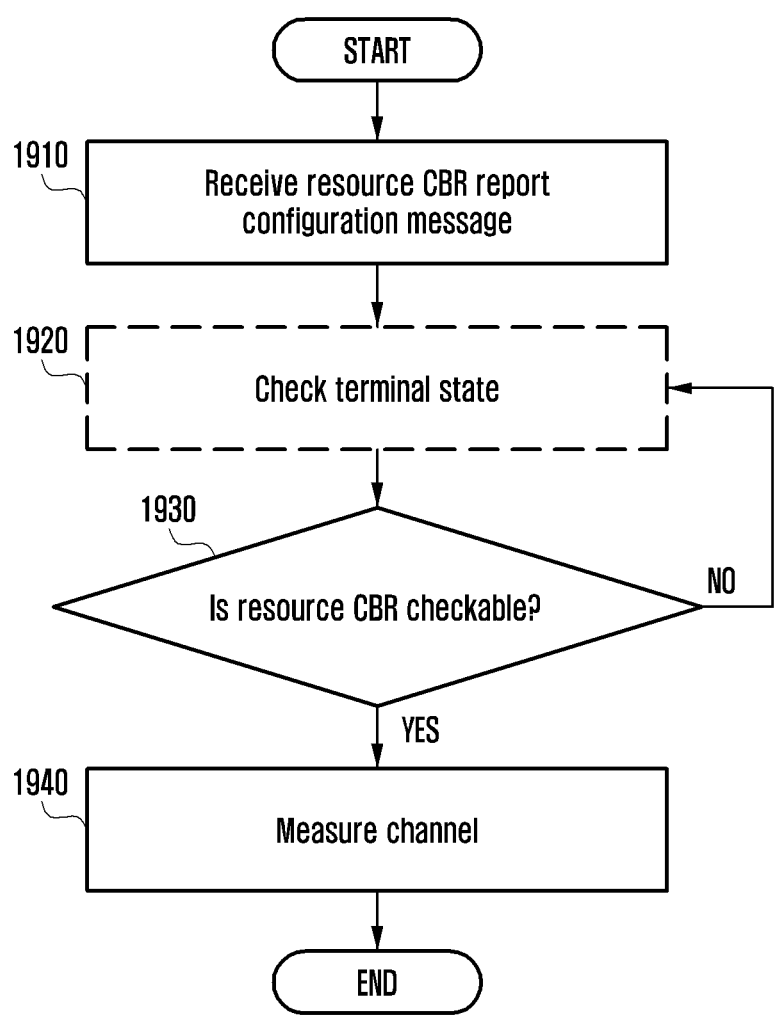
FIG. 2K is a diagram illustrating a terminal operation for determining whether to perform a channel measurement operation for determining resource CBR by checking the state of a pedestrian user equipment (UE) according to a second embodiment of the present disclosure.

FIG. 2K is a diagram illustrating a terminal operation for determining whether to perform a channel measurement operation for determining resource CBR by checking the state of a pedestrian UE according to an embodiment of the present disclosure. Operations described hereinafter may not be all essential, but at least one operation may be omitted.

Referring to FIG. 2K, at operation 1910, a terminal may receive a resource CBR report configuration message from a BS. The resource CBR report configuration message may be transferred through system information or dedicated signal. At operation 1920, the terminal may check the terminal state.

At operation 1930, the terminal may determine whether the resource CBR can be checked through the confirmed terminal state and/or the resource CBR report configuration message. For example, if the resource CBR report configuration message is received, the terminal can determine whether the resource CBR can be checked. If the resource CBR report configuration message is received from the BS, the terminal may determine that it is in a resource CBR checkable state.

As another example, the terminal may receive the resource CBR report configuration message, check the terminal state, and determine whether the resource CBR can be checked. The terminal state may be determined by checking the residual battery level of the terminal, checking the terminal location, or checking a case where the terminal is in an idle mode. The terminal may determine whether the resource CBR can be checked after checking the terminal state as in the above example, the terminal may confirm that it is in a resource CBR checkable state if the residual battery level of the terminal is higher than a specific threshold value, if the terminal is located adjacent to a road, or if the terminal is not in an idle mode. Whether the terminal is located adjacent to a road may be determined using, for example, terminal location information and MAP information.

If the terminal is in a resource CBR checkable state, the terminal, at operation 1940, may measure a channel. For example, the terminal may determine a resource busy state through measurement of the signal strength of a reference signal received in the resource pool.

Figure 2L:
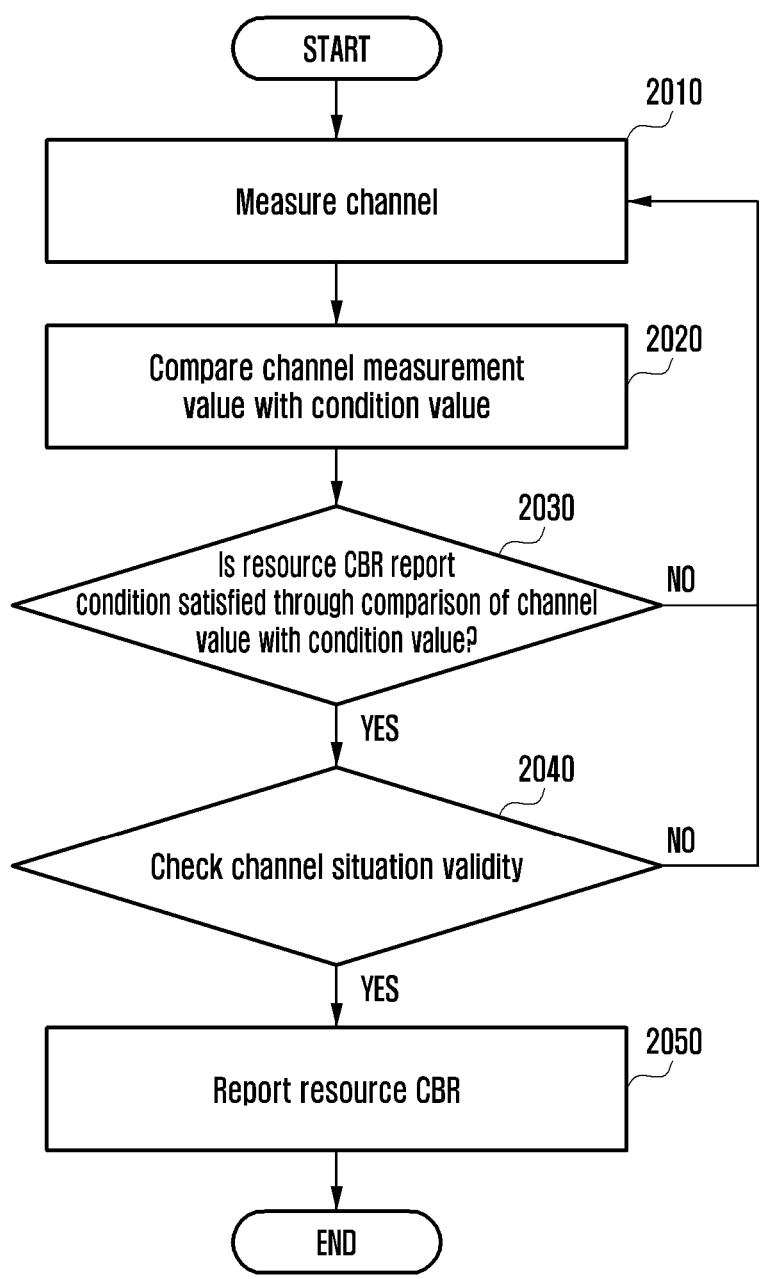
FIG. 2L is a diagram illustrating a terminal operation method for reporting resource CBR according to a second embodiment of the present disclosure.

FIG. 2L is a diagram illustrating a terminal operation method for reporting resource CBR report according to an embodiment of the present disclosure.

Referring to FIG. 2L, the terminal may measure an effective channel situation and may report resource CBR to the BS. At operation 2010, the terminal may perform a channel measurement operation for a resource pool.

If a channel value (e.g., signal strength) for the resource pool is determined through the channel measurement, the terminal, at operation 2020, may check the resource CBR state by comparing the determined channel value with a condition value included in a resource CBR configuration message. At operation 2030, the terminal may check whether to satisfy the resource CBR report condition by comparing the channel value with the condition value. If the resource CBR report condition is not satisfied, the terminal proceeds to operation 2050 and can immediately report the resource CBR to the BS. Further, the terminal may compare a channel value with a condition value, and if the resource CBR report condition is satisfied, it may check whether the resource CBR situation is effective as at operation 2040. Further, only in the case where the resource CBR situation is determined to be effective, the terminal may report the resource CBR to the BS as at operation 2050.

For example, if the channel signal strength measured by the terminal is lower than a condition value B or is higher than a condition value A received from the BS, the terminal may check whether the resource CBR situation is effective. For example, if the channel signal strength measured by the terminal is higher than a condition value X received from the BS, the terminal may check whether the resource CBR situation is effective.

As an example of whether the resource CBR situation is effective, the terminal may compare the channel measurement value with the resource CBR condition value, and if time when the resource CBR condition is satisfied is larger than the value configured from the BS, the terminal determines that the resource CBR situation for the resource (channel) is effective, and may report the resource CBR to the BS. Further, if the resource of the terminal is not changed (e.g., the same resource pool) while the resource CBR condition is satisfied through comparison of the channel measurement value with the resource CBR condition value, the terminal may determine that the resource CBR situation is effective, and may report the resource CBR to the BS. If the resource of the terminal is changed (e.g., zone change) while the resource CBR condition is satisfied through comparison of the channel measurement value with the resource CBR condition value, the terminal may initialize the measurement result of the resource CBR of the terminal without reporting the resource CBR to the BS. As another example, the terminal may compare the channel measurement value with the resource CBR condition value, and if it is determined that the resource CBR condition is satisfied and the resource CBR report transmission limit time is not configured, the terminal may report the resource CBR to the BS. Further, the terminal may compare the channel measurement value with the resource CBR condition value, and if it is determined that the resource CBR condition is satisfied and the resource CBR report transmission limit time is configured, the terminal may perform channel measurement until the resource CBR report transmission limit time is released without reporting the resource CBR to the BS.

The configuration information of the resource CBR report or the resource CBR report may be transmitted through a media access control (MAC) control element (MAC sublayer control signal). For example, in an LTE system, if the BS notifies the terminal of whether to transmit the resource CBR report and resource CBR configuration information through the MAC CE, the terminal may transfer the resource CBR report to the BS using the resource CBR MAC CE. As the MAC CE, the BS may transmit a channel busy ratio (CBR) report configuration MAC control element. As the MAC CE, the terminal may report the channel busy ratio report configuration MAC control element. If the channel busy ratio report configuration MAC control element is transmitted as the MAC CE, it may include terminal information (e.g., UE ID), channel information (e.g., channel busy percentage) or local information (e.g., zone ID), and the corresponding information may be expressed as a value or may be indexed to be displayed.

Figure 2M:
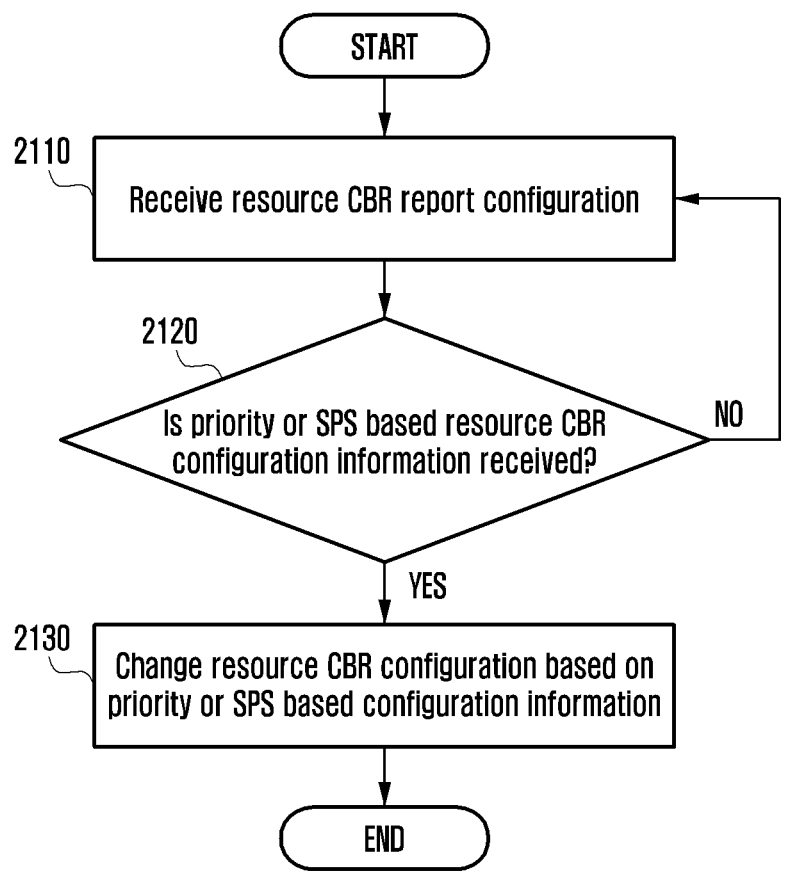
FIG. 2M is a diagram illustrating a terminal operation for performing resource CBR report using resource configuration information for a packet or a service having high priority according to a second embodiment of the present disclosure.

FIG. 2M is a diagram illustrating a terminal operation for performing resource CBR report using resource configuration information for a packet or a service having high priority according to an embodiment of the present disclosure.

Referring to FIG. 2M, at operation 2110, the terminal may receive resource CBR report configuration transmitted by the BS. The resource CBR report configuration may configure, for example, a resource CBR measurement period of a channel, a resource to be measured, and a resource CBR threshold value. Further, at operation 2120, the terminal may receive resource configuration information having high priority in addition to the resource CBR report configuration.

For example, in an LTE system, the terminal may receive resource CBR report configuration information per packet priority or service priority for transmitting a V2X message from the BS. As another example, the terminal may receive semi persistence scheduling (SPS) configuration information for transmitting the V2X message from the BS.

At operation 2130, the terminal may change the resource CBR report configuration information using the resource CBR report configuration information per packet priority or service priority. The resource CBR report configuration information per packet priority or service priority may include resource pool information to perform the resource CBR report per packet priority or service priority, resource CBR threshold information, transmission power during packet transmission from the resource pool, and MCS level during the packet transmission.

The terminal may change the resource CBR report configuration using the SPS configuration information. The SPS configuration information may include resource CBR threshold value information that is necessary to perform the resource CBR report for the SPS resource pool, transmission power during the packet transmission from the SPS resource pool, MCS level during the packet transmission, resource CBR measurement period, and resource CBR measurement period. For example, if data transmission period among the SPS configuration information is shorter than the resource CBR measurement period, the resource CBR measurement period may be change to the data transmission period. Further, if the data transmission period among the SPS configuration information is shorter than the resource CBR measurement period, the resource CBR measurement period may be changed to the data transmission period. Further, using implicit release information among the SPS configuration information, it may be determined how long the resource CBR measurement and transmission period change continue. For example, if there is not the SPS data transmission (using implicit release information) for a predetermined time after the CBR measurement period of the terminal is changed using the SPS configuration information, the SPS is released, and in this case, the CBR measurement period changed by the terminal may be changed to the existing value being used.

According to an embodiment of the present disclosure, the resource CBR may be reported through a PC5 packet.

This may be applied in relation to the embodiment for the resource CBR operation for the resource pool used for direct communication between the UEs and the resource pool used for direct communication between the UE and the RSU during performing direct communication between UEs or direct communication between the UE and the RSU. The UE may include vehicle UE and pedestrian UE. The UE may determine the CBR for the resource pool by performing channel measurement for the resource pool to be used for PC5 packet transmission. The UE may include the measured resource pool CBR information in the PC5 packet to be transmitted. As another example, the UE may include the measured resource pool CBR information in scheduling signal (e.g., SA) for PC5 packet transmission. The PC5 packet and the scheduling signal for the PC5 packet transmission may include resource pool information and CBR information for the resource pool.

If the CBR information for the resource pool is received, the destination UE or RSU that receives the PC5 packet may reserve the use of the resource pool or may determine the use of the resource pool based on the CBR level. As another example, if the CBR information for the resource pool is received, another UE or RSU that receives the scheduling signal for the PC5 packet transmission may reserve the use of the resource pool or may determine the use of the resource pool based on the CBR level. The other UE or RSU that receives the PC5 packet and the scheduling signal for the PC5 packet transmission may transfer the CBR information for the resource pool to the BS. The BS that has received the CBR information for the resource pool through the other UE or RSU may adjust the resource pool information to be used for the PC5 packet transmission and reception.

Figure 2N:
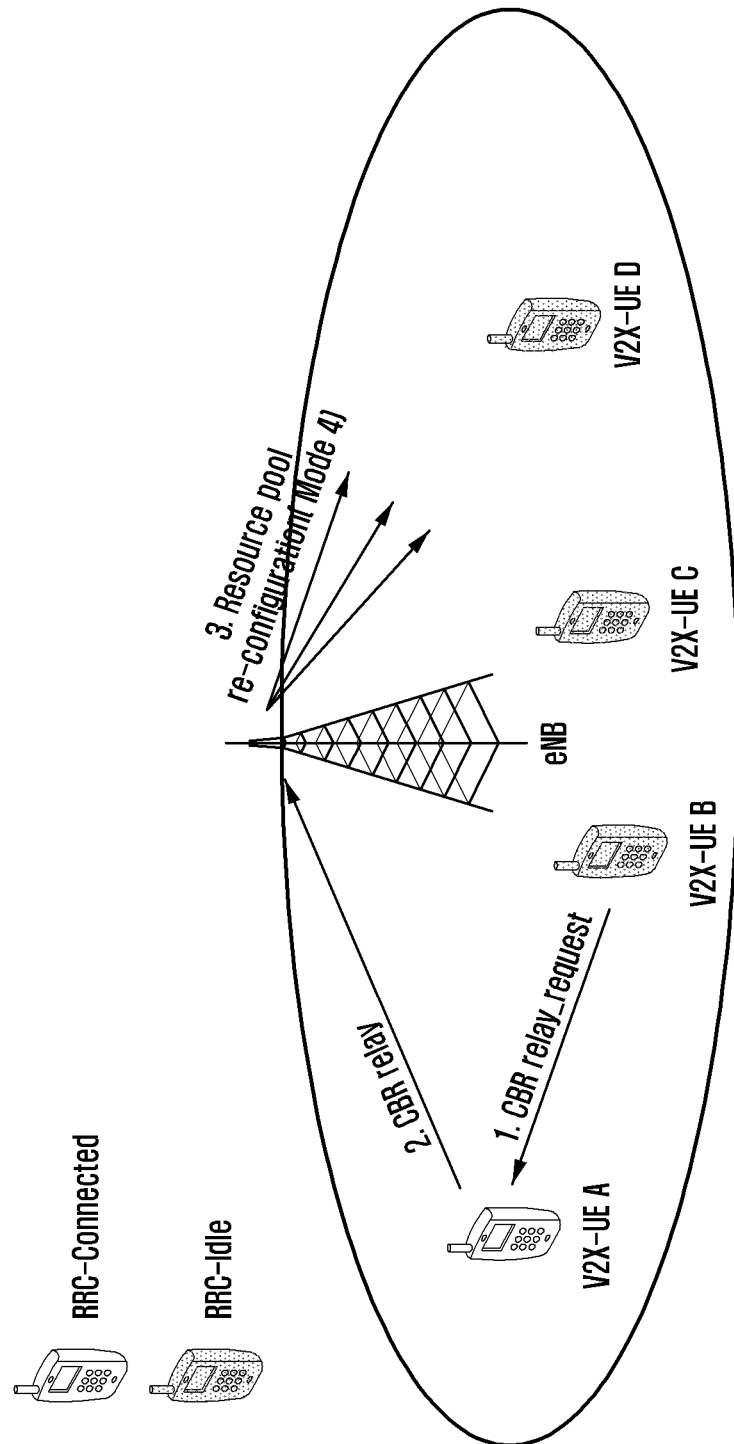
FIG. 2N is a diagram illustrating a method for V2X-UE to transmit resource CBR in a connectionless state according to a second embodiment of the present disclosure.
Figure 20:
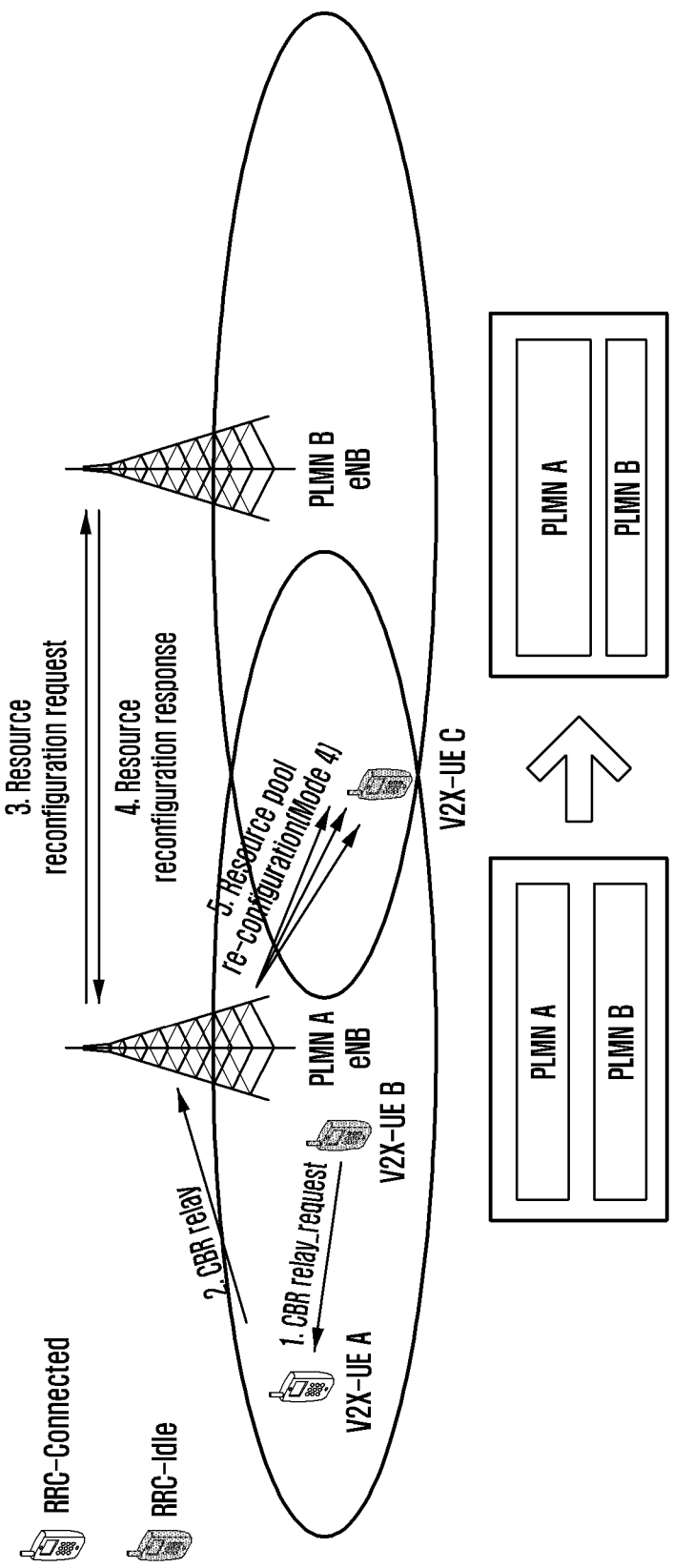

FIG. 2N is a diagram illustrating a method for V2X-UE to transmit resource CBR in a connectionless state according to an embodiment of the present disclosure. The connectionless state may be a state where an RRC connection with the BS is not maintained, that is, an RRC-idle state. In the drawing, V2X-UE A is in an RRC-connected state, and V2X-UE B, V2X-UE C, and V2X-UE D are in an RRC-idle state. The terminals in the RRC-connected state may transmit and receive a V2X service message using the resource pool directly scheduled by the BS or a V2X resource of mode 4 type (mode in which the UE selects the resource pool at its discretion regardless of the BS) in accordance with the configuration of the BS. The terminals in the RRC-idle state may transmit and receive a V2X service message using the V2X resource of the mode 4 type (mode in which the UE selects the resource pool at its discretion regardless of the BS) in accordance with the configuration of the BS. The UE using the mode 4 resource may measure the resource CBR for the mode 4 resource pool. As described above, the configuration information for measuring the resource CBR for the mode 4 resource may be transmitted by the BS in a broadcast method or in a dedicated signaling method to the terminal. The resource CBR configuration information for the mode 4 resource may include threshold values A and B for the resource CBR report, threshold value X, and resource CBR report period information.

Referring to FIG. 2N, if it is determined that the resource CBR for the mode 4 type V2X resource is busy, the terminals in an RRC-connected state may report the resource CBR for the V2X resource to the BS. If it is determined that the resource CBR for the mode 4 type V2X resource is busy, the terminals in the RRC-idle state may notify a neighbor RRC-connected terminal of the V2X resource CBR information for the mode 4 type using the V2X message transmitted using the mode 4 resource. The RRC-connected terminal may include vehicle UE, pedestrian UE, or RSU.

The V2X message transmitted by the terminal in the RRC-idle state may request the RRC-connected terminal to transfer the measurement result of the resource CBR for the mode 4 resource to the BS (1). In an embodiment of the present disclosure, the message for requesting to transfer the measurement result of the resource CBR for the mode 4 resource may use a CBR relay-request message. The CBR relay-request message may include the mode 4 resource pool and measured resource CBR information for the mode 4 resource pool.

If a CBR relay-request message is received, the RRC-connected terminal (V2X-UE A) may relay the resource CBR message to its own BS (2). If the resource CBR relay message (CRB relay) is received from the RRC-connected terminal (V2X-UE A), the BS may reconfigure the V2X resource of the mode 4 type in accordance with the resource CBR value included in the message.

The CBR relay message may include the mode 4 resource pool and measured resource CBR information for the mode 4 resource pool. For example, if it is determined that the mode 4 resource pool is busy based on the resource CBR information for the mode 4 resource pool included in the CBR relay message, the BS may configure the mode 4 type V2X resource pool having a size that is larger than that at the present, and may transmit the adjusted mode 4 type resource pool information (3). If it is determined that the mode 4 resource pool is not busy based on the resource CBR information for the mode 4 resource pool included in the CBR relay message), the BS may configure the V2X resource pool for the mode 4 type to be smaller than that at the present, and may transmit the adjusted mode 4 type resource pool information (3). The V2X resource configuration information for the mode 4 type notified by the BS may be transmitted by broadcast, and may be transmitted by a terminal-oriented message (dedicated signaling). The other RRC idle terminal (e.g., V2X-UE C or V2X-UE D) that has received the CBR relay-request message sent from the RRC idle terminal (e.g., V2X-UE B) may not transmit the CBR relay-request message for a predetermined time after receiving the CBR relay-request message.

On the other hand, if the terminal that uses the mode 4 resource pool deviates from a BS cell area, it may not receive the adjusted mode 4 resource pool from the BS, and may not receive the CBR configuration information for the mode 4 resource pool from the BS. The terminal that deviates from the base cell area may receive the CBR configuration information for the mode 4 resource pool or the adjusted mode 4 resource pool information from another terminal or RSU located in the BS cell area. Further, the other terminal or RSU located in the BS cell area may transfer the resource CBR report for the mode 4 resource pool that is transmitted by the terminal that deviates from the BS cell area to the BS.

FIG. 2O is a diagram illustrating a method for V2X-UE to transmit resource CBR for inter-PLMN resource according to an embodiment of the present disclosure.

Referring to FIG. 2O, in the drawing, V2X-UE A is a terminal in an RRC-connected state that belongs to PLMN A, and V2X-UE B and V2X-UE C are RRC-idle terminals that belong to PLMN A. It is assumed that the terminals in the RRC-idle state has inter PLMN V2X resources transmitted from the BS and are in use of inter PLMN V2X services. The BS may transmit the resource CBR threshold value for the PLMN resource pool and resource CBR measurement configuration information to the terminals. The resource CBR threshold value for the PLMN resource pool and resource CBR measurement configuration information may be transmitted by the BS in a broadcast method or in a dedicated signaling method to the terminal. The resource CBR threshold value for the PLMN resource pool and resource CBR measurement configuration information may include a PLMN resource pool that will measure and report the resource CBR threshold value, CBR report threshold value A and threshold value B for the pool resource, threshold value X information, and resource CBR measurement report period.

If it is determined that the V2X resource CBR for PLMN based on the resource CBR measurement configuration information is busy, the terminals in the RRC-idle state may notify neighbor RRC-connected terminal of the V2X resource CBR for PLMN A using the inter PLMN V2X resource for PLMN A or mode 4 resource. The terminal in the RRC-idle state may request the RRC-connected terminal to relay the V2X resource for the PLMN A or resource CBR information for mode 4 resource to the BS (1). In this case, the CBR relay-request message sent to the BS may include the V2X resource CBR for the PLMN A or the resource CBR information for mode 4 resource. If the CBR relay-request message is received, the RRC-connected terminal (V2X-UE A) may transfer the resource CBR message (CBR relay) to its own BS (2). If the resource CBR relay message (CBR relay) is received from the terminal, the BS may check the V2X resource CBR for the PLMN A included in the message or the mode 4 resource CBR, and in accordance with the resource CBR value for the PLMN A or the mode 4 resource CBR value, the BS may determine the resource reconfiguration for the inter-PLMN. If it is determined that the resource reconfiguration for the inter-PLMN is necessary, the BS may reconfigure the resource pool for PLMN A, and may transfer the pool reconfiguration information for the PLMN A to another PLMN BS. If it is determined that the resource pool reconfiguration for the PLMN B is necessary due to the resource pool reconfiguration for the PLMN A, the BS A and the BS B may additionally exchange information for the resource reconfiguration for the inter-PLMN between them.

For example, if it is determined that the resource for the PLMN A is busy based on the inter-PLMN V2X resource CBR information for the PLMN A included in the CBR relay message, the BS A may configure the inter-PLMN V2X resource for PLMN A having a size that is larger than that at the present, and may transmit the inter-PLMN V2X resource change information for the PLMN A to the BS B (3). Here, as a method and procedure of transmitting to another PLMN BS, signaling method and procedure between BSs that belong to the other PLMN may be used. If it is determined that the resource for the PLMN A is not busy based on the inter-PLMN V2X resource CBR information for the PLMN A included in the CBR relay message, the BS A may configure the inter-PLMN V2X resource for PLMN A having a size that is smaller than that at the present, and may transmit the inter-PLMN V2X resource change information for the PLMN A to the BS B (3). The BS B that has received the inter-PLMN resource reconfiguration message from the BS A may transmit the V2X resource pool information of the adjusted PLMN A to the terminals located in its own cell.

The BS B may reconfigure the inter-PLMN resource based on the resource pool adjustment information of the PLMN A received from the BS A (4). In the drawing, in the case of PLMN A, the inter-PLMN resource is busy, whereas in the case of PLMN B, the inter-PLMN resource is not busy. Accordingly, the resource of PLMN A may be greatly changed, and the resource of PLMN B may be slightly changed. In contrast, in the case of PLMN A, the inter PLMN resource is not busy, whereas in the case of PLMN B, if the inter PLMN resource is busy, the resource of the PLMN A may be slightly changed, and the resource of the PLMN B may be greatly changed. The PLMN A BS that has received the inter PLMN resource reconfiguration response message from the BS B may notify the terminals located in their own cell of the adjusted inter-PLMN resource information (5). The inter-PLMN V2X resource configuration information notified by the BS may be transmitted through broadcasting or terminal-oriented message (dedicated signaling). The terminal located in the RRC connected may be vehicle UE, pedestrian UE, or RSU. Another RRC idle terminal (e.g., V2X-UE C or V2X-UE D) that has received the CBR relay-request message including the resource CBR information for the same PLMN V2X resource may not transmit the CBR relay-request message for a predetermined time.

If an LTE serving cell has a band that supports or does not support the V2X service, the LTE serving cell may perform signaling whether to perform resource allocation of the V2X service band. The signaling for notifying whether the band of the LTE serving cell supports resource allocation for the V2X service may be transmitted in the broadcast method.

Further, the signaling transmitted in the broadcast method may be used for the purpose of notifying whether the band of the adjacent LTE cell supports resource allocation for the V2X. Further, the signaling for notifying whether the band of the serving LTE cell through the band of the adjacent LTE cell may support the resource allocation for the V2X service may be transmitted through UE dedicated signaling. If the LTE cell performs band resource allocation for the V2X service, the band for the V2X service may correspond to the service band of the LTE cell, or may correspond to another intelligent transportation systems (ITS) service band other than the service band of the LTE cell.

Figure 2P:
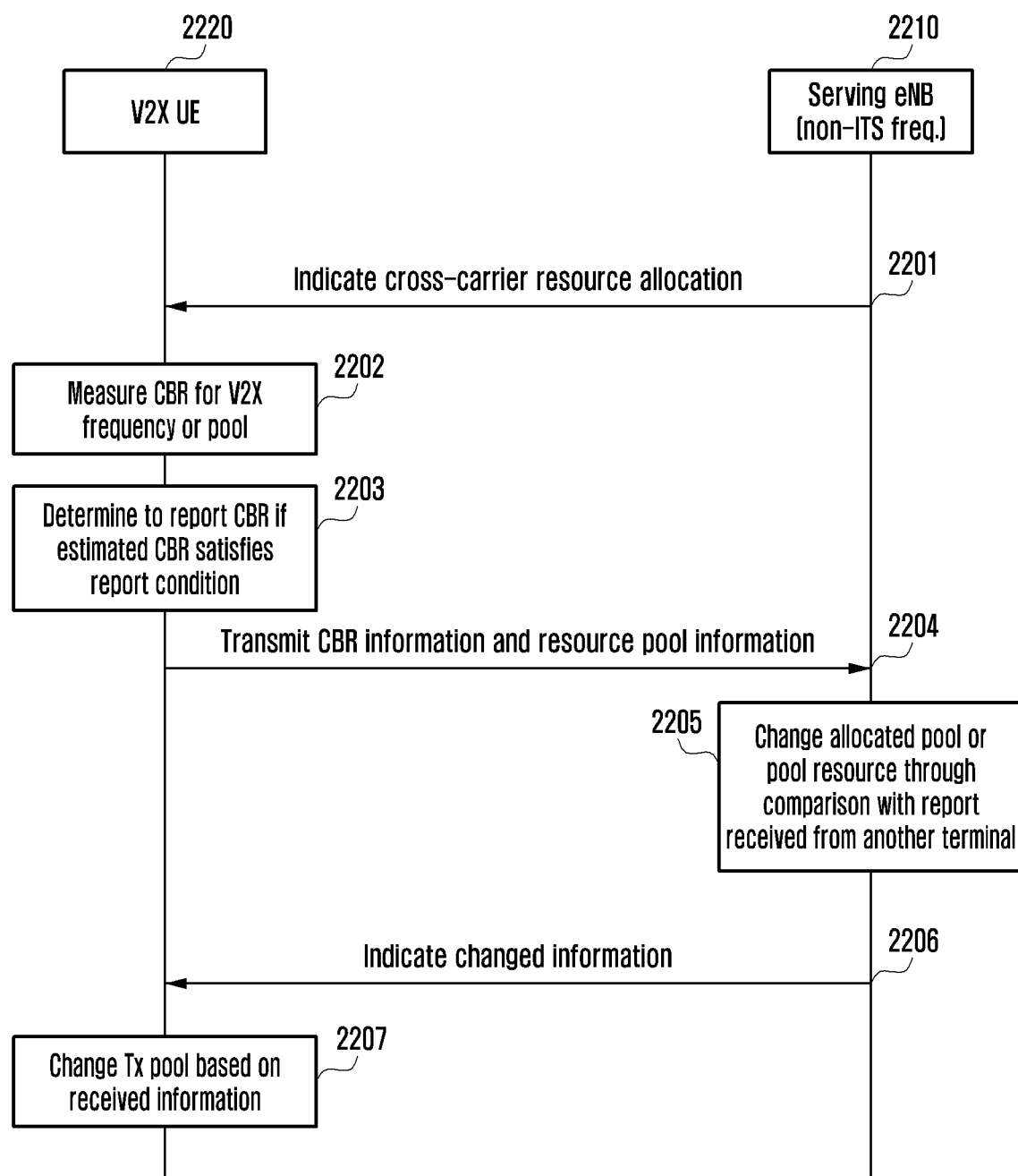
FIG. 2P is a diagram exemplarily illustrating a case where a serving BS transfers to a broadcasting channel information indicating that the serving BS can perform intelligent transportation systems (ITS) band resource allocation although an ITS frequency band is not provided according to a second embodiment of the present disclosure.

In the present disclosure, a case where V2X service is provided in an ITS service band other than the service band of an LTE cell based on FIG. 2P will be described. FIG. 2P is a diagram illustrating a case where a serving BS transfers to a broadcasting channel information indicating that the serving BS can perform ITS band resource allocation although a serving BS does not have the ITS frequency band according to an embodiment of the present disclosure.

Referring to FIG. 2P, at operation 2201, the serving BS 2210 may transfer V2X resource pool for another service frequency band other than its own service band and resource CBR information through the broadcasting channel. The information may include information of the corresponding ITS frequency band, Tx/Rx resource pool information for respective ITS frequencies, and related CBR threshold value information.

At operation 2202, the terminal 2220 may measure a resource pool of the ITS frequency band allocated thereto based on the received information, a resource pool to be used by itself, or CBR (resource CBR) of the corresponding ITS frequency band. At operation 2203, the terminal 2220 may check whether the measured CBR meets the CBR report condition, and if the CBR meets the CBR report condition, it may determine to transmit the corresponding CBR value and the resource pool information to the serving BS 2210. At operation 2204, the terminal may determine to transmit to the serving BS 2210 the corresponding CBR value and the resource pool information. At operation 2204, the terminal 2220 transmits the measured CBR value and the resource pool information. At operation 2205, the serving BS 2210 may change the resource pool of the ITS frequency band allocated to the terminal based on the CBR value of the ITS frequency band and the resource pool information received from not only the terminal 2220 but also other terminals to another resource pool, or may differently change the resource pool configuration of the ITS frequency band. AT operation 2206, the serving BS 2210 may transfer the changed information to the dedicated or broadcasting channel. At operation 2207, the terminal 2220 may use the Tx/Rx pool changed based on the transferred information.

As described above, FIG. 2Q exemplifies an operation in the case where the serving BS cannot perform cross-carrier resource allocation according to an embodiment of the present disclosure.

Figure 2Q:
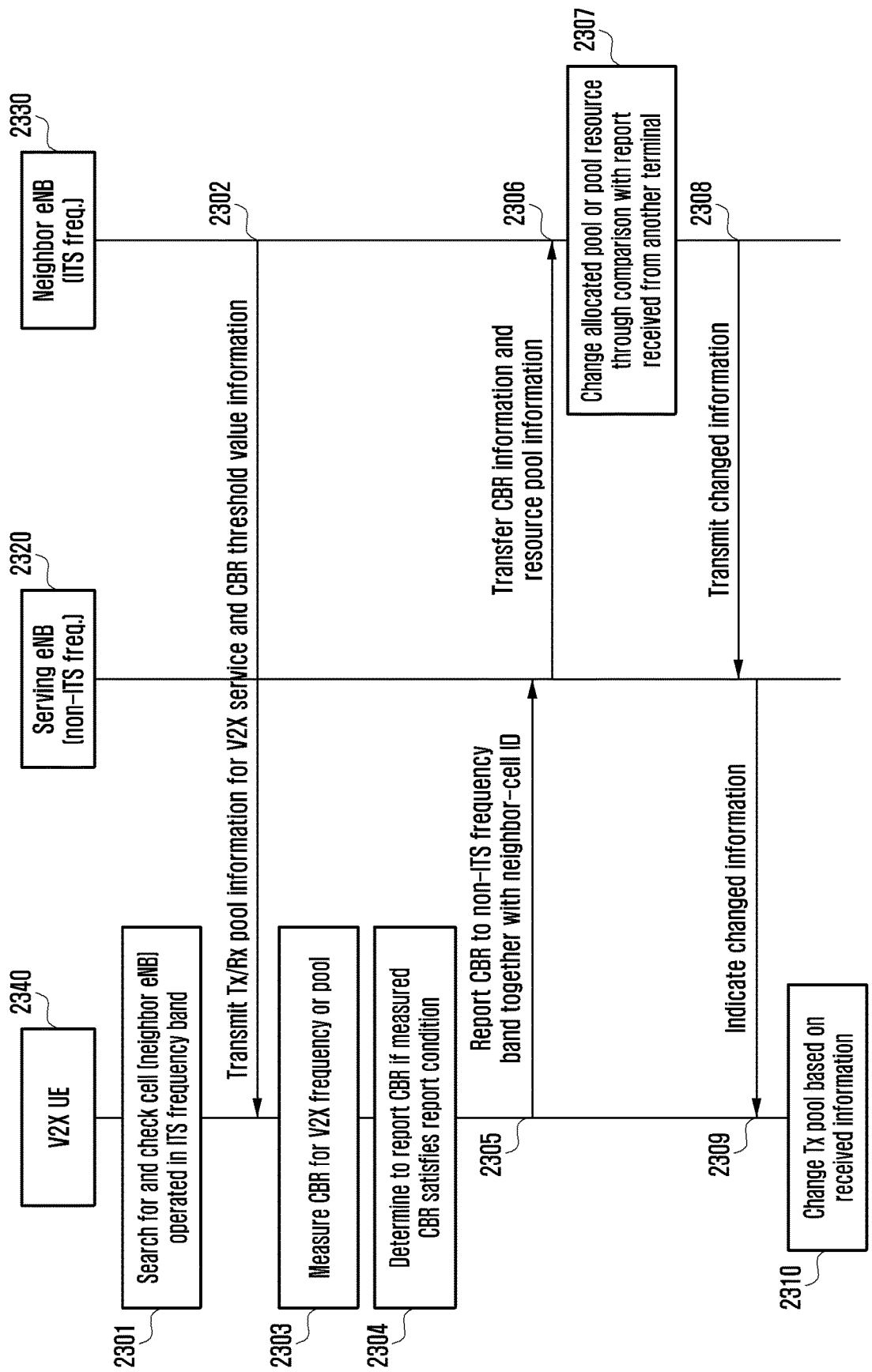
FIG. 2Q is a diagram illustrating a case where a serving BS is unable to perform cross-carrier resource allocation according to a second embodiment of the present disclosure.

Referring to FIG. 2Q, in this case, a terminal 2340 first grasps that a serving cell does not indicate the cross-carrier resource allocation through a broadcasting channel, and at operation 2301, may search for and check whether a cell exists through searching for the ITS frequency band. If a cell that satisfies a specific condition is searched for in the ITS frequency band (in this case, cell search based on the signal strength, such as S-measure, may be used), the terminal 2340, at operation 2302, may read the broadcasting channel of the corresponding cell, and may receive Tx/Rx pool information and threshold value information for CBR report of the corresponding pool. In this case, the information may be transmitted through the broadcasting channel. The broadcasting channel may include an ID of the corresponding cell. The terminal 2340 that has received the information, at operation 2303, may use the Tx pool, and may measure the CBR for the Tx pool. At operation 2304, if the CBR report condition is satisfied, the terminal may determine to report the resource CBR for the Tx pool. At operation 2305, the terminal 2340 transmit the resource CBR information to the serving BS 2320 that does not support the ITS band. In this case, the reported resource CBR information may include a measured CBR value and corresponding resource pool information, ITS serving cell ID, and ITS serving cell band (carrier frequency band) information.

If the CBR report for the ITS band if the terminal 2340 is received, the serving BS 2320, at operation 2306, transfers the CBR information and the resource pool information measured by the terminal to a neighbor BS 2330 that support the corresponding ITS band. The terminal resource CBR report and resource pool information between the serving BS 2320 and the ITS band BS 2330 may be transferred using an X2 interface.

At operation 2307, the ITS band BS 2330 may change the resource pool that is given to the corresponding terminal based on the CBR related information transmitted from not only the terminal 2340 but also other terminals, or may increase or decrease the resource structure of the whole pool. At operation 2308, the ITS band BS 2330 may transfer the changed resource pool information to the serving BS 2320 through the X2 interface. Further, the ITS band BS 2330 may not transmit the changed resource pool information to the serving BS 2330, but may broadcast the same only in its own cell. At operation 2309, the serving BS 2320 that has received the changed resource pool information of the ITS band from the ITS band BS 2330 may transfer the corresponding information to the terminal 2340 through dedicated signaling or the broadcasting channel. For example, a command for changing the resource pool of a specific terminal may be transferred through the dedicated signaling, and the changed structure information of the specific resource pool of the ITS band may be transferred through the broadcasting channel. At operation 2310, the terminal 2340 that has received the information may perform V2X communication based on the Tx resource pool corresponding to the terminal itself.

Figure 2R:
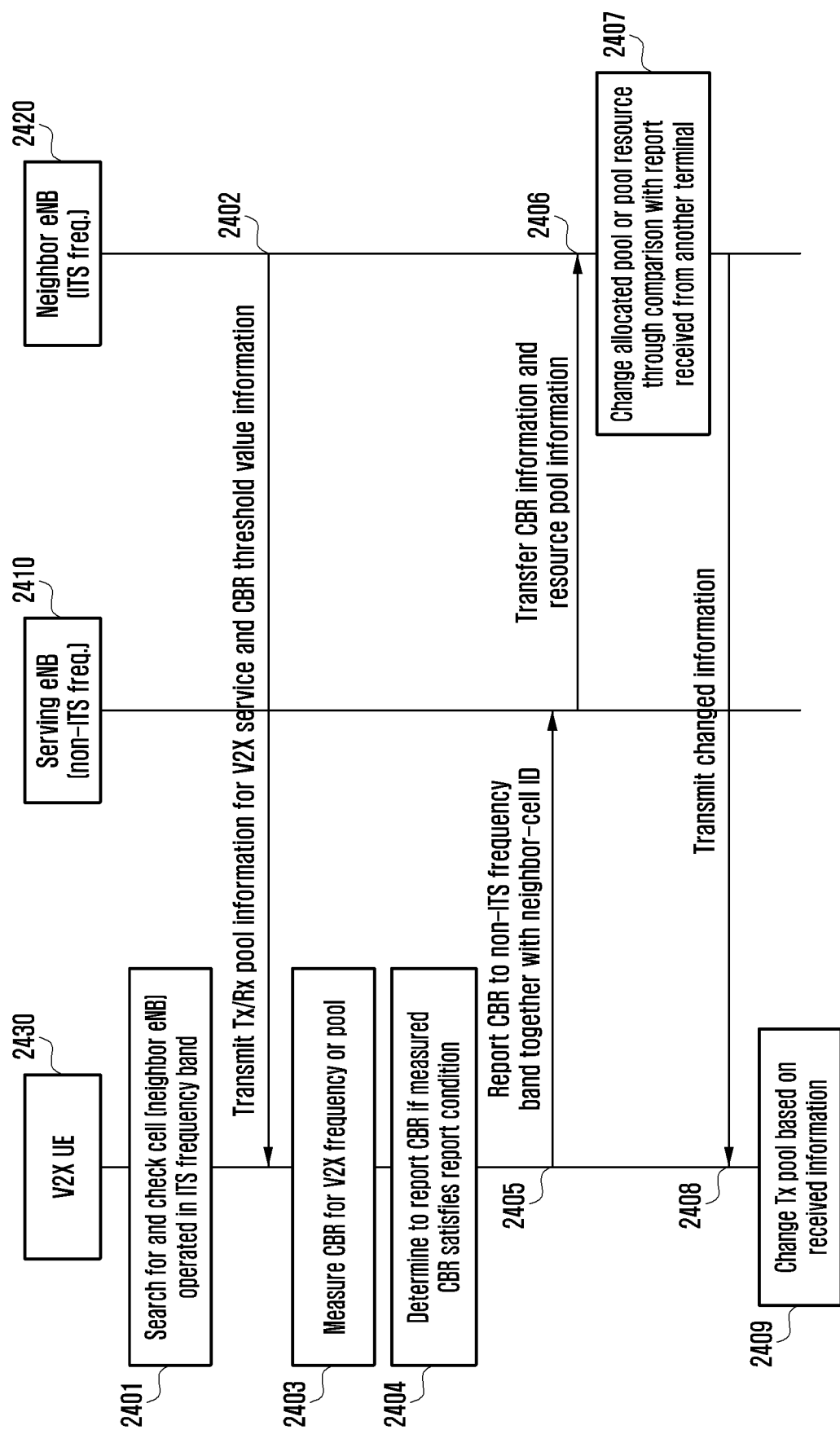
FIG. 2R is a diagram illustrating a process in which a neighbor cell does not transfer information to a serving cell after controlling resources, but a terminal obtains the information by monitoring the neighbor cell directly through a broadcasting channel according to a second embodiment of the present disclosure.

FIG. 2R is a diagram illustrating a process in which a neighbor cell does not transfer information to a serving cell after controlling resources, but a terminal obtains the information by monitoring the neighbor cell directly through a broadcasting channel according to an embodiment of the present disclosure.

Referring to FIG. 2R, the terminal 2430 may grasp that the serving cell does not indicate cross-carrier resource allocation through a broadcasting channel, and at operation 2401, may search for and check whether a cell exists through searching for the ITS frequency band. If a cell that satisfies a specific condition is searched for in the ITS frequency band (in this case, cell search based on the signal strength, such as S-measure, may be used), the terminal 2430, at operation 2402, may read the broadcasting channel of the corresponding cell, and may receive Tx/Rx pool information and threshold value information for CBR report of the corresponding pool. In this case, the information may be transmitted through the broadcasting channel. The broadcasting channel may include an ID of the corresponding cell. The terminal 2430 that has received the information, at operation 2403, may use the Tx pool, and may measure the CBR for the Tx pool. At operation 2404, if the CBR report condition is satisfied, the terminal may determine to report the resource CBR for the Tx pool. At operation 2405, the terminal 2430 transmit the resource CBR information to the serving BS 2410 that does not support the ITS band. In this case, the reported resource CBR information may include a measured CBR value and corresponding resource pool information, ITS serving cell ID, and ITS serving cell band (carrier frequency band) information.

If the CBR report for the ITS band if the terminal 2430 is received, the serving BS 2410, at operation 2406, transfers the CBR information and the resource pool information measured by the terminal to a neighbor BS 2420 that support the corresponding ITS band. The terminal resource CBR report and resource pool information between the serving BS 2410 and the ITS band BS 2420 may be transferred using an X2 interface.

At operation 2407, the ITS band BS 2420 may change the resource pool that is given to the corresponding terminal based on the CBR related information transmitted from not only the terminal 2430 but also other terminals, or may increase or decrease the resource structure of the whole pool.

At operation 2408, the ITS band BS 2420 may transfer the changed resource pool information through the broadcasting channel. In this case, the transferred information is not information only for a specific terminal, but is information for the whole cell, and thus the changed structure information of a specific resource pool may be transferred. For example, if the resource amount of the past Tx pool is small, it may be changed to a resource pool having a larger structure. At operation 2409, the terminal 2430 receives the information, and may perform communication through changing its own resource pool.

Figure 2S:
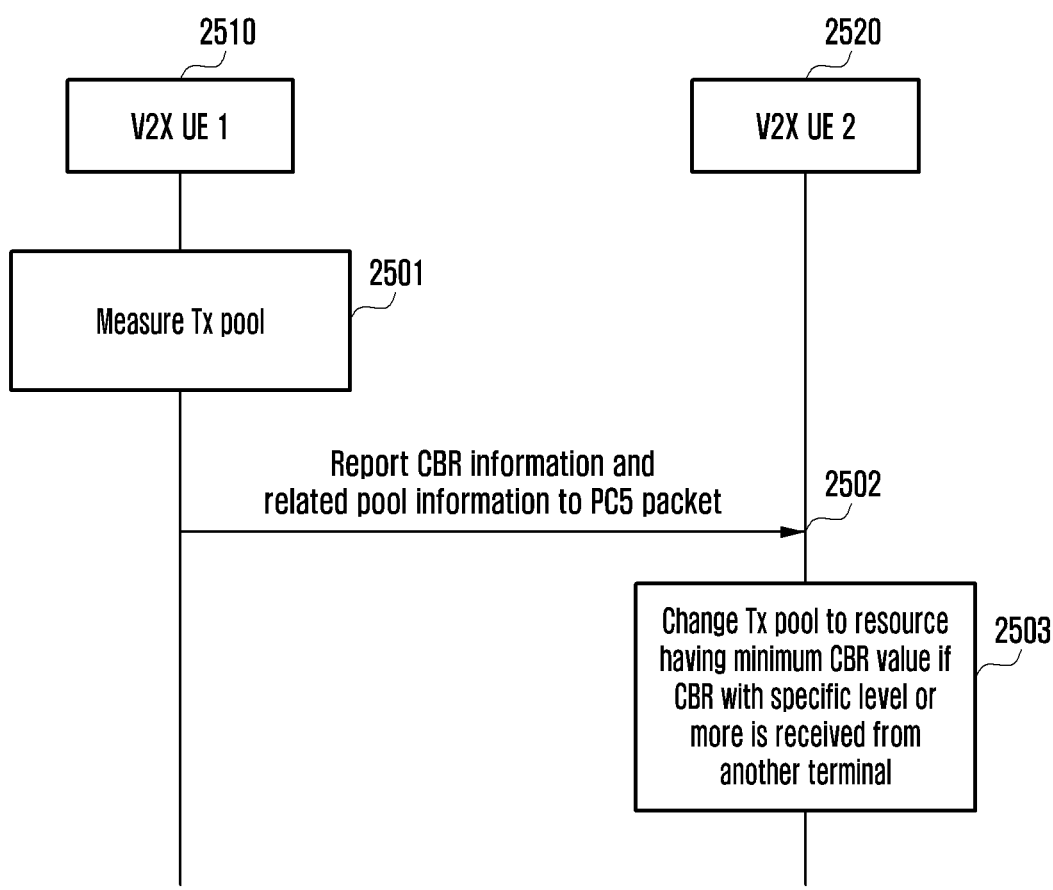
FIG. 2S is a diagram illustrating a process in which a terminal operates based on a predefined resource pool on the assumption that the terminal is out of coverage of a V2X service cell according to a second embodiment of the present disclosure.

FIG. 2S is a diagram illustrating a process in which a terminal operates based on a predefined resource pool on the assumption that the terminal is out of coverage of a V2X service cell according to an embodiment of the present disclosure.

Referring to FIG. 2S, if a cell of the ITS frequency band is not found through a cell search, or it is not indicated that the serving cell can perform cross-carrier resource allocation, the terminal assumes that the terminal itself is out of coverage of the V2X service cell, and may operate based on a predefined resource pool. At operation 2501, respective terminals (e.g., 2510) may measure the CBR for a resource pool, and at operation 2502, they may transfer the measured CBR value through a PC5 packet. If a plurality of pre-configured Tx pools are provided, and the terminal can select a Tx pool among the plurality of pools, terminals (e.g., 2520) that are out of coverage may receive the CBR value and pool information that are measured by other surrounding terminals (e.g., 2510) to be transmitted through the PC5 packet. At operation 2503, if reports, in which resource CBR value is larger than a specific threshold value, are received over a specific level, the terminals (e.g., 2520) that are out of coverage may perform operations for optionally changing their Tx pools to other pools (e.g., resource pools having the minimum CBR value).

Hereinafter, another example of the operation of UE that performs resource CBR report based on an event (e.g., event in which if the resource CBR is higher than the threshold value X, if the resource CBR is equal to or higher than threshold value A, or if the resource CBR is lower than threshold value B, UE transmits the resource CBR report to a BS).

In the case where the terminal reports the event-based resource CBR, the terminal may transmit the resource CBR report to the BS immediately when the event occurrence is determined. As another example, if it is determined that the event has occurred and is effective for a predetermined time, the terminal may transmit the resource CBR report to the BS. Configuration parameters (e.g., a waiting time per resource pool, a waiting time per service priority, a waiting time per packet priority, and a waiting time per logical channel group) used to determine the event effectiveness may be indicated from the BS. Hereinafter, the operation of a terminal that operates a waiting time per resource pool will be described. According to various embodiments of the present disclosure, the waiting time may be set by a resource CBR report limit timer.

Figure 2T:
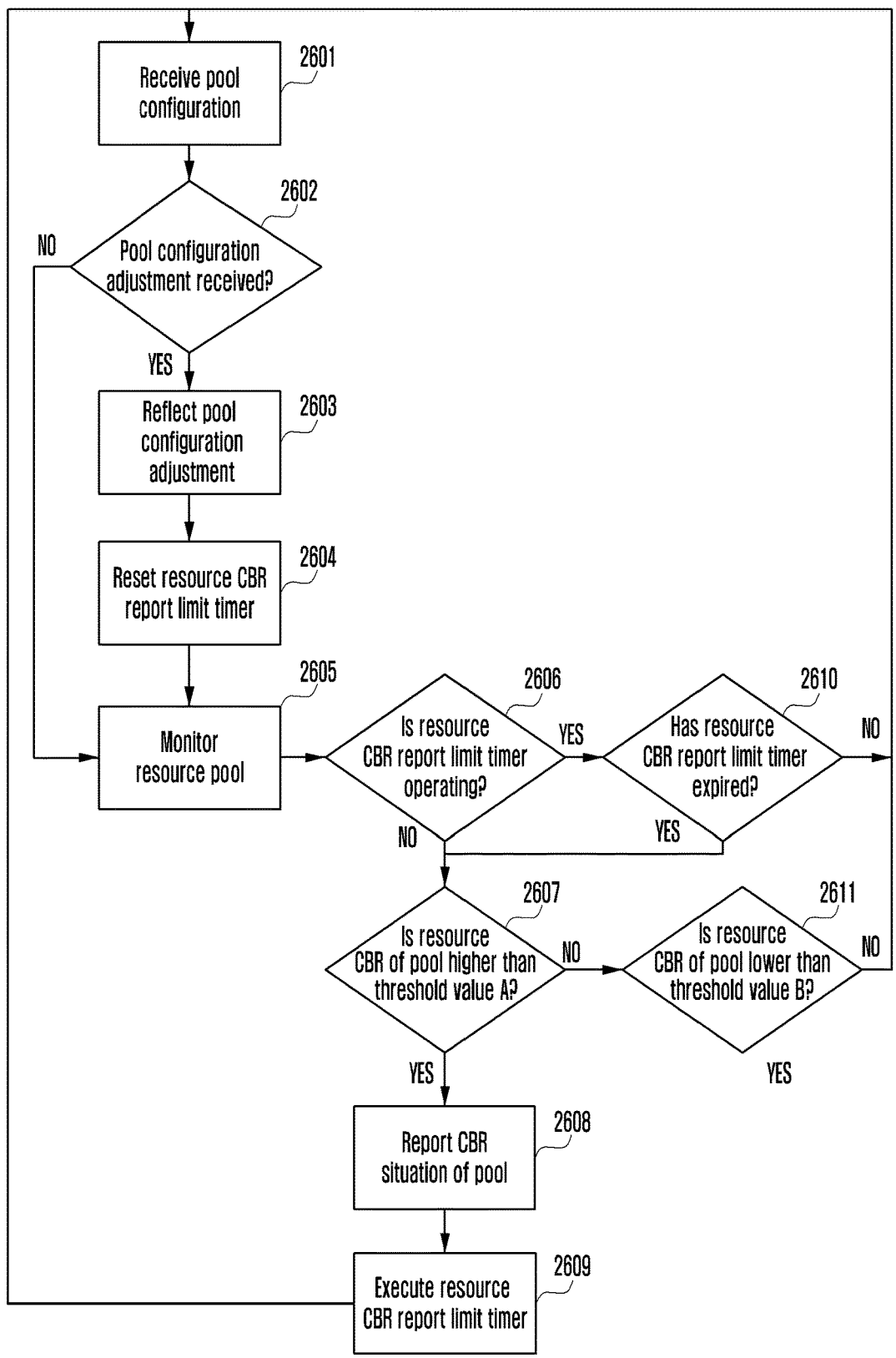
FIG. 2T is a diagram illustrating an example of a terminal operation for operating a CBR report waiting time in the case of reporting a CBR report per resource pool according to a second embodiment of the present disclosure.

FIG. 2T is a diagram illustrating an example of a terminal operation for operating a CBR report waiting time in the case of reporting a CBR report per resource pool according to an embodiment of the present disclosure.

Referring to FIG. 2T, at operation 2601, the terminal may receive pool configuration information from the BS. The pool configuration information may include resource information of each pool, pool CBR threshold value information, and pool resource CBR report limit timer. One pool resource CBR report limit timer may operate per terminal, or different timers may operate per pool. At operation 2602, the terminal may determine whether new pool configuration information is received from the BS. If the new pool configuration information is received from the BS, the terminal, at operation 2603, may adjust its own pool information in accordance with the new pool configuration information. If the resource CBR report limit timer operates, the terminal, at operation 2604, may reset the resource CBR report limit timer value. Here, the reset of the resource CBR report limit timer value corresponds to setting of an initial value of the resource CBR report limit timer. For example, the resource CBR report limit timer may be executed after the resource CBR report is first performed once. For example, the initial value of the resource CBR report limit timer may be set to 0 ms. At operation 2605, the terminal may monitor the resource pool configured to be used by the terminal itself. If new pool configuration information is not received at operation 2602, the terminal, at operation 2605, may monitor the resource pool based on the received pool configuration information. At operation 2606, the terminal may check whether the resource CBR report limit timer is under operation. If the resource CBR report limit timer is not being executed, the terminal, at operation 2607, measures the resource CBR for the configured pool, and may determine whether the measured resource CBR is equal to or higher than threshold value A. If the resource CBR is equal to or higher than the threshold value A, the terminal, at operation 2608, may transmit a CBR situation report for the pool to the BS. Further, at operation 2609, the terminal may execute the resource CBR report limit timer. If it is assumed that the resource CBR report limit timer value for the pool is 1 sec, the terminal may acquire an opportunity to transmit the resource CBR report for the pool after waiting for 1 sec. The terminal may proceed to operation 2601 to receive the pool configuration from the BS.

If the resource CBR for the pool is not higher than the threshold value A, the terminal proceeds to operation 2611 to determine whether the resource CBR for the pool is equal to or lower than the threshold value B. If the resource CBR for the pool is equal to or lower than the threshold value B, the terminal proceeds to operation 2608 to transmit the CBR situation report for the pool to the BS. According to an embodiment of the drawings, the threshold value A may be a threshold value whereby it is determined that the resource pool is busy, and the threshold value B may be a threshold value whereby it is determined that the resource pool is not busy. If it is determined that the resource CBR for the pool is not lower than the threshold value B, the terminal may proceed to operation 2601.

On the other hand, if it is determined that the terminal executes the resource CBR report limit timer by the determination of operation 2606, the terminal, at operation 2610, may determine whether the resource CBR report limit timer has expired. The resource CBR report limit timer may be used to limit the resource CBR report for the resource pool being used by the terminal, and may have the effect of reducing system overhead due to signaling. Further, since the terminal reduces signaling for transmitting the CBR report for the resource pool being used by the terminal, battery power consumption of the terminal can be reduced. The resource CBR report limit timer may be reset in the case where the resource pool configuration of the terminal is changed. That is, overhead can be reduced in transmitting the same CBR report for the same resource pool, and thus the CBR report can be transmitted for the new resource pool.

If the resource CBR report limit timer has expired, the terminal may proceed to operation 2607. If the resource CBR report limit timer has not expired, the terminal may proceed to operation 2601.

Figure 2U:
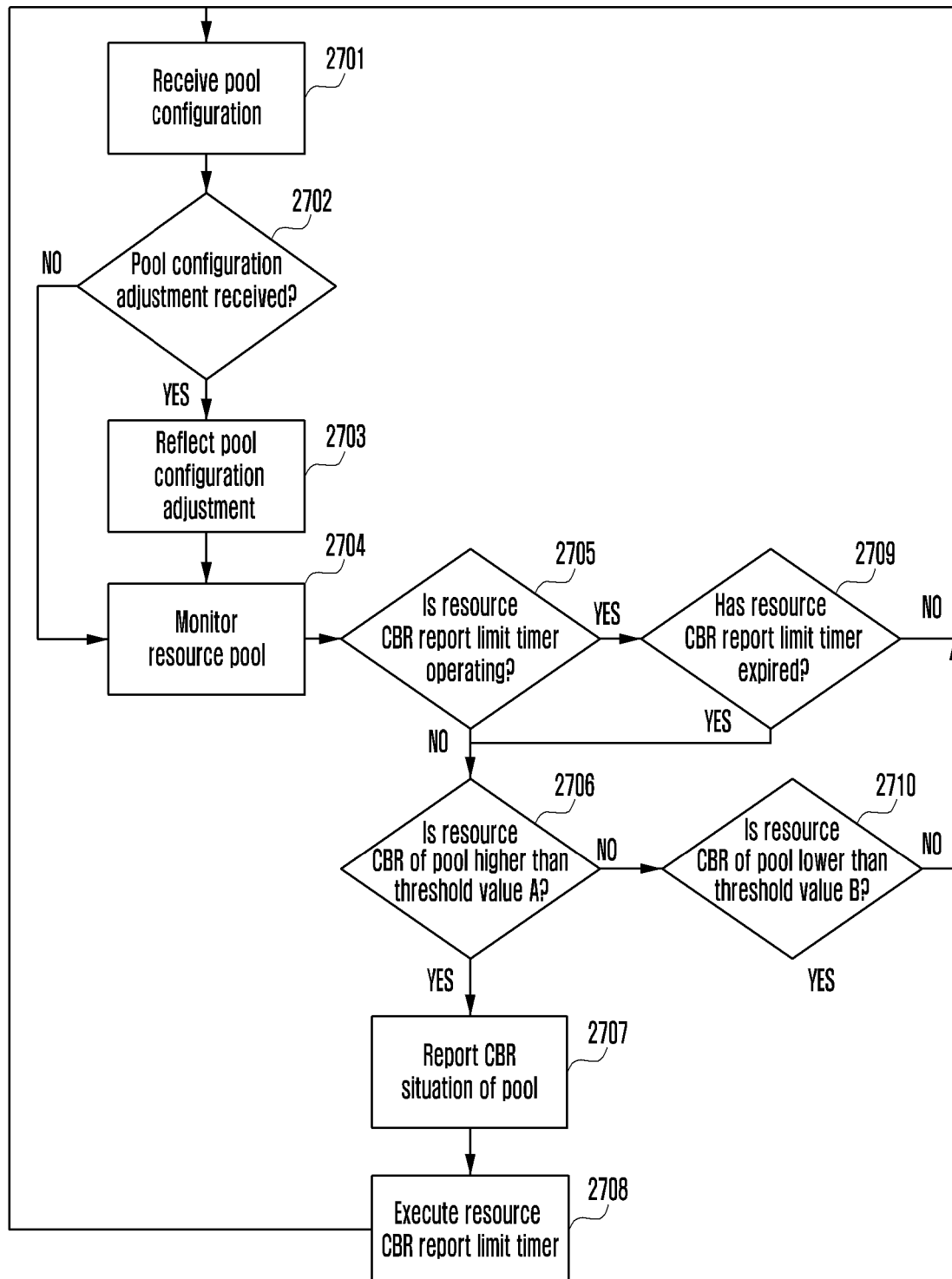
FIG. 2U is a diagram illustrating another example of a terminal operation for operating a CBR report waiting time in the case of reporting a CBR report per resource pool according to a second embodiment of the present disclosure.

FIG. 2U is a diagram illustrating another example of a terminal operation for operating a CBR report waiting time in the case of reporting a CBR report per resource pool according to an embodiment of the present disclosure.

Referring to FIG. 2U, at operation 2701, the terminal may receive pool configuration information from the BS. The pool configuration information may include resource information of each pool, pool CBR threshold value information, and pool resource CBR report limit timer. One pool resource CBR report limit timer may operate per terminal, or different timers may operate per pool. At operation 2702, the terminal may determine whether new pool configuration information is received from the BS. If the new pool configuration information is received from the BS, the terminal, at operation 2703, may adjust its own pool information in accordance with the new pool configuration information. At operation 2704, the terminal may monitor the resource pool configured to be used by the terminal itself. If new pool configuration information is not received, the terminal, at operation 2704, may monitor the resource pool based on the pre-received pool configuration information.

At operation 2705, the terminal may check whether the resource CBR report limit timer is being executed. If the resource CBR report limit timer is not being executed, the terminal, at operation 2706, measures the resource CBR for the configured pool, and may determine whether the measured resource CBR is equal to or higher than threshold value A. If the resource CBR is equal to or higher than the threshold value A, the terminal, at operation 2707, may transmit a CBR situation report for the pool to the BS. Further, at operation 2708, the terminal may execute the resource CBR report limit timer. Thereafter, the terminal may proceed to operation 2701 to receive the pool configuration from the BS.

If the resource CBR for the pool is not higher than the threshold value A, the terminal proceeds to operation 2710 to determine whether the resource CBR for the pool is equal to or lower than the threshold value B. If the resource CBR for the pool is equal to or lower than the threshold value B, the terminal proceeds to operation 2707 to transmit the CBR situation report for the pool to the BS. According to an embodiment of the drawings, the threshold value A may be a threshold value whereby it is determined that the resource pool is busy, and the threshold value B may be a threshold value whereby it is determined that the resource pool is not busy. If it is determined that the resource CBR for the pool is not lower than the threshold value B, the terminal may proceed to operation 2701.

On the other hand, if it is determined that the terminal executes the resource CBR report limit timer by the determination of operation 2705, the terminal, at operation 2709, may determine whether the resource CBR report limit timer has expired. The resource CBR report limit timer may be used to limit the resource CBR report for the resource pool being used by the terminal, and may have the effect of reducing system overhead due to signaling. Further, since the terminal reduces signaling for transmitting the CBR report for the resource pool being used by the terminal, battery power consumption of the terminal can be reduced. The resource CBR report limit timer may be reset in the case where the resource pool configuration of the terminal is changed. That is, overhead can be reduced in transmitting the same CBR report for the same resource pool, and thus the CBR report can be transmitted for the new resource pool.

If the resource CBR report limit timer has expired, the terminal may proceed to operation 2706. If the resource CBR report limit timer has not expired, the terminal may proceed to operation 2701.

Figure 2V:
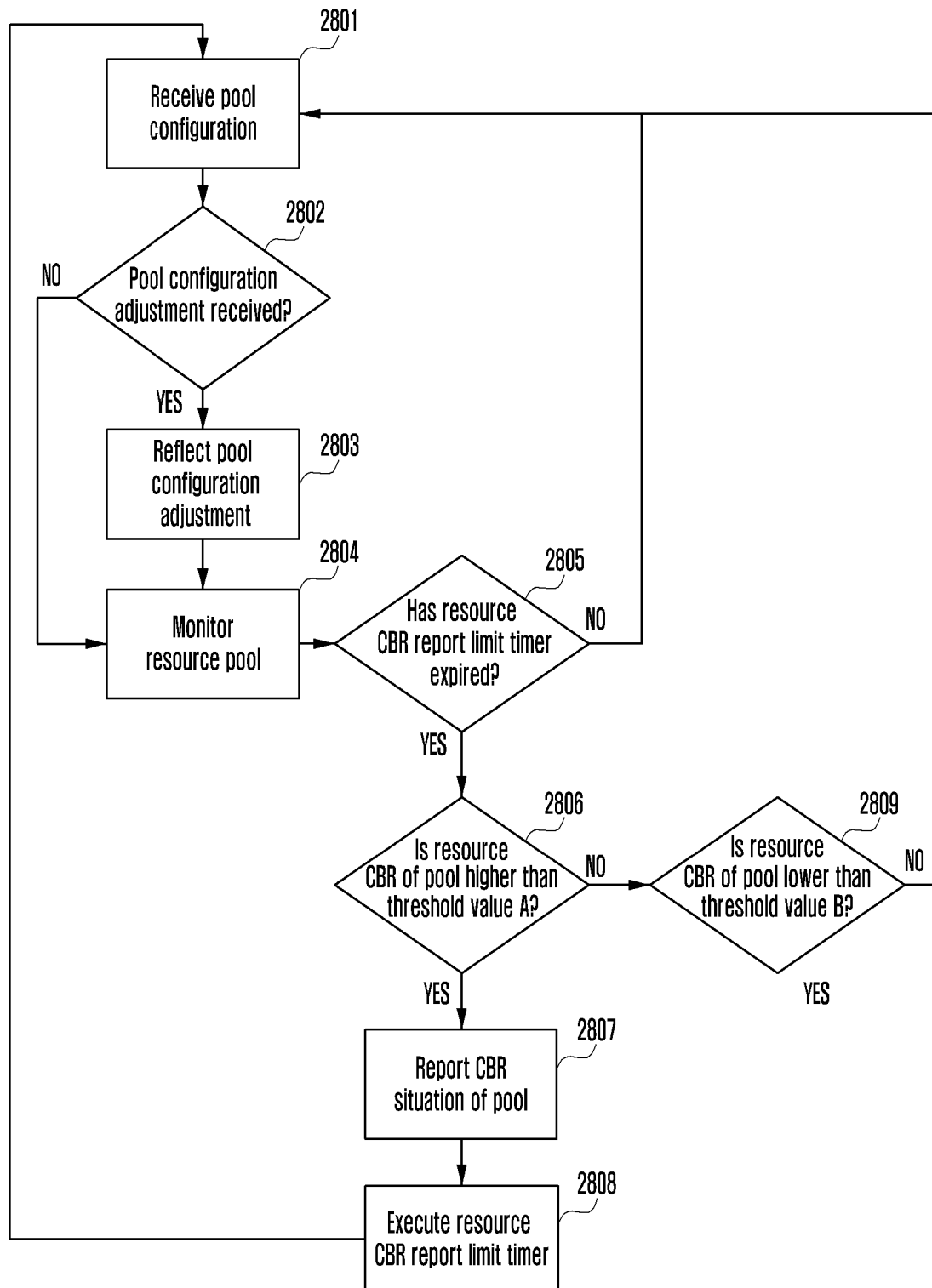
FIG. 2V is a diagram illustrating still another example of a terminal operation for operating a CBR report waiting time in the case of reporting a CBR report per resource pool according to a second embodiment of the present disclosure.

FIG. 2V is a diagram illustrating still another example of a terminal operation for operating a CBR report waiting time in the case of reporting a CBR report per resource pool according to an embodiment of the present disclosure.

Referring to FIG. 2V, at operation 2801, the terminal may receive pool configuration information from the BS. The pool configuration information may include resource information of each pool, pool CBR threshold value information, and pool resource CBR report limit timer. One pool resource CBR report limit timer may operate per terminal, or different timers may operate per pool. At operation 2802, the terminal may determine whether new pool configuration information is received from the BS. If the new pool configuration information is received from the BS, the terminal, at operation 2803, may adjust its own pool information in accordance with the new pool configuration information. The terminal that has received new pool configuration information may set the resource CBR report limit timer value to '0' if the resource CBR report limit timer value is not '0'. At operation 2804, the terminal may monitor the resource pool configured to be used by the terminal itself. If new pool configuration information is not received, the terminal, at operation 2804, may monitor the resource pool based on the pre-received pool configuration information.

At operation 2805, the terminal may check whether the resource CBR report limit timer has expired. If the resource CBR report limit timer has not expired, the terminal, at operation 2806, measures the resource CBR for the configured pool, and may determine whether the measured resource CBR is equal to or higher than threshold value A. If the resource CBR is equal to or higher than the threshold value A, the terminal, at operation 2807, may transmit a CBR situation report for the pool to the BS. Further, at operation 2808, the terminal may start execution of the resource CBR report limit timer. For example, the resource CBR report limit timer value may be set to 1 sec. Thereafter, the terminal may proceed to operation 2801 to receive the pool configuration from the BS.

If the resource CBR for the pool is not higher than the threshold value A, the terminal proceeds to operation 2809 to determine whether the resource CBR for the pool is equal to or lower than the threshold value B. If the resource CBR for the pool is equal to or lower than the threshold value B, the terminal proceeds to operation 2807 to transmit the CBR situation report for the pool to the BS. According to an embodiment of the drawings, the threshold value A may be a threshold value whereby it is determined that the resource pool is busy, and the threshold value B may be a threshold value whereby it is determined that the resource pool is not busy. If it is determined that the resource CBR for the pool is not lower than the threshold value B, the terminal may proceed to operation 2801.

On the other hand, if it is determined that the resource CBR report limit timer has not expired by the determination of operation 2805, the terminal may proceed to operation 2801. The resource CBR report limit timer may be used to limit the resource CBR report for the resource pool being used by the terminal, and may have the effect of reducing system overhead due to signaling. Further, since the terminal reduces signaling for transmitting the CBR report for the resource pool being used by the terminal, battery power consumption of the terminal can be reduced. The resource CBR report limit timer may be reset in the case where the resource pool configuration of the terminal is changed. That is, overhead can be reduced in transmitting the same CBR report for the same resource pool, and thus the CBR report can be transmitted for the new resource pool.

As described above, although the operation of the terminal that operates a waiting time per resource pool has been described, the terminal may also be applied even in the case of operating a waiting time per packet priority. Further, the operation of the terminal may also be applied in the same manner even in the case of operating a waiting time per service priority or operating a waiting time per logical channel group.

That is, in the case of operating a waiting time per packet priority, service priority, or logical channel group, the resource CBR report limit timer may be set to operate with a value that is shorter than a packet having low priority so as to reduce delay time during transmission of a packet having high priority. That is, in the case of a terminal to transmit a packet having high priority, the resource CBR report information is frequently transmitted, and thus the BS may be made to secure a resource pool for a packet having high priority. In the case of transmitting a packet having low priority, the resource CBR report limit timer may be set to operate with a high value. In the case of a terminal that intends to transmit a packet having low priority, the resource CBR report transmission frequency may be lowered to reduce resource CBR transmission signaling overhead due to the packet having low priority and terminal battery power consumption.

The resource CBR report limit timer may be applied in association with the resource pool and the service priority, and different resource CBR report limit timers may operate with respect to a pool having high service priority and a pool having low service priority.

Figure 2W:
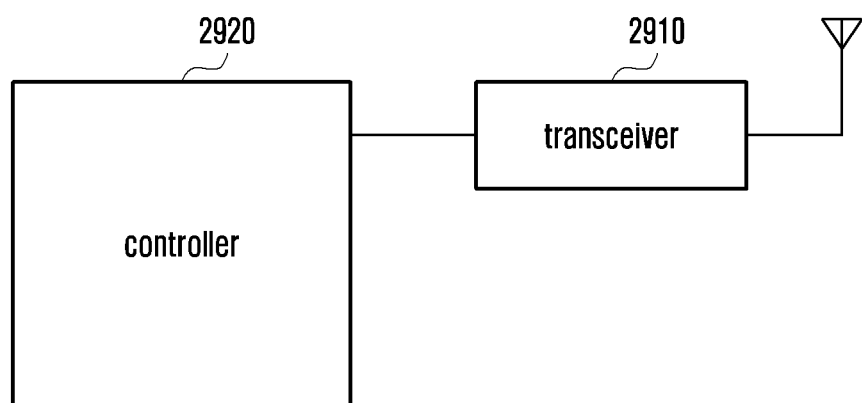
FIG. 2W is a block diagram schematically illustrating the configuration of a terminal according to an embodiment of the present disclosure.

FIG. 2W is a block diagram schematically illustrating the internal structure of a terminal (e.g., V2X UE) according to embodiments (e.g., first and second embodiments) of the present disclosure.

Referring to FIG. 2W, a terminal may include a transceiver 2910 and a controller 2920. The transceiver 2910 may transmit/receive data to/from outside (e.g., BS or another terminal). Here, the transceiver 2910 may transmit/receive data to/from the outside under the control of the controller 2920. The transceiver 2910 may include at least one RF module that supports various kinds of communications.

The controller 2920 may control the state and operation of all constituent elements constituting the terminal so as to perform operations according to embodiments of the present disclosure. The controller 2920 may include at least one processor.

Figure 2X:
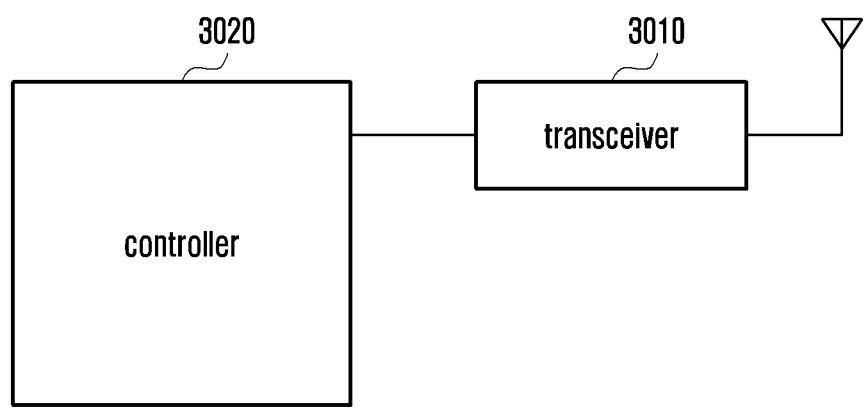
FIG. 2X is a block diagram schematically illustrating the configuration of a BS according to an embodiment of the present disclosure.

FIG. 2X is a block diagram schematically illustrating the internal structure of a BS according to embodiments (e.g., first and second embodiments) of the present disclosure.

Referring to FIG. 2X, a BS may include a transceiver 3010 and a controller 3020. The transceiver 3010 may transmit/receive data to/from outside (e.g., terminal or another BS). Here, the transceiver 3010 may transmit/receive data to/from the outside under the control of the controller 3020.

The controller 3020 may control the state and operation of all constituent elements constituting the BS so as to perform operations according to embodiments of the present disclosure. The controller 3020 may include at least one processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a base station for supporting a vehicle to everything (V2X) service, the method comprising:
   transmitting a first message including first information on zone configuration, wherein the first information on the zone configuration includes zone-related information for identifying a zone and resource pool information corresponding to the zone identified based on the zone-related information;
   receiving, from a terminal, a report message including a channel busy ratio (CBR) for a resource pool corresponding to the zone, wherein the resource pool is identified based on the resource pool information corresponding to the zone;
   updating the zone configuration by adjusting a size of the zone based on the received CBR, and updating the resource pool information based on the updated zone configuration; and
   transmitting a second message including second information on the updated zone configuration.

2. The method of claim 1,
   wherein the zone is a defined area, and
   wherein the zone-related information includes at least one of a width of a zone basic unit for deriving a zone identifier (ID) or a length of the zone basic unit.

3. The method of claim 1, wherein the terminal is located in the zone.

4. The method of claim 1, wherein the second message further includes the updated resource pool information.

5. A base station for supporting a vehicle to everything (V2X) service, the base station comprising:
   a transceiver; and
   a controller coupled with the transceiver and configured to control to:
      transmit a first message including first information on zone configuration, wherein the first information on the zone configuration includes zone-related information for identifying a zone and resource pool information corresponding to the zone identified based on the zone-related information,
      receive, from a terminal, a report message including a channel busy ratio (CBR) for a resource pool corresponding to the zone, wherein the resource pool is identified based on the resource pool information corresponding to the zone, update the zone configuration by adjusting a size of the zone based on the received CBR, and update the resource pool information based on the updated zone configuration, and transmit a second message including second information on the updated zone configuration.

6. The base station of claim 5, wherein the zone is a defined area, and wherein the zone-related information includes at least one of a width of a zone basic unit for deriving a zone identifier (ID) or a length of the zone basic unit.

7. The base station of claim 5, wherein the terminal is located in the zone.

8. The base station of claim 5, wherein the second message further includes the updated resource pool information.

9. A method by a terminal for supporting a vehicle to everything (V2X) service, the method comprising:

receiving, from a base station, a first message including first information on zone configuration, wherein the first information on the zone configuration includes zone-related information for identifying a zone and resource pool information corresponding to the zone identified based on the zone-related information;

transmitting, to the base station, a report message including a channel busy ratio (CBR) for a resource pool corresponding to the zone, wherein the resource pool is identified based on the resource pool information corresponding to the zone; and receiving, from the base station, a second message including second information on an updated zone configuration which is updated by adjusting a size of the zone based on the CBR, wherein the resource pool information is updated based on the updated zone configuration.

10. The method of claim 9, wherein the zone is a defined area, and wherein the zone-related information includes at least one of a width of a zone basic unit for deriving a zone identifier (ID) or a length of the zone basic unit.

11. The method of claim 9, wherein the terminal is located in the zone.

12. The method of claim 9, wherein the second message further includes the updated resource pool information.

13. A terminal for supporting a vehicle to everything (V2X) service, the terminal comprising:

a transceiver; and a controller coupled with the transceiver and configured to control to:

receive, from a base station, a first message including first information on zone configuration, wherein the first information on the zone configuration includes zone-related information for identifying a zone and resource pool information corresponding to the zone identified based on the zone-related information, transmit, to the base station, a report message including a channel busy ratio (CBR) for a resource pool corresponding to the zone, wherein the resource pool is identified based on the resource pool information corresponding to the zone, and receive, from the base station, a second message including second information on an updated zone configuration which is updated by adjusting a size of the zone based on the CBR, wherein the resource pool information is updated based on the updated zone configuration.

14. The terminal of claim 13, wherein the zone is a defined area, and wherein the zone-related information includes at least one of a width of a zone basic unit for deriving a zone identifier (ID) or a length of the zone basic unit.

15. The terminal of claim 13, wherein the terminal is located in the zone.

16. The terminal of claim 13, wherein the second message further includes the updated resource pool information.

* * * * *